(12) United States Patent
Hills et al.

(10) Patent No.: US 11,790,141 B2
(45) Date of Patent: Oct. 17, 2023

(54) SYSTEMS AND METHODS FOR DESIGNING INTEGRATED CIRCUITS

(71) Applicant: Massachusetts Institute of Technology, Cambridge, MA (US)

(72) Inventors: Gage Krieger Hills, Mill Valley, CA (US); Max Shulaker, Weston, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 17 days.

(21) Appl. No.: 17/336,916

(22) Filed: Jun. 2, 2021

(65) Prior Publication Data
US 2021/0294959 A1 Sep. 23, 2021

Related U.S. Application Data

(62) Division of application No. 16/565,634, filed on Sep. 10, 2019, now Pat. No. 11,062,067.
(Continued)

(51) Int. Cl.
| | | |
|---|---|---|
| *G06F 30/327* | (2020.01) | |
| *G06F 30/392* | (2020.01) | |
| *G06F 30/398* | (2020.01) | |
| *G06F 30/337* | (2020.01) | |
| *G06F 111/04* | (2020.01) | |
| *G06F 119/10* | (2020.01) | |
| *G06F 119/02* | (2020.01) | |

(52) U.S. Cl.
CPC .......... *G06F 30/327* (2020.01); *G06F 30/337* (2020.01); *G06F 30/392* (2020.01); *G06F 30/398* (2020.01); *G06F 2111/04* (2020.01); *G06F 2119/02* (2020.01); *G06F 2119/10* (2020.01)

(58) Field of Classification Search
USPC ........................................................ 716/102
See application file for complete search history.

(56) References Cited

U.S. PATENT DOCUMENTS

| | | |
|---|---|---|
| 6,191,724 B1 | 2/2001 | McEwan |
| 6,462,929 B2 | 10/2002 | Compton et al. |

(Continued)

FOREIGN PATENT DOCUMENTS

| | | |
|---|---|---|
| CN | 101341488 A | 1/2009 |
| CN | 102095769 A | 6/2011 |

(Continued)

OTHER PUBLICATIONS

A formal semantics of the RISC-V ISA in Haskell. Github. Accessed at https://github.com/mit-piv/riscv-semantics on Feb. 13, 2020. 3 pages.

(Continued)

*Primary Examiner* — Mohammed Alam
(74) *Attorney, Agent, or Firm* — Smith Baluch LLP

(57) ABSTRACT

System and methods to generate a circuit design for an integrated circuit using only allowable pairs of connected logic stages. The allowable pairs of connected logic stages are those pairs of connected logic stages with a static noise margin (SNM) above an SNM threshold. Also presented is a 16-bit microprocessor made entirely from carbon nanotube field effect transistors (CNFET) having such allowable pair of connected logic stages.

17 Claims, 67 Drawing Sheets

Related U.S. Application Data

(60) Provisional application No. 62/729,056, filed on Sep. 10, 2018.

(56) References Cited

U.S. PATENT DOCUMENTS

| | | | |
|---|---|---|---|
| 7,598,544 | B2 | 10/2009 | Bertin et al. |
| 7,859,385 | B2 | 12/2010 | Bertin et al. |
| 8,288,236 | B2 | 10/2012 | Chang et al. |
| 8,557,659 | B2 | 10/2013 | Teo et al. |
| 8,664,091 | B2 * | 3/2014 | Zhu ................ B82B 3/0076 977/936 |
| 8,685,815 | B2 | 4/2014 | Ahn et al. |
| 8,772,141 | B2 | 7/2014 | Afzali-Ardakani et al. |
| 8,785,911 | B2 | 7/2014 | Chen et al. |
| 8,946,007 | B2 | 2/2015 | Doris et al. |
| 9,209,288 | B2 | 12/2015 | Avci et al. |
| 9,613,879 | B2 | 4/2017 | Hersam et al. |
| 10,256,320 | B1 | 4/2019 | Liu et al. |
| 11,062,067 | B2 * | 7/2021 | Hills ................ G06F 30/367 |
| 11,271,160 | B2 | 3/2022 | Lau et al. |
| 11,561,195 | B2 | 1/2023 | Shulaker et al. |
| 2004/0099438 | A1 | 5/2004 | Arthur et al. |
| 2005/0181587 | A1 | 8/2005 | Duan et al. |
| 2005/0245836 | A1 | 11/2005 | Star et al. |
| 2006/0115640 | A1 | 6/2006 | Yodh et al. |
| 2006/0183278 | A1 | 8/2006 | Bertin et al. |
| 2006/0204427 | A1 | 9/2006 | Ghenciu et al. |
| 2007/0281409 | A1 | 12/2007 | Zhang et al. |
| 2008/0099842 | A1 | 5/2008 | Gyoujin et al. |
| 2008/0210987 | A1 | 9/2008 | Bondavalli et al. |
| 2009/0184346 | A1 | 7/2009 | Jain |
| 2010/0111813 | A1 | 5/2010 | Fan |
| 2010/0207208 | A1 | 8/2010 | Bedell et al. |
| 2011/0045660 | A1 | 2/2011 | Romano et al. |
| 2011/0147715 | A1 | 6/2011 | Rogers et al. |
| 2011/0201956 | A1 | 8/2011 | Alferness et al. |
| 2012/0089041 | A1 | 4/2012 | Schlager |
| 2012/0129273 | A1 | 5/2012 | Johnson, Jr. et al. |
| 2012/0129301 | A1 | 5/2012 | Or-Bach et al. |
| 2012/0326126 | A1 | 12/2012 | Chen et al. |
| 2013/0122690 | A1 * | 5/2013 | Zhu .................... B82Y 40/00 257/E21.327 |
| 2013/0134394 | A1 | 5/2013 | Zhou et al. |
| 2014/0008606 | A1 | 1/2014 | Hussain et al. |
| 2014/0017886 | A1 | 1/2014 | Teo et al. |
| 2014/0175376 | A1 | 6/2014 | Avci et al. |
| 2015/0227669 | A1 * | 8/2015 | Joshi .................. G11C 11/417 716/115 |
| 2015/0318504 | A1 | 11/2015 | Xiao |
| 2015/0370948 | A1 | 12/2015 | Kawa et al. |
| 2016/0077047 | A1 | 3/2016 | Khamis et al. |
| 2016/0123919 | A1 | 5/2016 | Johnson et al. |
| 2016/0133843 | A1 | 5/2016 | Rogers et al. |
| 2016/0147934 | A1 | 5/2016 | Keller et al. |
| 2016/0190492 | A1 | 6/2016 | Li et al. |
| 2017/0005140 | A1 | 1/2017 | Bertin |
| 2017/0059514 | A1 | 3/2017 | Hoffman |
| 2017/0162710 | A1 | 6/2017 | Shih et al. |
| 2017/0179283 | A1 | 6/2017 | Pourghaderi et al. |
| 2017/0294583 | A1 | 10/2017 | Liang et al. |
| 2019/0167152 | A1 | 6/2019 | Weda et al. |
| 2019/0189775 | A1 | 6/2019 | Liu et al. |
| 2019/0341450 | A1 | 11/2019 | Lee et al. |
| 2019/0378998 | A1 | 12/2019 | Saku et al. |
| 2020/0082032 | A1 * | 3/2020 | Hills ................ G06F 30/367 |
| 2021/0050417 | A1 | 2/2021 | Shulaker et al. |
| 2021/0247356 | A1 | 8/2021 | Shulaker et al. |
| 2021/0294959 | A1 * | 9/2021 | Hills ................ G06F 30/327 |
| 2021/0313530 | A1 | 10/2021 | Lau et al. |
| 2021/0351354 | A1 * | 11/2021 | Lau .................. H10K 10/484 |
| 2022/0284077 | A1 * | 9/2022 | Dahl ................ G06F 30/20 |

FOREIGN PATENT DOCUMENTS

| | | |
|---|---|---|
| CN | 104778324 A | 7/2015 |
| CN | 106233464 A | 12/2016 |
| EP | 0190070 B1 | 8/1992 |
| WO | 2014113722 A1 | 7/2014 |
| WO | 2017001406 A3 | 4/2017 |

OTHER PUBLICATIONS

Aly etal., "Energy-efficient abundant-data computing: The N3XT 1,000 x." Computer 48.12 (2015): 24-33.

Aly et al., "The N3XT approach to energy-efficient abundant-data computing." Proceedings of the IEEE 107.1 (2018): 19-48.

Appenzeller, Carbon Nanotubes for High-Performance Electronics—Progress and Prospect. Proc. IEEE 2008, 96, 201-211.

Aria et al., Parameter Space of Atomic Layer Deposition of Ultrathin Oxides on Graphene. ACS Appl. Mater. Interfaces 2016, 8, 30564-30575.

Asanovic et al., The berkeley out-of-order machine (boom): An industry-competitive, synthesizabie, parameterized risc-v processor. No. UCB-EECS-2015-167. University of California at Berkeley Berkeley United States, 2015. 5 pages.

Bardon et al., "Extreme scaling enabled by 5 tracks cells: Holistic design-device co-optimization for FinFETs and lateral nanowires." Electron Devices Meeting (IEDM), 2016 IEEE International. IEEE, 2016.

Batude et al., "Advances, challenges and opportunities in 3D CMOS sequential integration," 2011 International Electron Devices Meeting. IEEE, 2011. 4 pages.

Boots et al., "Identification of microorganisms based on headspace analysis of volatile organic compounds by gas chromatography-mass spectrometry." Journal of breath research 8.2 (2014): 027106. 13 pages.

Bos et al., "The volatile metabolic fingerprint of ventilator-associated pneumonia." Intensive care medicine 40.5 (2014): 761-762.

Bos et al., "Volatile metabolites of pathogens: a systematic review." PLoS pathog 9.5 (2013): e1003311. 8 pages.

Brady et al., "Polyfluorene-sorted, carbon nanotube array field-effect transistors with increased current density and high on/off ratio." ACS nano 8.11 (2014): 11614-11621.

Brady et al., "Quasi-ballistic carbon nanotube array transistors with current density exceeding Si and GaAs." Science advances 2.9 (2016): e1601240. 10 pages.

Cao et al., "Arrays of single-walled carbon nanotubes with full surface coverage for high-performance electronics." Nature nanotechnology 8.3 (2013): 180. 7 pages.

Cao et al., "Carbon nanotube transistors scaled to a 40-nanometer footprint." Science 356.6345 (2017): 1369-1372.

Cao et al., "End-bonded contacts for carbon nanotube transistors with low, size-independent resistance." Science350.6256 (2015): 68-72.

Cao et al., "Medium-scale carbon nanotube thin-film integrated circuits on flexible plastic substrates." Nature 454.7203 (2008): 495-500.

Chen et al., "Externally assembled gate-all-around carbon nanotube field-effect transistor." IEEE electron device letters 29.2 (2008): 183-185.

Chen et al., The Role of Metal-Nanotube Contact in the Performance of Carbon Nanotube Field-Effect Transistors. Nano Lett. 2005, 5, 1497-1502.

Clark et al., "ASAP7: A 7-nm finFET predictive process design kit." Microelectronics Journal 53 (2016): 105-115.

Cook, "Ventilator associated pneumonia: perspectives on the burden of illness." Intensive care medicine 26.1 (2000): S031-S037.

Deng et al., "Carbon nanotube transistor circuits: Circuit-level performance benchmarking and design options for living with imperfections." Solid-State Circuits Conference, 2007. ISSCC 2007. Digest of Technical Papers. IEEE International. IEEE, 2007, 3 pages.

(56) References Cited

OTHER PUBLICATIONS

Desai et al., "MoS2 transistors with 1-nanometer gate lengths," Science 354.6308 (2016): 99-102.
Design Compiler Graphical. Synopsys, Inc. Accessed at https://www.synopsys.com/implementation-and-signoff/rtl-synthesis-test/design-compiler-graphical.html on Mar. 2, 2021. 6 pages.
Ding et al., "CMOS-based carbon nanotube pass-transistor logic integrated circuits." Nature communications 3.1 (2012): 1-7.
Ding et al., "Y-contacted high-performance n-type single-walled carbon nanotube field-effect transistors: scaling and comparison with Sc-contacted devices." Nano letters 9.12 (2009): 4209-4214.
Farmer et al., "Atomic layer deposition on suspended singie-walled carbon nanotubes via gas-phase noncovalent functionalization." Nano letters 6.4 (2006): 699-703.
Filipiak et al., "Molecular analysis of volatile metabolites released specifically by *Staphylococcus aureus* and Pseudomonas aeruginosa." BMC microbiology 12.1 (2012): 1-16.
Fowler et al., "Critical care capacity in Canada: results of a national cross-sectional study." Critical care 19.1 (2015): 1-8.
Fowler et al., "Surveillance for lower airway pathogens in mechanically ventilated patients by metabolomic analysis of exhaled breath: a case-control study." Thorax 70.4 (2015): 320-325.
Franklin et al., "Carbon nanotube complementary wrap-gate transistors." Nano letters 13.6 (2013): 2490-2495.
Franklin et al., "Scalable and fully self-aligned n-type carbon nanotube transistors with gate-all-around." Electron Devices Meeting (IEDM), 2012 IEEE International. IEEE, 2012. 4 pages.
Franklin et al., "Sub-10 nm carbon nanotube transistor." Nano letters 12.2 (2012): 758-762.
Geier et al., "Controlled n-type doping of carbon nanotube transistors by an organorhodium dimer." Nano letters 16.7 (2016): 4329-4334.
Geier et al., "Solution-processed carbon nanotube thin-film complementary static random access memory." Nature nanotechnology 10.11 (2015): 944. 6 pages.
Geier et al., Subnanowatt Carbon Nanotube Complementary Logic Enabled by Threshold Voltage Control. Nano Lett. 2013, 13, 4810-4814.
Gouma et al., "Novel isoprene sensor for a flu virus breath monitor." Sensors 17.1 (2017): 199. 7 pages.
Ha et al., Highly Uniform and Stable N-Type Carbon Nanotube Transistors by Using Positively Charged Silicon Nitride Thin Films. Nano Lett. 2015, 15, 392-397.
Hahn et al., "A scaled replacement metal gate InGaAs-on-Insulator n-FinFET on Si with record performance." Electron Devices Meeting (IEDM), 2017 IEEE International. IEEE, 2017, 4 pages.
HAN et al., "High-speed logic integrated circuits with solution-processed self-assembled carbon nanotubes." Nature nanotechnology 12.9 (2017): 861. 7 pages.
Heinze et al., Carbon Nanotubes as Schottky Barrier Transistors. Phys. Rev. Lett. 2002, 89, 106801. 4 pages.
High Purity, Electronically Separated Nanomaterials. NanoIntegris. Accessed at http://nanointegris.com/ on Feb. 13, 2020. 8 pages.
Hills et al., "Rapid Co-Optimization of Processing and Circuit Design to Overcome Carbon Nanotube Variations." IEEE Trans. on CAD of Integrated Circuits and Systems 34.7 (2015): 1082-1095.
Hills et al., "TRIG: hardware accelerator for inference-based applications and experimental demonstration using carbon nanotube FETs." Proceedings of the 55th Annual Design Automation Conference. 2018. 10 pages.
Hills et al., "Understanding energy efficiency benefits of carbon nanotube field-effect transistors for digital VLSI." IEEE Transactions on Nanotechnology 17.6 (2018): 1259-1269.
Hills et al., Modern microprocessor built from complementary carbon nanotube transistors. Nature 572.7771 (2019): 595-602.
Humphreys et al., "Electronic nose analysis of bronchoalveolar lavage fluid." European journal of clinical investigation 41.1 (2011): 52-58.

IC Compiler II. Synopsys, Inc. Accessed at https://www.synopsys.com/implementation-and-signoff/physical-implementation/ic-compiler.html on Mar. 2, 2021. 6 pages.
International Search Report and Written Opinion in International Application No. PCT/US2019/050286 dated May 19, 2020, 16 pages.
International Search Report and Written Opinion in International Application No. PCT/US19/15595 dated Apr. 19, 2019, 14 pages.
International Search Report and Written Opinion in International Patent Application No. PCT/US2019/1036006 dated Oct. 16, 2019, 13 pages.
International Search Report and Written Opinion in International Patent Application No. PCT/US2019/052675 dated Jan. 14, 2020, 16 pages.
International Search Report and Written Opinion in International Patent Application No. PCT/US2019/063932 dated Feb. 19, 2020, 14 pages.
Javey et al., "Ballistic carbon nanotube field-effect transistors." nature 424.6949 (2003): 654-657.
Joo et al., Dose-Controlled, Floating Evaporative Self-Assembly and Alignment of Semiconducting Carbon Nanotubes from Organic Solvents. Langmuir 2014, 30, 3460-3466.
Kalil et al., "Executive summary: management of adults with hospital-acquired and ventilator-associated pneumonia: 2016 clinical practice guidelines by the Infectious Diseases Society of America and the American Thoracic Society." Clinical Infectious Diseases 63.5 (2016): 575-582.
Kalil et al., "Management of adults with hospital-acquired and ventilator-associated pneumonia: 2016 clinical practice guidelines by the Infectious Diseases Society of America and the American Thoracic Society." Clinical Infectious Diseases 63.5 (2016): e61-e111.
Kang et al., CMOS digital integrated circuits. Tata McGraw-Hill Education, 2003. 83 pages.
Khan et al., "Science and research policy at the end of Moore's law." Nature Electronics 1.1 (2018): 14-21.
Kim et al., "Atomic layer deposited $Al_2O_3$ for gate dielectric and passivation layer of single-walled carbon nanotube transistors." Applied physics letters 90.16 (2007): 163108. 4 pages.
Koenig et al., "Ventilator-associated pneumonia: diagnosis, treatment, and prevention." Clinical microbiology reviews 19.4 (2006): 637-657.
Kollef et al., "Economic impact of ventilator-associated pneumonia in a large matched cohort." (2012), 9 pages.
Kuhn et al., The Ultimate CMOS Device and Beyond. In IEEE Int. Electron Devices Meet.; 2012; vol. 8.1.1?8.1. 4 pages.
Kuhn,. "Considerations for ultimate CMOS scaling." IEEE transactions on Electron Devices 59.7 (2012): 1813-1828.
Kuti et al., "Impact of inappropriate antibiotic therapy on mortality in patients with ventilator-associated pneumonia and blood stream infection: a meta-analysis." Journal of critical care 23.1 (2008): 91-100.
La Tulipe et al., "Upside-down FETS." SOI Conference, 2008. SOI. IEEE International, IEEE, 2008, 2 pages.
Lau et al., "Tunable n-type doping of carbon nanotubes through engineered atomic layer deposition HfOX films." ACS nano 12.11 (2018): 10924-10931.
Lee et al., "A compact virtual-source model for carbon nanotube FETs in the sub-10-nm regime—Part I: Intrinsic elements." IEEE transactions on electron devices 62.9 (2015): 3061-3069.
Li et al., "Facile method for enhancing conductivity of printed carbon nanotubes electrode via simple rinsing process." Organic Electronics 47 (2017): 174-180.
Library Design. Silvaco, Inc. Accessed at https://silvaco.com/services/library-design/ on Mar. 2, 2021. 4 pages.
Liebmann et al., "Overcoming scaling barriers through design technology cooptimization." VLSI Technology, 2016 IEEE Symposium on. IEEE, 2016. 2 pages.
Lin et al., "ACCNT—A metallic-CNT-tolerant design methodology for carbon-nanotube VLSI: Concepts and experimental demonstration." IEEE Transactions on Electron Devices 56.12 (2009): 2969-2978.

(56) References Cited

OTHER PUBLICATIONS

Liu et al., Carbon Nanotube-Based Three-Dimensional Monolithic Optoelectronic Integrated System. Nat. Commun. 2017, 8, 15649. 8 pages.

Machado et al., "Cost-effectiveness of linezolid versus vancomycin in mechanical ventilation-associated nosocomial pneumonia caused by methicillin-resistant *Staphylococcus aureus*." Brazilian Journal of Infectious Diseases 9.3 (2005): 191-200.

Markov et al., "Progress and challenges in VLSI placement research." Proceedings of the IEEE 103.11 (2015): 1985-2003.

Mcclellan et al., Effective N-Type Doping of Monolayer MoS2 by AlOx. In 2017 75th Annual Device Research Conference (DRC); IEEE, 2017; 1-2.

Melsen et al., "Attributable mortality of ventilator-associated pneumonia: a meta-analysis of individual patient data from randomised prevention studies." The Lancet infectious diseases 13.8 (2013): 665-671.

Mistry, 10 nm Technology Leadership. Leading at the edge technology and manufacturing day 2017. Intel. Accessed at https://newsroom.intel.com/newsroom/wp-content/uploads/sites/11/2017/03/Kaizad-Mistry-2017-Manufacturing.pdf. 37 pages.

Muscedere et al., "Mortality, attributable mortality, and clinical events as end points for clinical trials of ventilator-associated pneumonia and hospital-acquired pneumonia." Clinical infectious diseases 51.Supplement_1 (2010): S120-S125.

Nakhleh et al., "Diagnosis and classification of 17 diseases from 1404 subjects via pattern analysis of exhaled molecules." ACS nano 11.1 (2017): 112-125.

Narasimha et al., "A 7nm CMOS technology platform for mobile and high performance compute application." Electron Devices Meeting (IEDM), 2017 IEEE International. IEEE, 2017. 4 pages.

Niemetz, et al., Boolector 2.0. Journal on Satisfiability, Boolean Modeling and Computation 9 (2015) 53-58.

Nourbakhsh et al., "MoS2 field-effect transistor with sub-10 nm channel length." Nano letters 16.12 (2016): 7798-7806.

NVIDIA RISC-V Story. NVIDIA 4th RISC-V Workshop Jul. 2016. Accessed at https://riscv.org/wp-content/uploads/2016/07/Tue1100_Nvidia_RISCV_Story_V2.pdf. 15 pages.

Open Source RISC-V Cores and Tools. Bluespec. Accessed at https://bluespec.com/ on Feb. 13, 2020. 5 pages.

OpenSPARC Overview. Oracle Accessed at http://www.opensparc.net/opensparc-t2 on Feb. 13, 2020. 1 pages.

Patil et al., "VMR: VLSI-compatible metallic carbon nanotube removal for imperfection-immune cascaded multi-stage digital logic circuits using carbon nanotube FETs." 2009 IEEE International Electron Devices Meeting (IEDM). IEEE, 2009. 4 pages.

Patil et al., "Wafer-scale growth and transfer of aligned single-walled carbon nanotubes." IEEE Transactions on Nanotechnology 8.4 (2009): 498-504.

Patterson, "50 Years of computer architecture: From the mainframe CPU to the domain-specific tpu and the open RISC-V instruction set." 2018 IEEE International Solid-State Circuits Conference-(ISSCC). IEEE, 2018. 5 pages.

Phillips et al., "Variation in volatile organic compounds in the breath of normal humans." Journal of Chromatography B: Biomedical Sciences and Applications 729.1-2 (1999): 75-88.

Prakash et al., Understanding Contact Gating in Schottky Barrier Transistors from 2D Channels. Sci. Rep. 2017, 7, 12596. 9 pages.

PrimeTime Static Timing Analysis. Synopsys, Inc. Accessed at https://www.synopsys.com/implementation-and-signoff/ signoff/primetime.html on Mar. 2, 2021. 7 pages.

Qiu et al., "Scaling carbon nanotube complementary transistors to 5-nm gate lengths." Science355.6322 (2017): 271-276.

Rai et al., Air Stable Doping and Intrinsic Mobility Enhancement in Monolayer Molybdenum Disulfide by Amorphous Titanium Suboxide Encapsulation, Nano Lett. 2015, 15, 4329-4336.

Rai et al., Interfacial-Oxygen-Vacancy Mediated Doping of MoS2 by high-k dielectrics. In 2015 73rd Annual Device Research Conference (DRC); IEEE, 2015; 189-190.

Rana et al., "A review on recent advances of CNTs as gas sensors." Sensor Review (2017). 12 pages.

Sabry et al., Energy-Efficient Abundant-Data Computing: The N3XT 1,000x. Computer (Long. Beach. Calif). 2015.

Safdar et al., "The pathogenesis of ventilator-associated pneumonia: its relevance to developing effective strategies for prevention." Respiratory care 50.6 (2005): 725-741.

Schnabel et al., "Electronic nose analysis of exhaled breath to diagnose ventilator-associated pneumonia." Respiratory medicine 109.11 (2015): 1454-1459.

Semiconductor Industry Association. "International Technology Roadmap for Semiconductors (2013)." Downloaded from http://www.itrs2.net/itrs-reports.html on Feb. 24, 2020. 237 pages.

Sentaurus Device. Synopsys, Inc.. Accessed at https://www.synopsys.com/silicon/tcad/device-simulation/sentaurus- device.html on Mar. 2, 2021. 3 pages.

Seo et al., "A 10nm platform technology for low power and high performance application featuring FINFET devices with multi workfunction gate stack on bulk and SOI" VLSI Technology (VLSI-Technology): Digest of Technical Papers, 2014 Symposium on. IEEE, 2014. 2 pages.

Shahrjerdi et al., "High-performance air-stable n-type carbon nanotube transistors with erbium contacts." ACS nano 7.9 (2013): 8303-8308.

Sherazi et al., "Track height reduction for standard-cell in below 5nm node: how low can you go?." Design-Process-Technology Co-optimization for Manufacturability XII. vol. 10588. International Society for Optics and Photonics, 2018. 14 pages.

Shulaker et al., "Carbon nanotube circuit integration up to sub-20 nm channel lengths." ACS nano 8.4 (2014): 3434-3443.

Shulaker et al., "Carbon nanotube computer." Nature 501.7468 (2013): 526-530.

Shulaker et al., "Efficient metallic carbon nanotube removal for highly-scaled technologies," 2015 IEEE International Electron Devices Meeting (IEDM). IEEE, 2015. 4 pages.

Shulaker et al., "Experimental demonstration of a fully digital capacitive sensor interface built entirely using carbon-nanotube FETs." 2013 IEEE International Solid-State Circuits Conference Digest of Technical Papers. IEEE, 2013. 3 pages.

Shulaker et al., "Linear increases in carbon nanotube density through multiple transfer technique." Nano letters 11.5 (2011): 1881-1886.

Shulaker et al., "Monolithic 3D integration of logic and memory: Carbon nanotube FETs, resistive RAM, and silicon FETs." 2014 IEEE International Electron Devices Meeting. IEEE, 2014. 4 pages.

Shulaker et al., "Monolithic three-dimensional integration of carbon nanotube FETs with silicon CMOS." 2014 Symposium on VLSI Technology (VLSI-Technology): Digest of Technical Papers. IEEE, 2014. 2 pages.

Shulaker et al., "Sensor-to-digital interface built entirely with carbon nanotube FETs." IEEE Journal of Solid-State Circuits 49.1 (2013): 190-201.

Shulaker et al., "Three-dimensional integration of nanotechnologies for computing and data storage on a single chip." Nature 547.7661 (2017): 74. 19 pages.

Shulaker et al., High-Performance Carbon Nanotube Field-Effect Transistors. In 2014 IEEE International Electron Devices Meeting; IEEE, 2014; 33.6.1-33.6.4.

Si et al., "Scalable preparation of high-density semiconducting carbon nanotube arrays for high-performance field-effect transistors." ACS nano 12.1 (2018): 627-634.

Spectre Simulation Platform. Cadence Design Systems, Inc. Accessed at https://www.cadence.com/en_US/home/ tools/custom-ic-analog-rf-design/circuit-simulation/spectre-simulation-platform.html on Mar. 2, 2021. 3 pages.

Spike, a RISC-V ISA Simulator. Github. Accessed at https://github.com/riscv/riscv-isa-sin on Feb. 13, 2020. 6 pages.

Suriyasena Liyanage et al., VLSI-Compatible Carbon Nanotube Doping Technique with Low Work-Function Metal Oxides. Nano Lett. 2014, 14, 1834-1890.

Tang et al., "Flexible CMOS integrated circuits based on carbon nanotubes with sub-10 ns stage delays." Nature Electronics 1.3 (2018): 191-196.

(56) References Cited

OTHER PUBLICATIONS

Tans et al., "Room-temperature transistor based on a single carbon nanotube." Nature 393.6680 (1998): 49-52.
TCAD—Raphael. Synopsys, Inc. Accessed at htttps://www.synopsys.com/silicon/tcad/interconnect-simulation/raphael.html on Mar. 2, 2021. 4 pages.
Tracer—Electron scattering and process effects quantified. GenISys GmbH 2017. Accessed at https://www.genisys-gmbh.com/tracer.html on Mar. 2, 2021. 6 pages.
TruNarc. HazmatLINK. Accessed at http://www.hazmatlink.com/trunarc.html on Mar. 2, 2021. 2 pages.
Tulevski et al., "High purity isolation and quantification of semiconducting carbon nanotubes via column chromatography." ACS nano 7.4 (2013): 2971-2976.
Tulevski et al., "Toward high-performance digital logic technology with carbon nanotubes." ACS nano 8.9 (2014): 8730-8745.
Understand, Predict, and Optimize Physics-Based Designs and Processes with COMSOL Muitiphysics®. COMSOL MULTIPHYSICS®. Accessed at https://www.comsol.com/comsol-multiphysics on Mar. 2, 2021. 16 pages.
Valsaraj et al., Theoretical and Experimental Investigation of Vacancy-Based Doping of Monolayer MoS 2 on Oxide. 2D Mater. 2015, 2, 045009. 12 pages.
Venkatachalam et al., "The diagnostic dilemma of ventilator-associated pneumonia in critically ill children." Pediatric Critical Care Medicine 12.3 (2011): 286-296.
Vinet et al., "3D monolithic integration: Technological challenges and electrical results." Microelectronic Engineering88.4 (2011): 331-335.
Wang et al., "Growing highly pure semiconducting carbon nanotubes by electrotwisting the helicity." Nature Catalysis 1.5 (2018): 326-331.
Wang et al., "National trends in patient safety for four common conditions, 2005-2011." N Engl J Med 370 (2014): 341-351.
Wei et al. "A non-iterative compact model for carbon nanotube FETs incorporating source exhaustion effects." 2009 IEEE International Electron Devices Meeting (IEDM). IEEE, 2009. 4 pages.
Western Digital to Accelerate the Future of Next-Generation Computing Architectures for Big Data and Fast Data Environments. Western Digital Nov 28, 2017. Accessed at https://www.westerndigital.com/company/newsroom/press-releases/2017/2017-11-28-western-digital-to-accelerate-the-future-of-next-generation-computing-architectures-for-big-data-and-fast-data-environments. 7 pages.
Wolf, RISC-V Formal Verification Framework. Github. Accessed at https://github.com/cliffordwolf/riscv-formal. 2 pages.
Wolf, SymbiYosys (sby)—Front-end for Yosys-based formal verification flows. Github. Accessed at https://github.com/YosysHQ/SymbiYosys on Feb. 13, 2020. 1 pages.
Won et al., "Zipping, entanglement, and the elastic modulus of aligned single-walled carbon nanotube films." Proceedings of the National Academy of Sciences 110.51 (2013): 20426-20430.
Wong et al.,"Memory leads the way to better computing." Nature nanotechnology 10.3 (2015): 191-194.
Wu et al., "Brain-inspired computing exploiting carbon nanotube FETs and resistive RAM: Hyperdimerisional computing case study." 2018 IEEE International Solid-State Circuits Conference-(ISSCC). IEEE, 2018, pp. 492-494.

Wu et al., "Hyperdimensional computing exploiting carbon nanotube FETs, resistive RAM, and their monolithic 3D integration." IEEE Journal of Solid-State Circuits 53.11 (2018): 3183-3196.
Xu et al., "Efficient and reversible electron doping of semiconductor-enriched single-walled carbon nanotubes by using decamethylcobaltocene." Scientific reports 7.1 (2017): 1-10.
Yakimets et al., "Power aware FinFET and lateral nanosheet FET targeting for 3nm CMOS technology." Electron Devices Meeting (IEDM), 2017 IEEE International. IEEE, 2017. 4 pages.
Yang et al., "High-performance complementary transistors and medium-scale integrated circuits based on carbon nanotube thin films." ACS nano 11.4 (2017): 4124-4132.
Yoshida et al., "Highly conductive metal gate fill integration solution for extremely scaled RMG stack for 5 nm & beyond." Electron Devices Meeting (IEDM), 2017 IEEE International. IEEE, 2017. 4 pages.
Zhang et al., "Air-stable conversion of separated carbon nanotube thin-film transistors from p-type to n-type using atomic layer deposition of high-κ oxide and its application in CMOS logic circuits." Acs Nano 5.4 (2011): 3284-3292.
Zhang et al., "Carbon nanotube correlation: promising opportunity for CNFET circuit yield enhancement." Proceedings of the 47th Design Automation Conference. 2010. 4 pages.
Zhang et al., "Doping-free fabrication of carbon nanotube based ballistic CMOS devices and circuits." Nano Letters 7.12 (2007): 3603-3607.
Zhang et al., "High-performance carbon nanotube complementary electronics and integrated sensor systems on ultrathin plastic foil." ACS nano 12.3 (2018): 2773-2779.
Zhang et al., "Selective etching of metallic carbon nanotubes by gas-phase reaction." Science 314.5301 (2006): 974-977.
Zhao et al., "Sub-10 nm diameter InGaAs vertical nanowire MOSFETs." Electron Devices Meeting (IEDM), 2017 IEEE International. IEEE, 2017. 4 pages.
Zhong et al., "Solution-processed carbon nanotubes based transistors with current density of 1.7 rnA|μm and peak transconductance of 0.8 mS/μm." 2017 IEEE International Electron Devices Meeting (IEDM). IEEE, 2017. 5 pages.
Ebrahimi et al., "Monolithic 3D integration advances and challenges: From technology to system levels" 2014 SOI-3D-Subthreshold Microelectronics Technology Unified Conference (S3S). IEEE, 2014. 2 pages.
Extended European Search Report in European Patent Application No. 19814933.8 dated Dec. 23, 2021, 8 pages.
Chinese Notification of Allowance and Search Report with English Translation in Chinese Application No. 201980058941.1 dated Jun. 1, 2022, 6 pages.
Wei et al. Carbon nanotube circuits: Opportunities and challenges. EDAA (2013)IEEE, 2013. 6 pages.
Chen, A Breath Sensor Based on Carbon Nanotubes and System Design, Journal of Zhengzhou University (Natural Science Edition) Year 2010, Issue 3, pp. 80-83.
Office Action and Search Report (with translation) in Chinese App. 201980050247.5 dated Dec. 5, 2022, 21 pages.
Schnabel et al. "Analysis of volatile organic compounds in exhaled breath to diagnose ventilator-associated pneumonia." Scientific Reports 5.1 (2015): 1-10.
Second Office Action (with translation) in Chinese App. 201980050247.5 dated Jun. 21, 2023, 15 pages.

\* cited by examiner

FIG. 1A
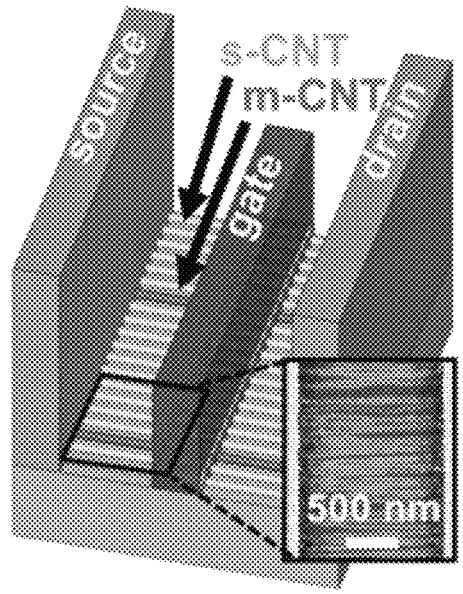
FIG. 1B
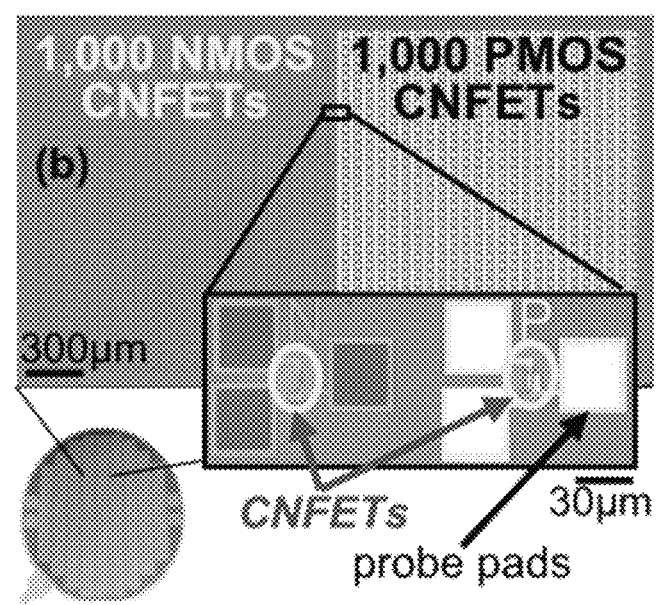
FIG. 1C
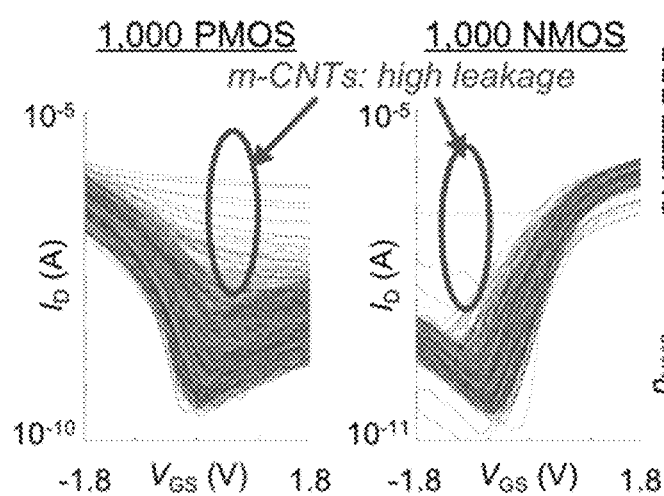
FIG. 1D
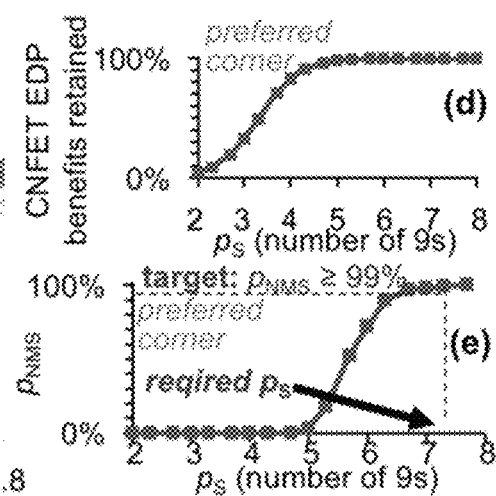
FIG. 1E

FIG. 2A
FIG. 2C
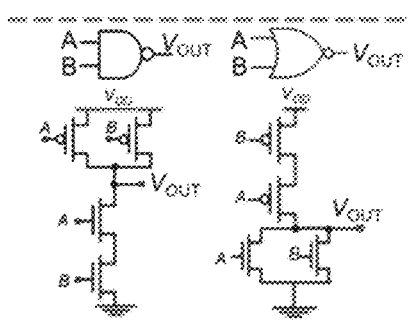
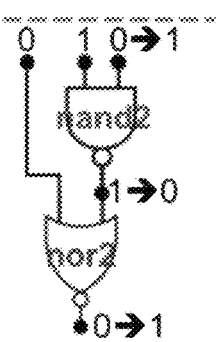
FIG. 2B
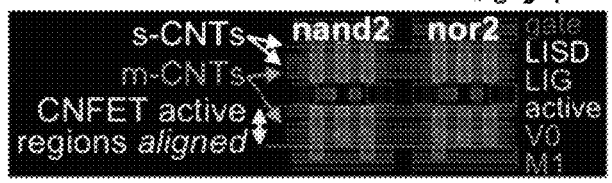
FIG. 2D
FIG. 2E
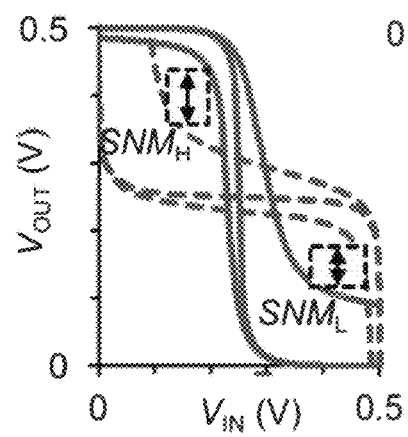
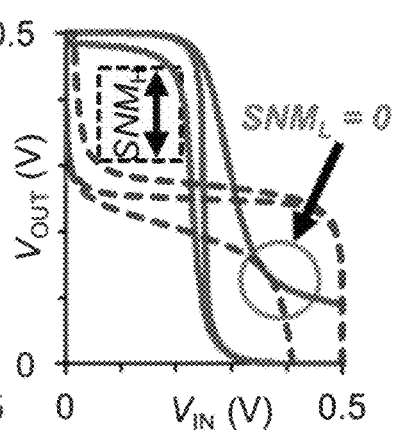
FIG. 2F
FIG. 2G
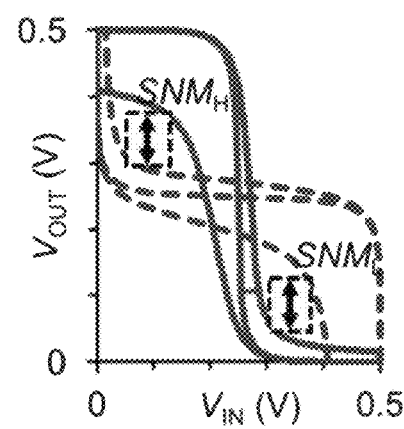
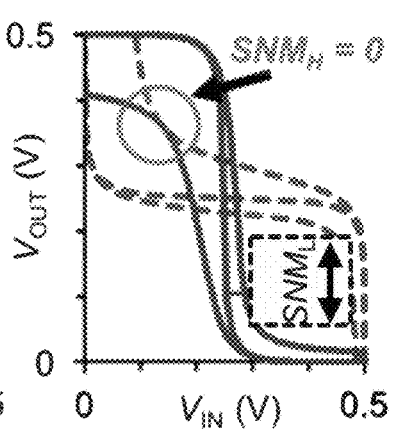

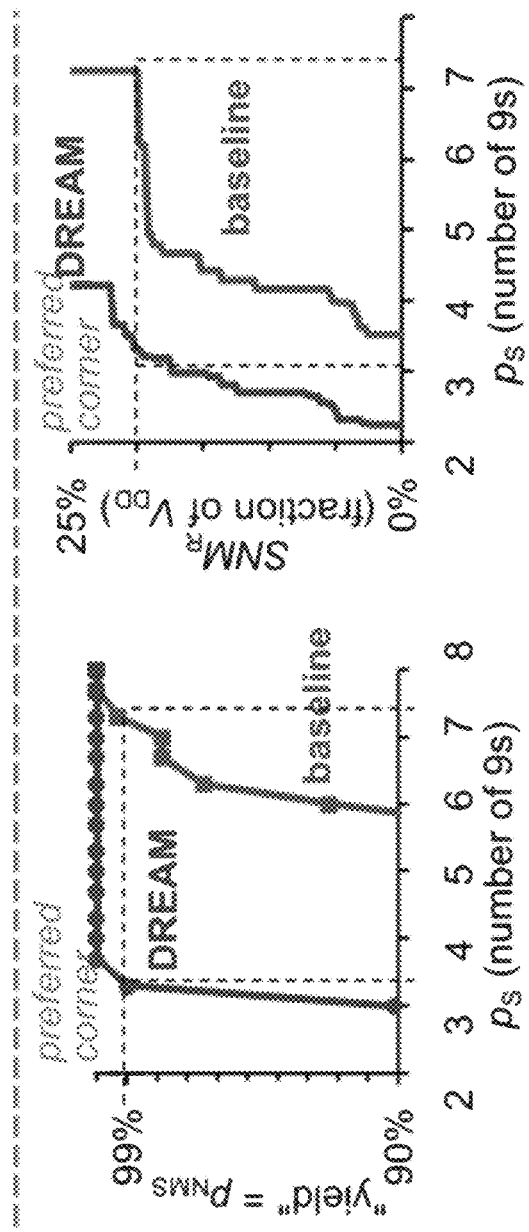
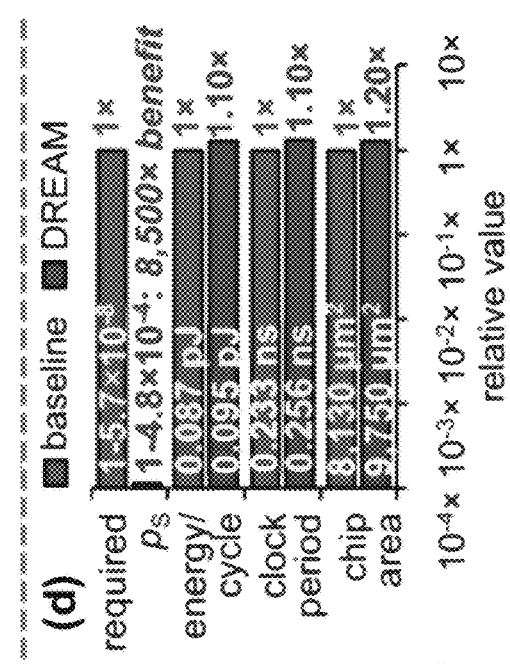
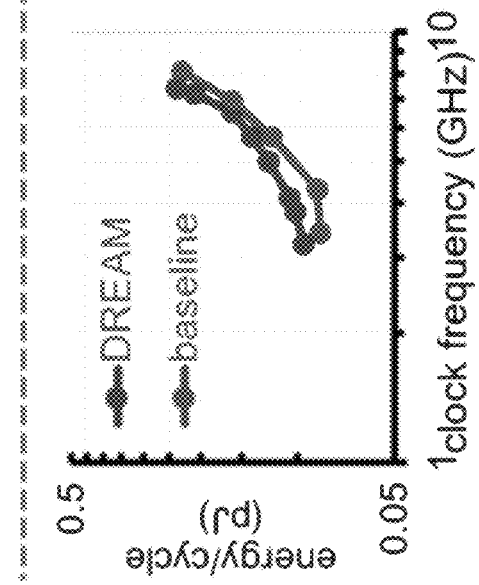
FIG. 4A  FIG. 4B  FIG. 4C  FIG. 4D

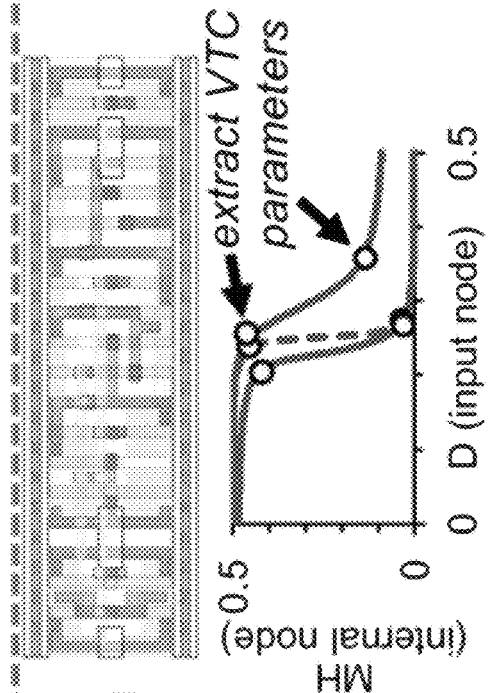
FIG. 6A
FIG. 6B
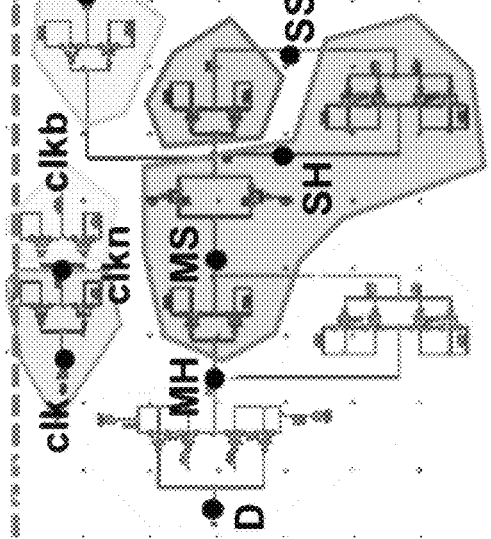
FIG. 6C
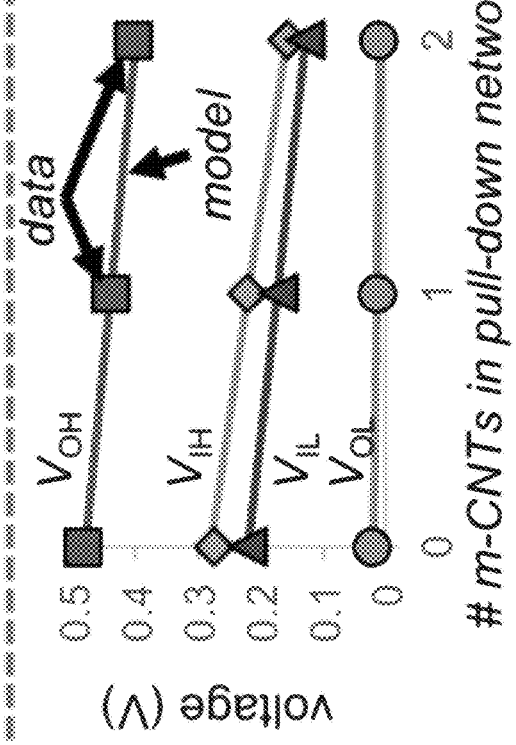
FIG. 6D
FIG. 6E
affine model:
$$\begin{bmatrix} V_{OH} \\ V_{IH} \\ V_{IL} \\ V_{OL} \end{bmatrix} = T \begin{bmatrix} 1 \\ M_1 \\ \vdots \\ M_r \end{bmatrix}$$
$$T \in \mathcal{R}^{4 \times (r+1)}$$

FIG. 9B
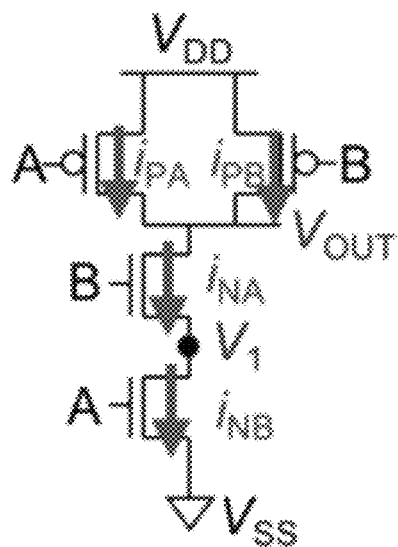
FIG. 9C  VTC: $i_{PD} == i_{PU}$
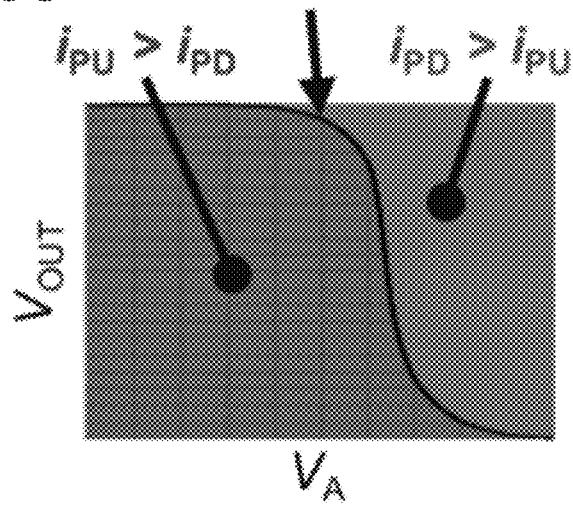
FIG. 10
| parameter | value |
|---|---|
| technology node | "7 nm" |
| contacted gate pitch | 54 nm |
| gate, contact length | 9 nm, 9 nm |
| contact resistance | 3.3 kΩ/CNT |
| equivalent oxide thickness (EOT) | 0.7 nm |
| CNT pitch, diameter | 2 nm, 1.7 nm |
| m-CNT resistance | 40 kΩ |
| $I_{OFF}$ target | 100 nA/μm |

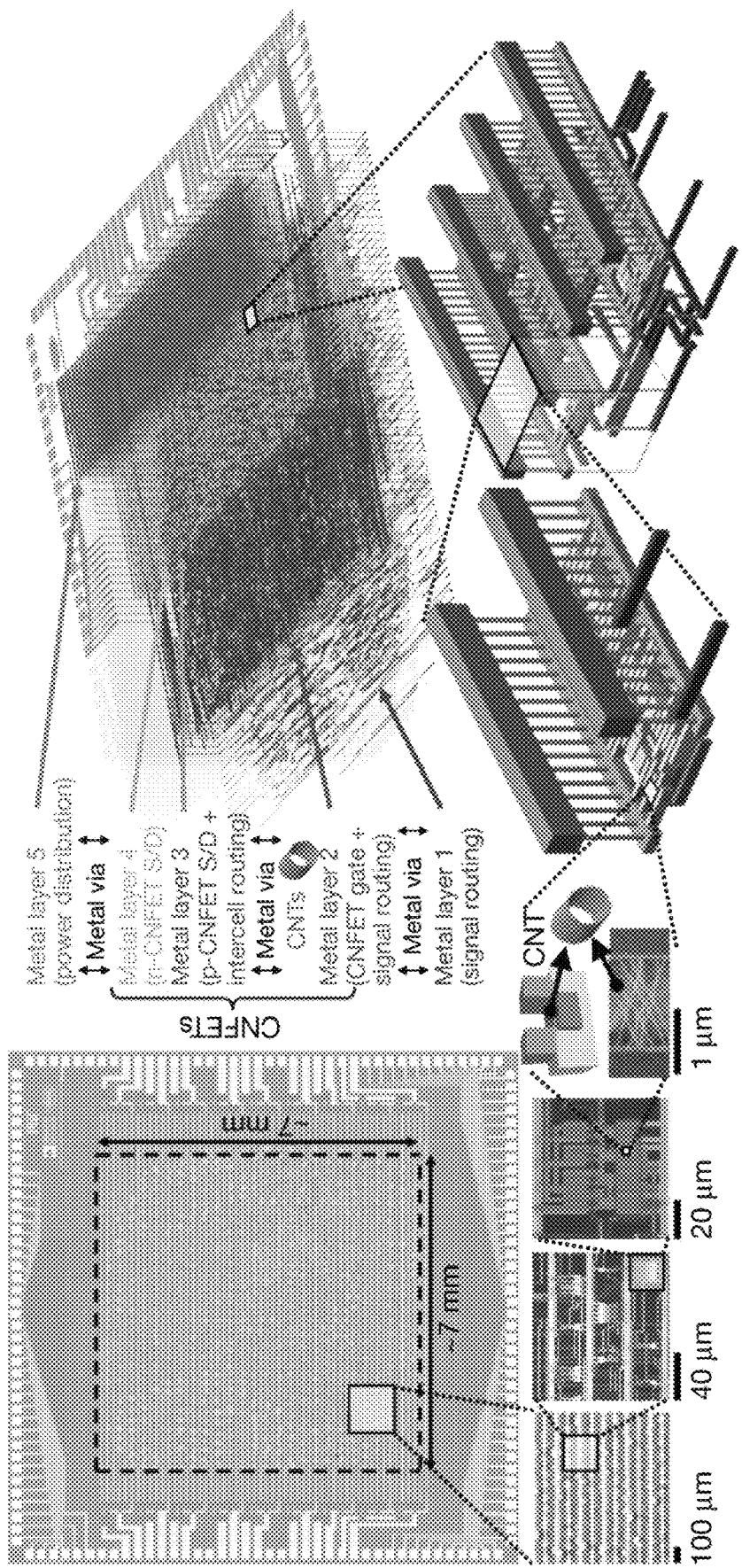

FIG. 12B-contd.
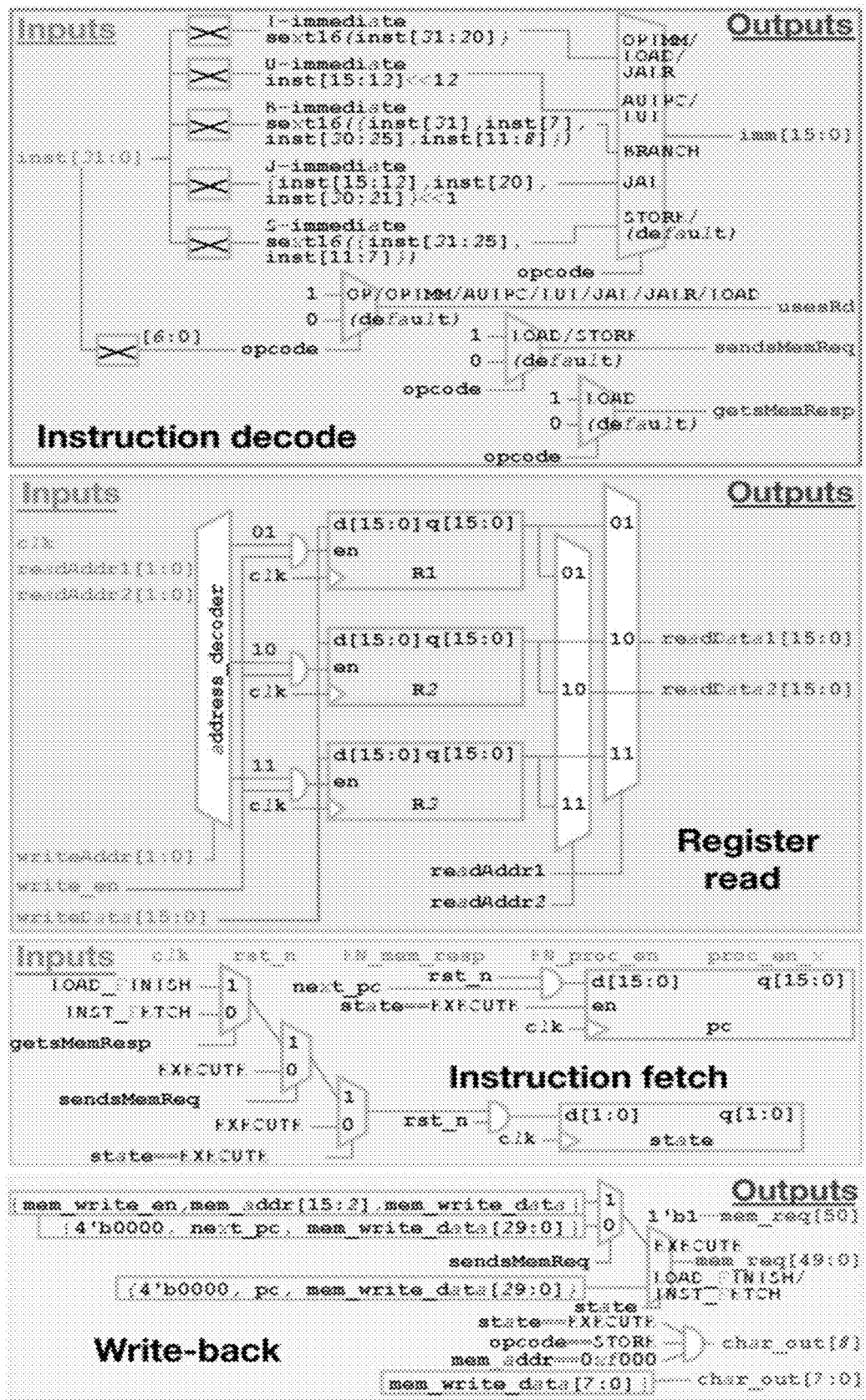

FIG. 14B
FIG. 14C
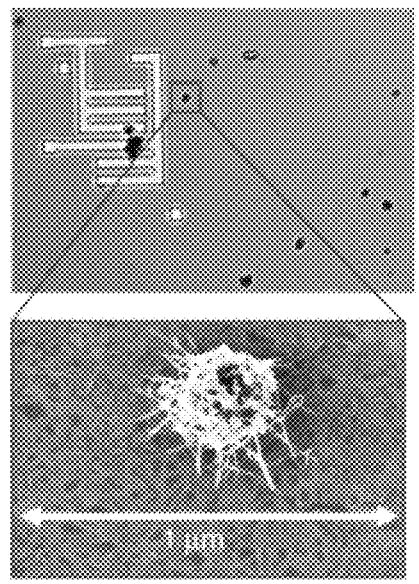
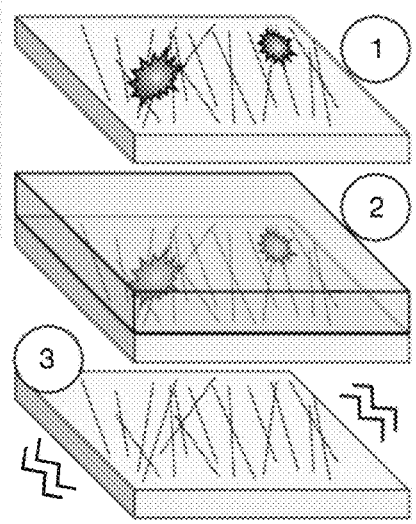
FIG. 14D
FIG. 14E
FIG. 14F
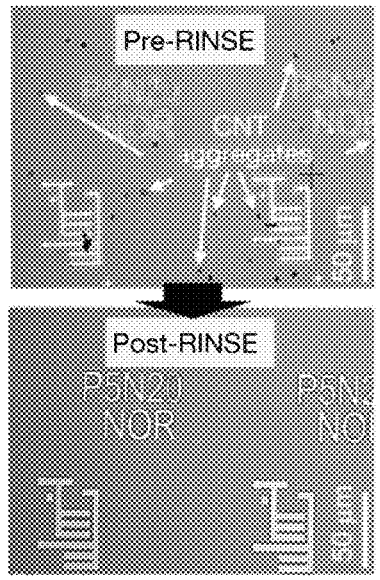
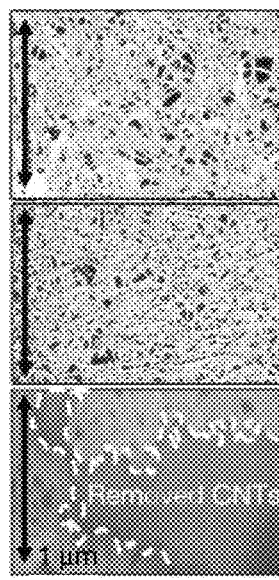
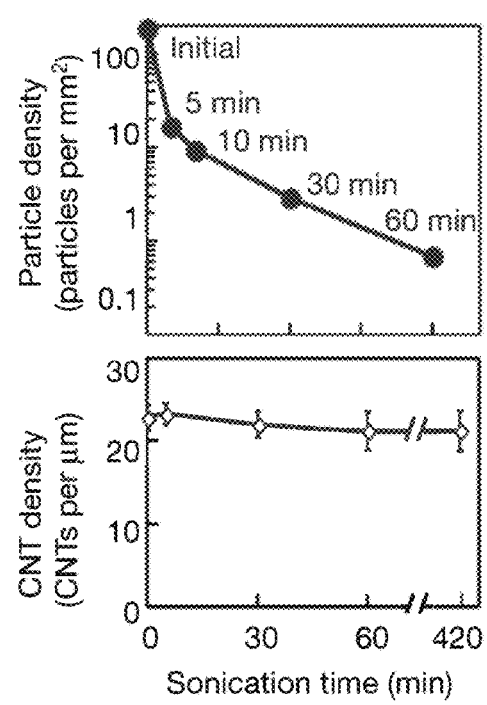
FIG. 14G

| SNM (mV) | | Loading logic stage | | | | | | |
|---|---|---|---|---|---|---|---|---|
| | | (1) | (2) | (3) | (4) | (5) | ... | (n) |
| Driving logic stage | (1) and3stage2 | n/a | 137 | 137 | 111 | 111 | | 139 |
| | (2) nand2 | 133 | 136 | 108 | 111 | 82 | | 113 |
| | (3) nor2 | 133 | 108 | 136 | 82 | 111 | | 111 |
| | (4) and3stage1 | 91 | n/a | n/a | n/a | n/a | | n/a |
| | (5) nor3 | 91 | 66 | 96 | 40 | 99 | | 69 |
| | ... | | | | | | | |
| | (n) oai21 | 132 | 110 | 107 | 84 | 82 | | 112 |

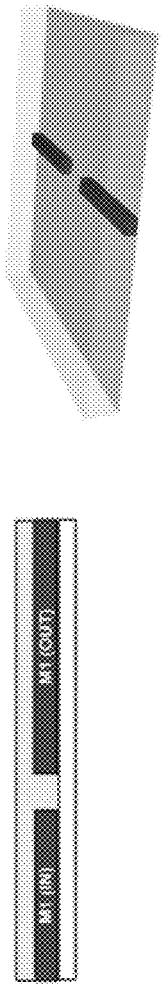
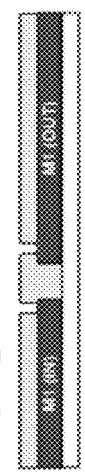
FIG. 17A  M1 metal layer: for signal routing
FIG. 17B  Interlayer Dielectric (300 °C)
FIG. 17C  Via definition (M1 to M2): BCl₃/Cl₂ Reactive Ion Etch
FIG. 17D  M2 metal layer: for signal routing + local bottom gates

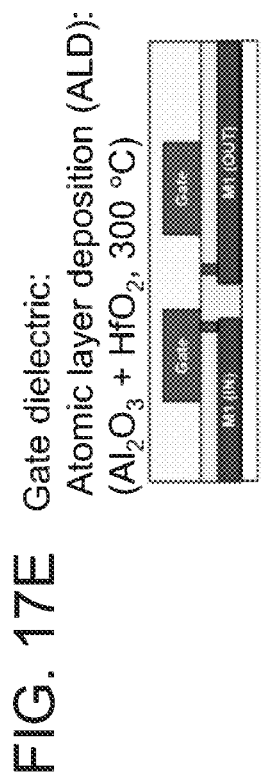
FIG. 17E  Gate dielectric:
Atomic layer deposition (ALD):
($Al_2O_3$ + $HfO_2$, 300 °C)
FIG. 17F  Via definition (M2 to M3):
$BCl_3/Cl_2$ Reactive Ion Etch
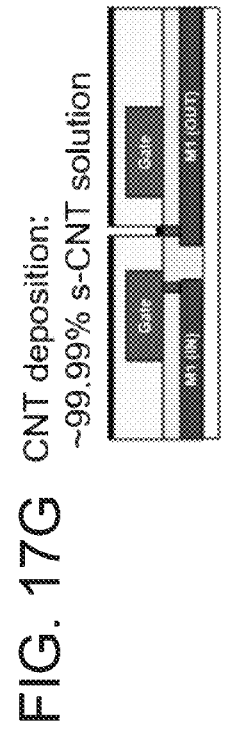
FIG. 17G  CNT deposition:
~99.99% s-CNT solution
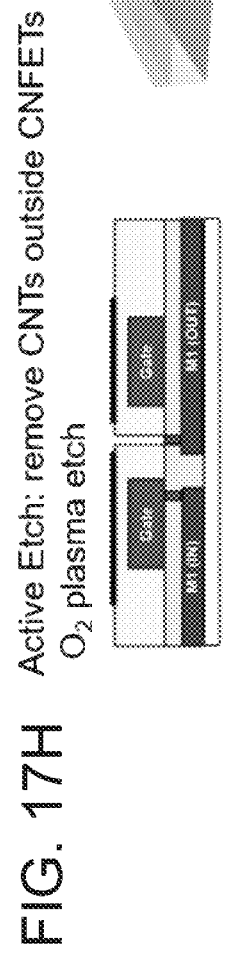
FIG. 17H  Active Etch: remove CNTs outside CNFETs
$O_2$ plasma etch

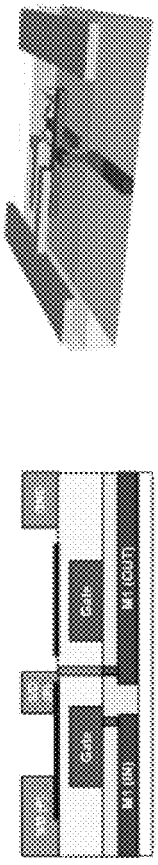
FIG. 17I  M3 metal layer: for PMOS source/drain 0.6 nm Titanium / 85 nm Platinum
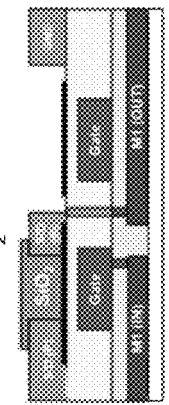
FIG. 17J  PMOS passivation: 100 nm SiO$_2$
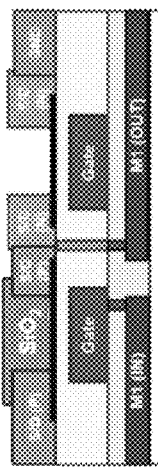
FIG. 17K  M4 metal layer: NMOS source/drain 90 nm Titanium
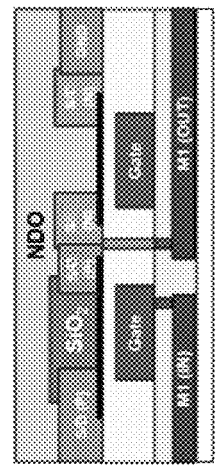
FIG. 17L  Nonstoichiometric doping oxide (NDO): ALD HfO$_X$ (20 nm, 200 °C)

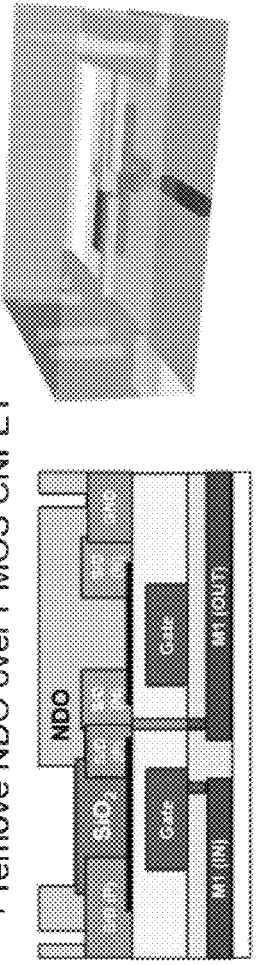
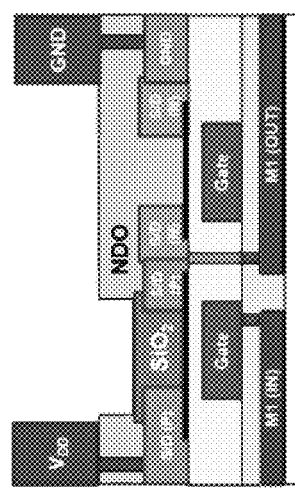
FIG. 17M  Via definition (M4 to M5): + remove NDO over PMOS CNFET
FIG. 17N  M5 metal layer: power distribution

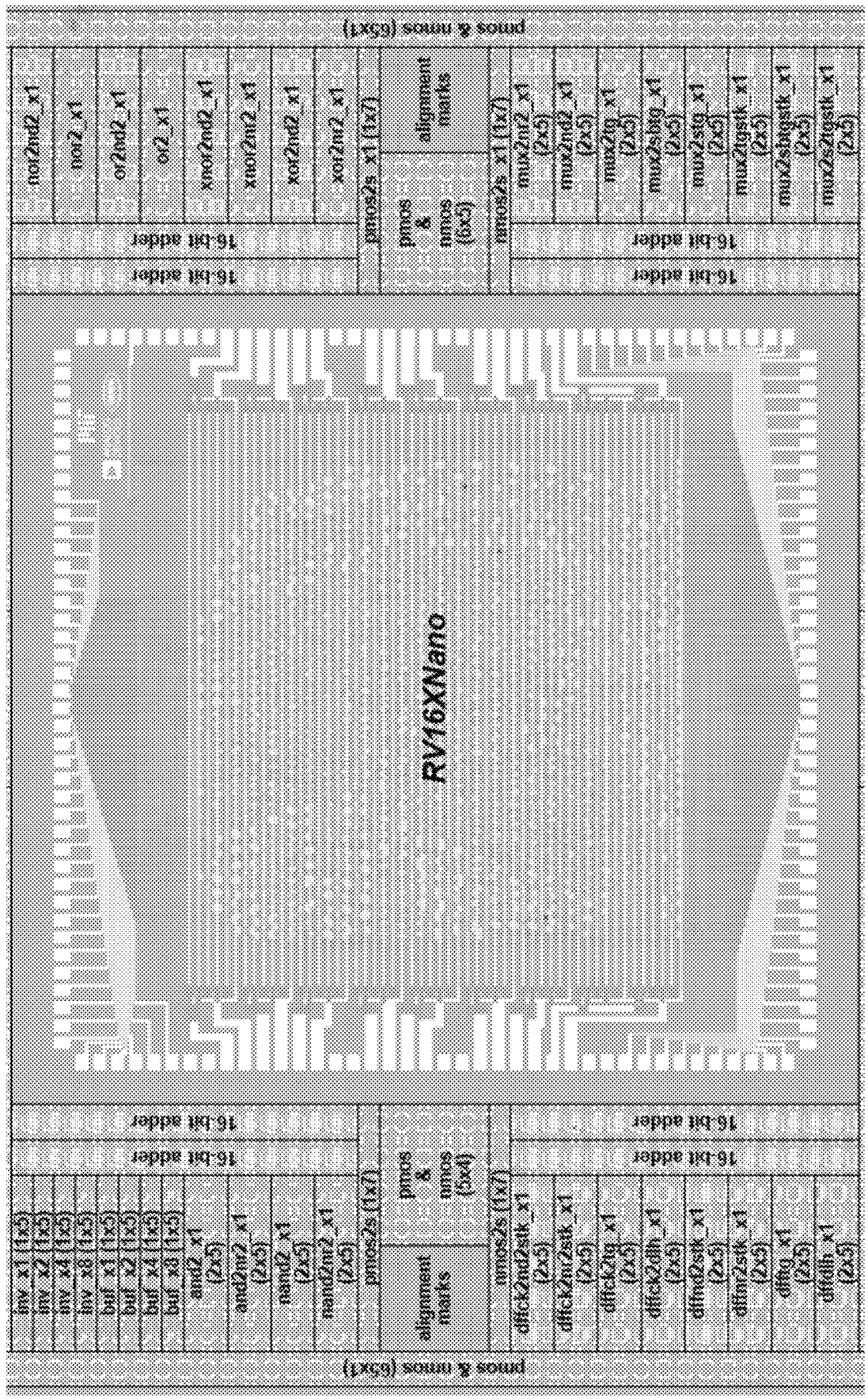
FIG. 18-contd.

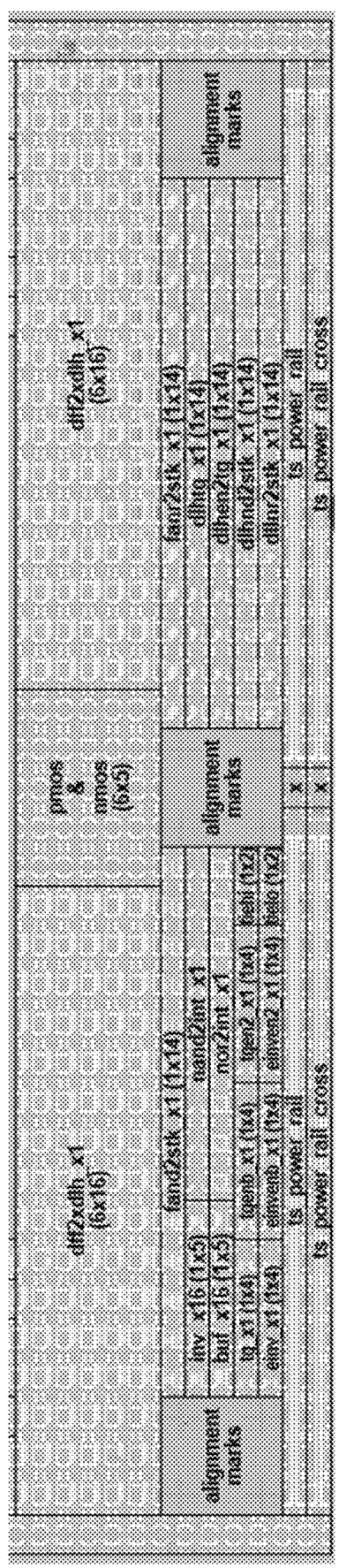
FIG. 18-contd.

FIG. 19-contd.

| Cell | Description |
|---|---|
| dlhtg_x1 | high-enable D-latch (comprising transmission gates) inverted enable generated internally |
| dlinv2stk_x1 | high-enable D-latch (comprising not2/inv logic stages) |
| einv_x1 | tri-state inverter, inverted enable generated internally |
| einve2_x1 | tri-state inverter, input enable and inverted enable |
| einveb_x1 | tri-state inverter, enable (and inverted enable buffered internally) |
| fax2stk_x1 | full-adder (comprising nand2/inv logic stages) |
| fanr2stk_x1 | full-adder (comprising nor2/inv logic stages) |
| fill_x1 | fill cell (extends power rails), size 1x |
| fill_x2 | fill cell (extends power rails), size 2x |
| fill_x4 | fill cell (extends power rails), size 4x |
| fill_x8 | fill cell (extends power rails), size 8x |
| fill_x16 | fill cell (extends power rails), size 16x |
| inv_x1 | inverter, drive strength 1x |
| inv_x2 | inverter, drive strength 2x |
| inv_x4 | inverter, drive strength 4x |
| inv_x8 | inverter, drive strength 8x |
| inv_x16 | inverter, drive strength 16x |
| mx2nnd_x1 | 2-input multiplexer (comprising nand2/inv logic stages) |
| mx2nr2_x1 | 2-input multiplexer (comprising nor2/inv logic stages) |
| mx2tg_x1 | 2-input multiplexer (comprising transmission gates), input select and inverted select |
| mx2s2tgs1h_x1 | 2-input multiplexer (comprising transmission gates), input selected and inverted select, 2x cell height |
| mx2tgs1_x1 | 2-input multiplexer (comprising transmission gates), select (and inverted select) buffered internally |
| mx2s2tgstk_x1 | 2-input multiplexer (comprising transmission gates), select (and inverted select) buffered internally, 2x cell height |
| mx2tg_x1 | 2-input multiplexer (comprising transmission gates) inverted select generated internally |

FIG. 19-contd.

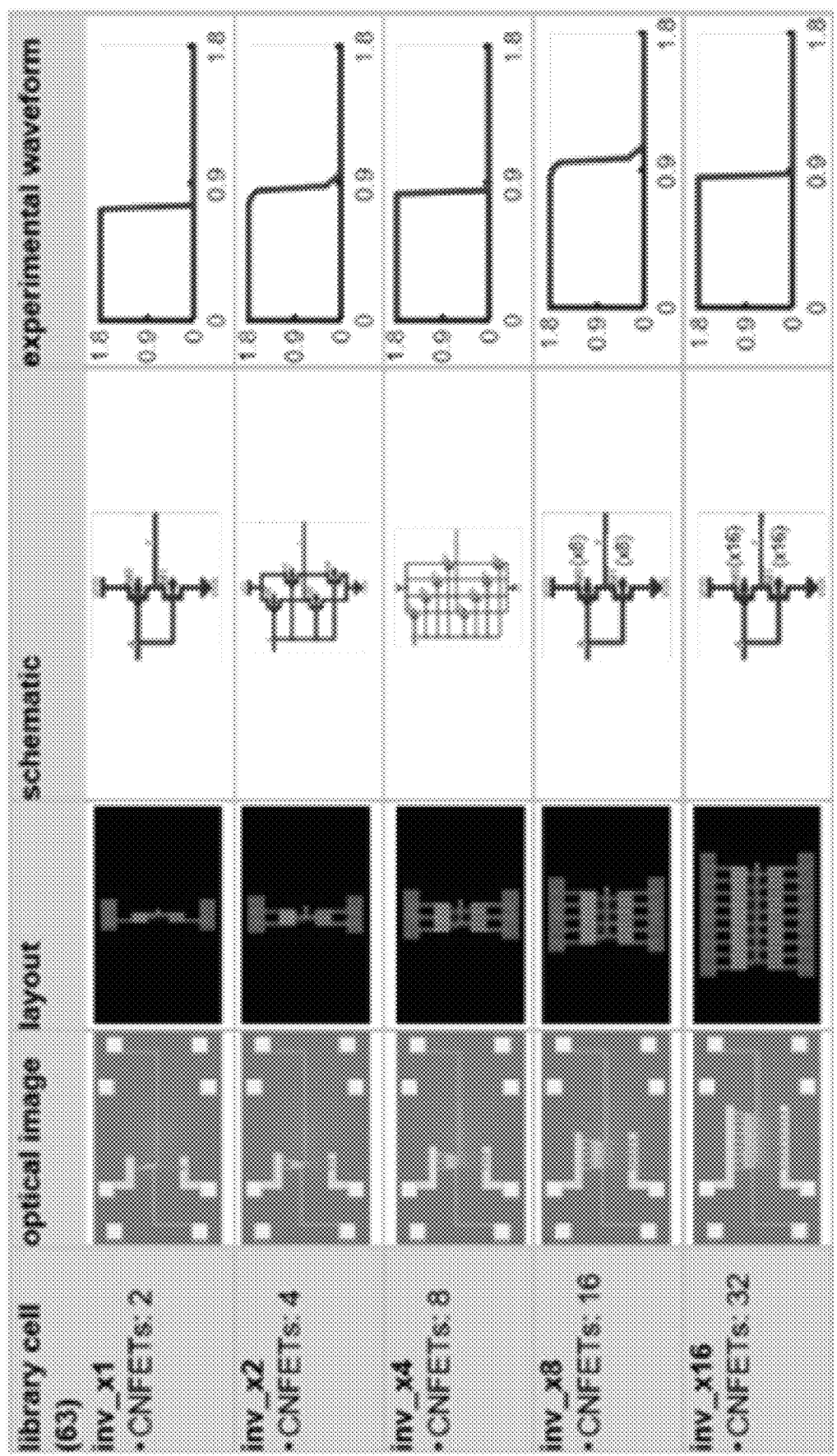
FIG. 19-contd.

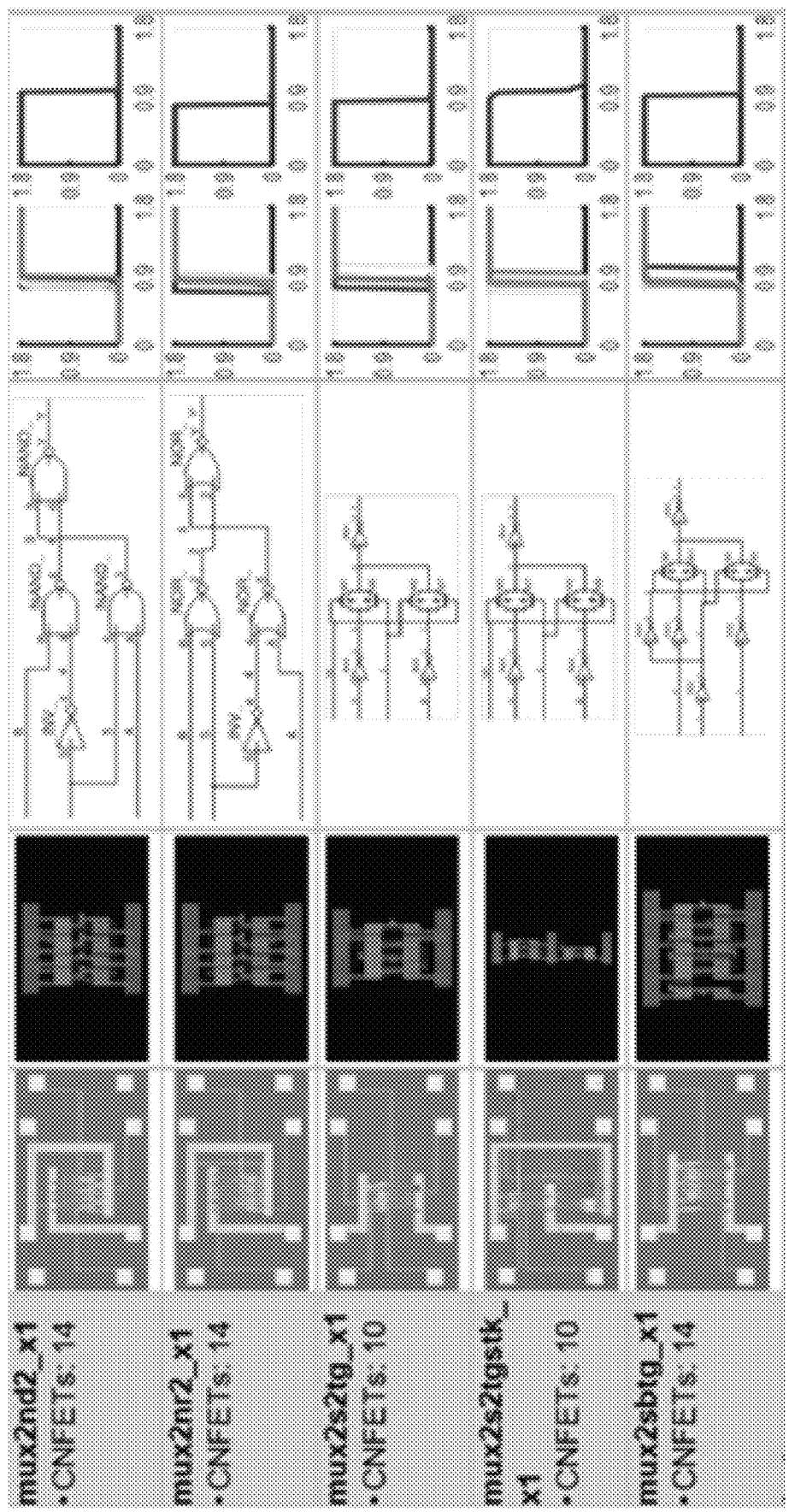
FIG. 19-contd.

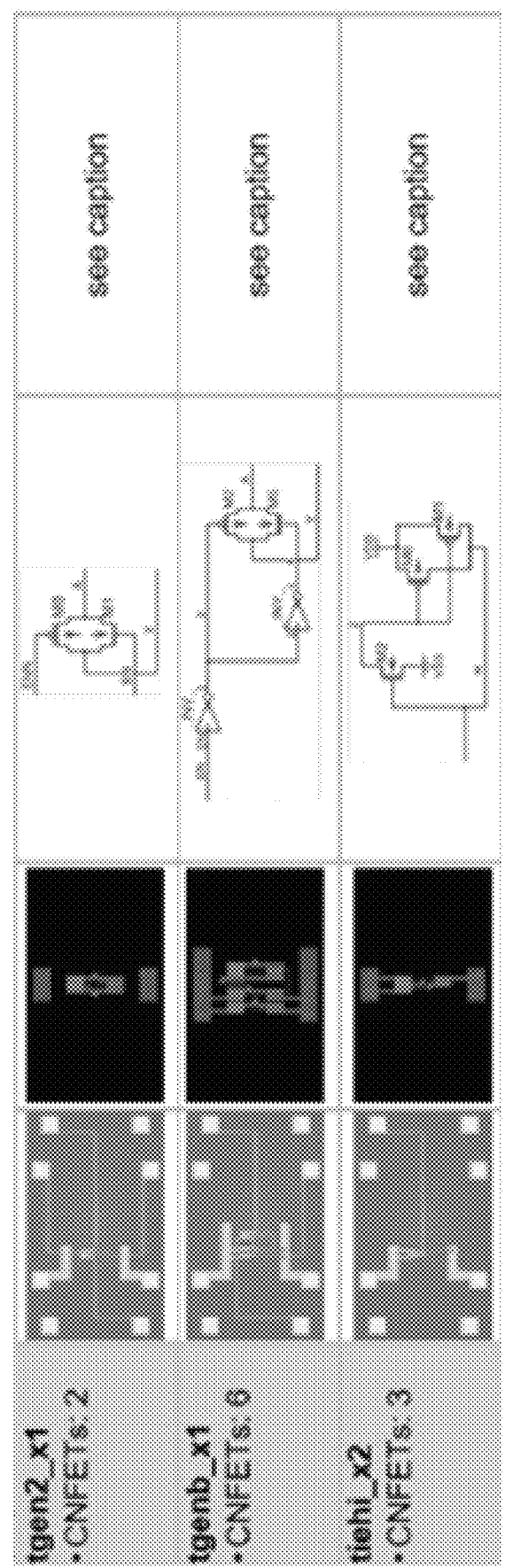
FIG. 19-contd.

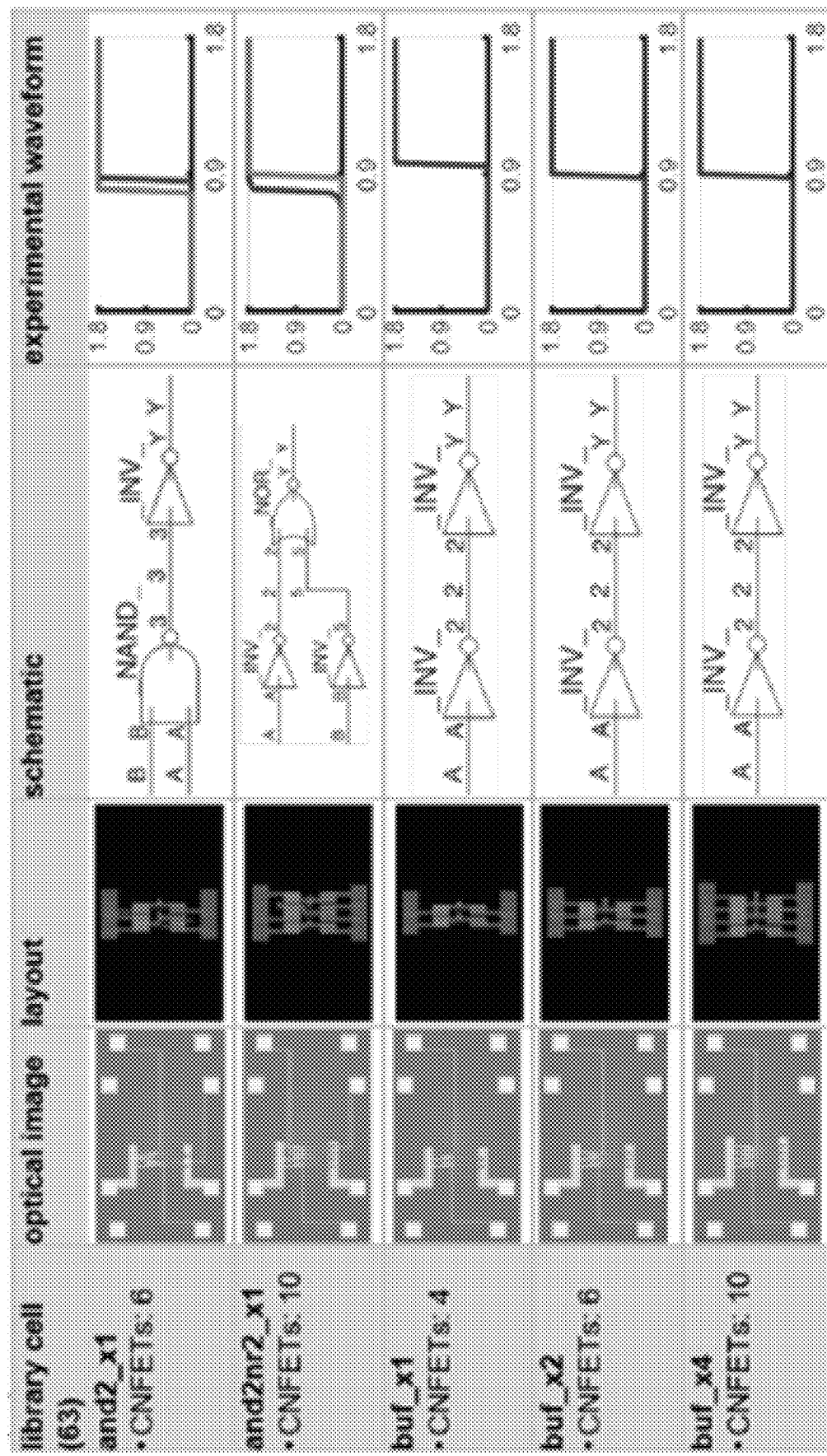
FIG. 19-contd.

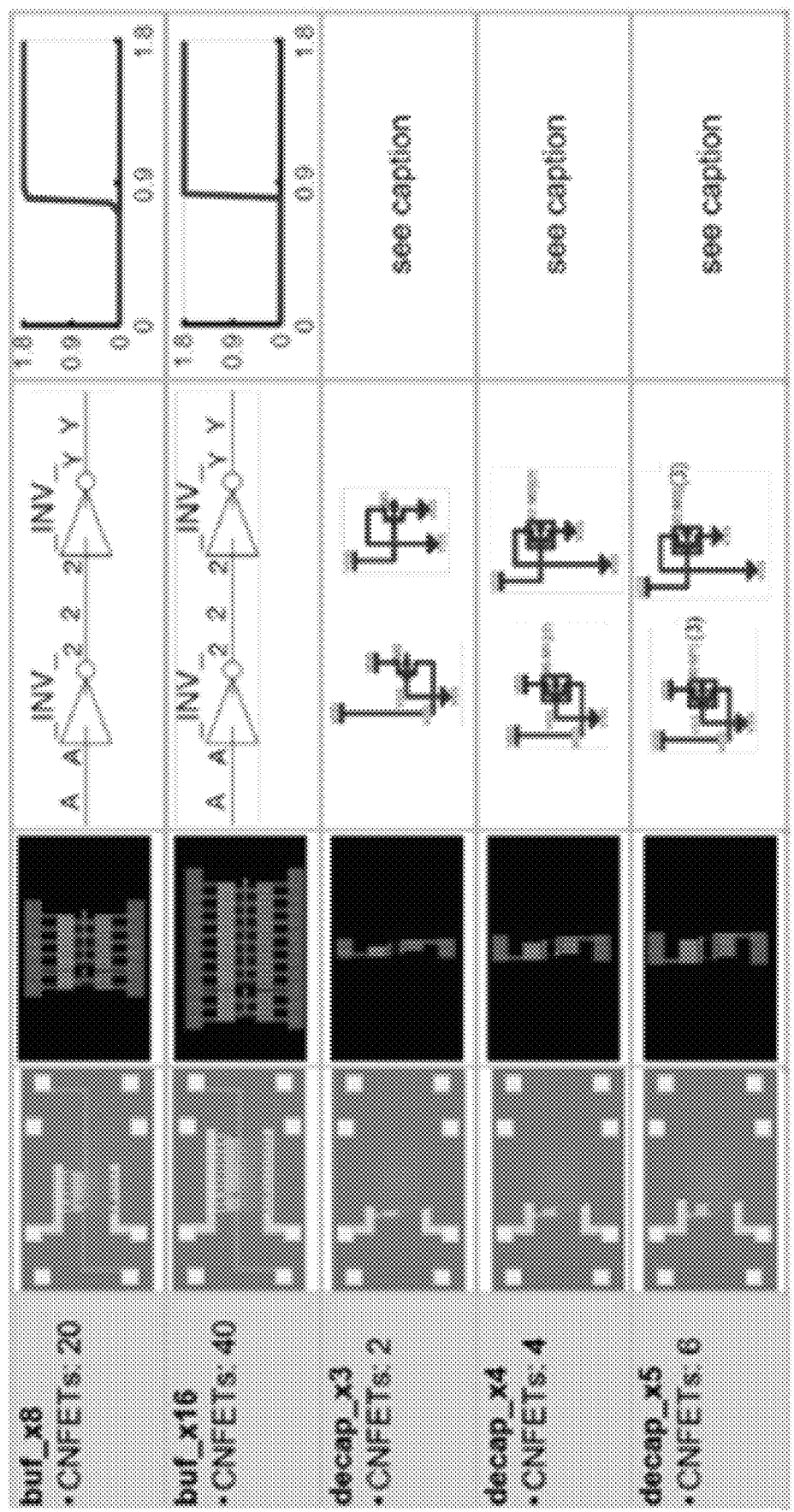
FIG. 19-contd.

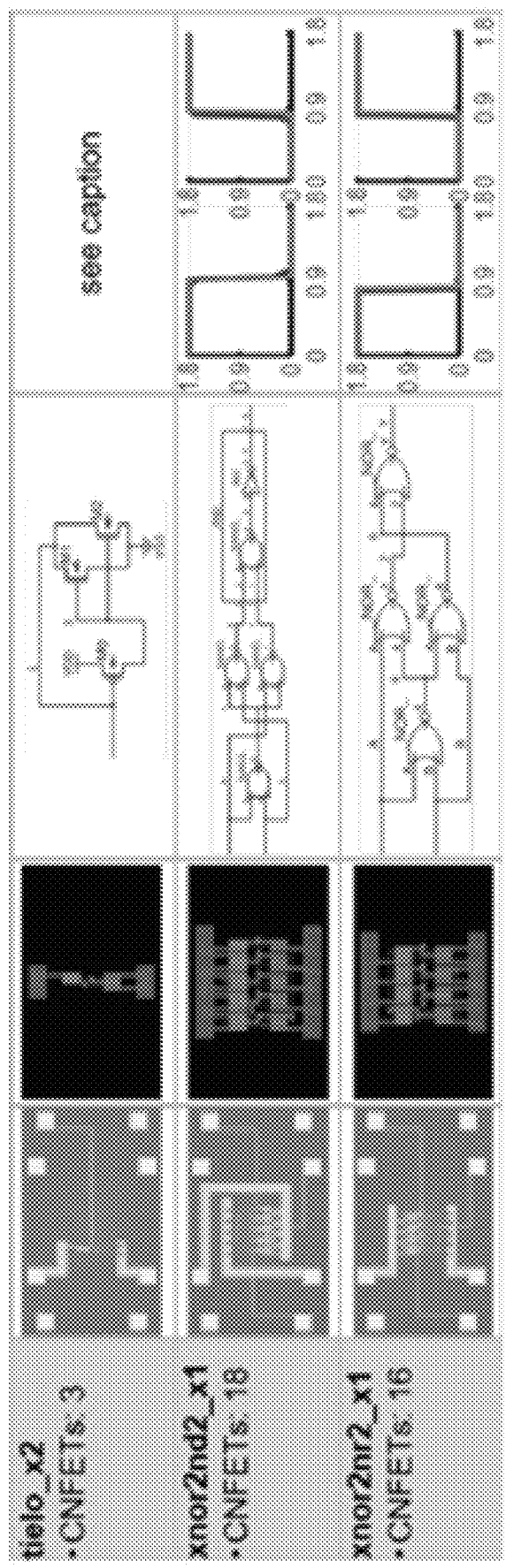
FIG. 19-contd.

FIG. 19-contd.

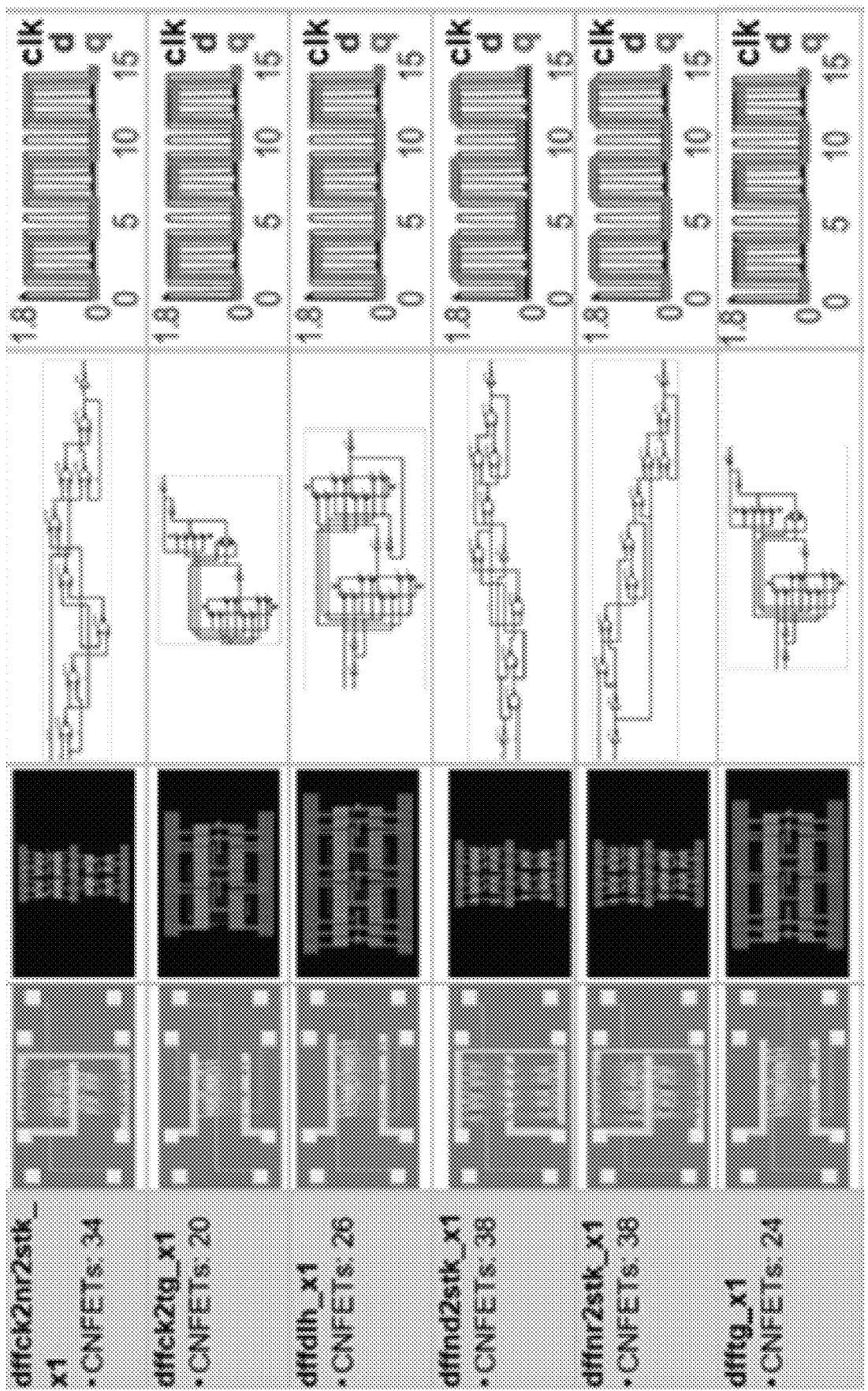
FIG. 19-contd.

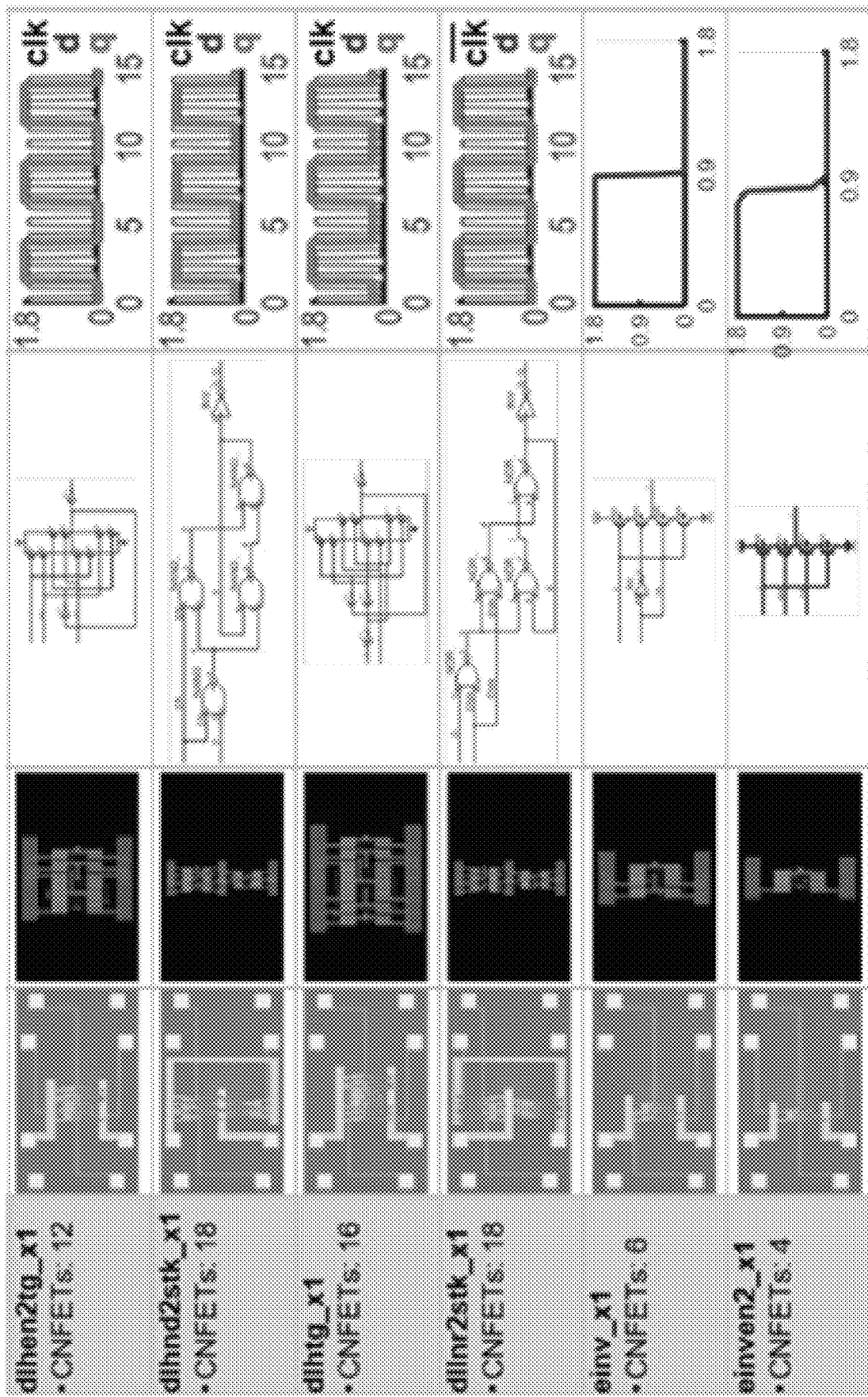
FIG. 19-contd.

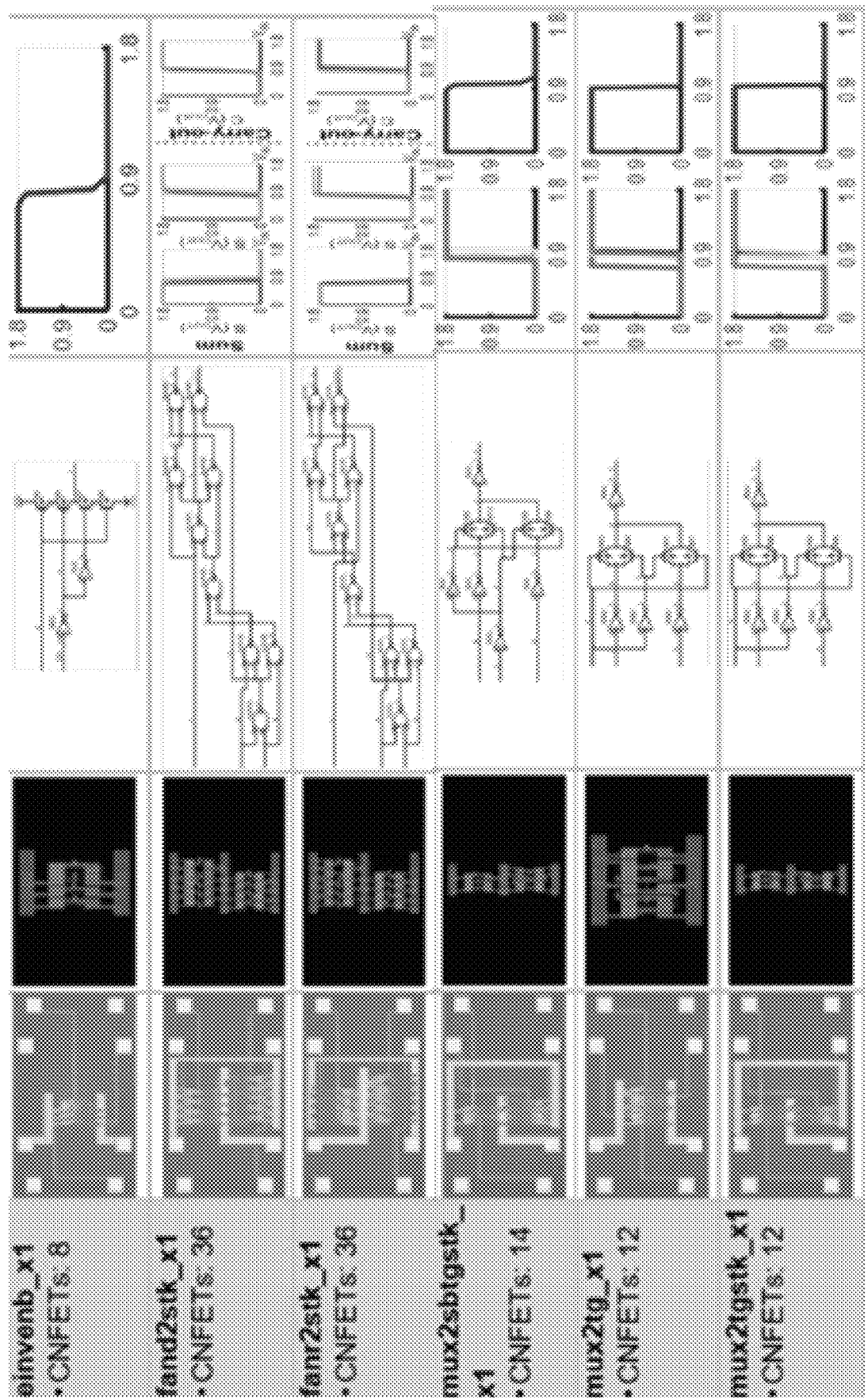
FIG. 19-contd.

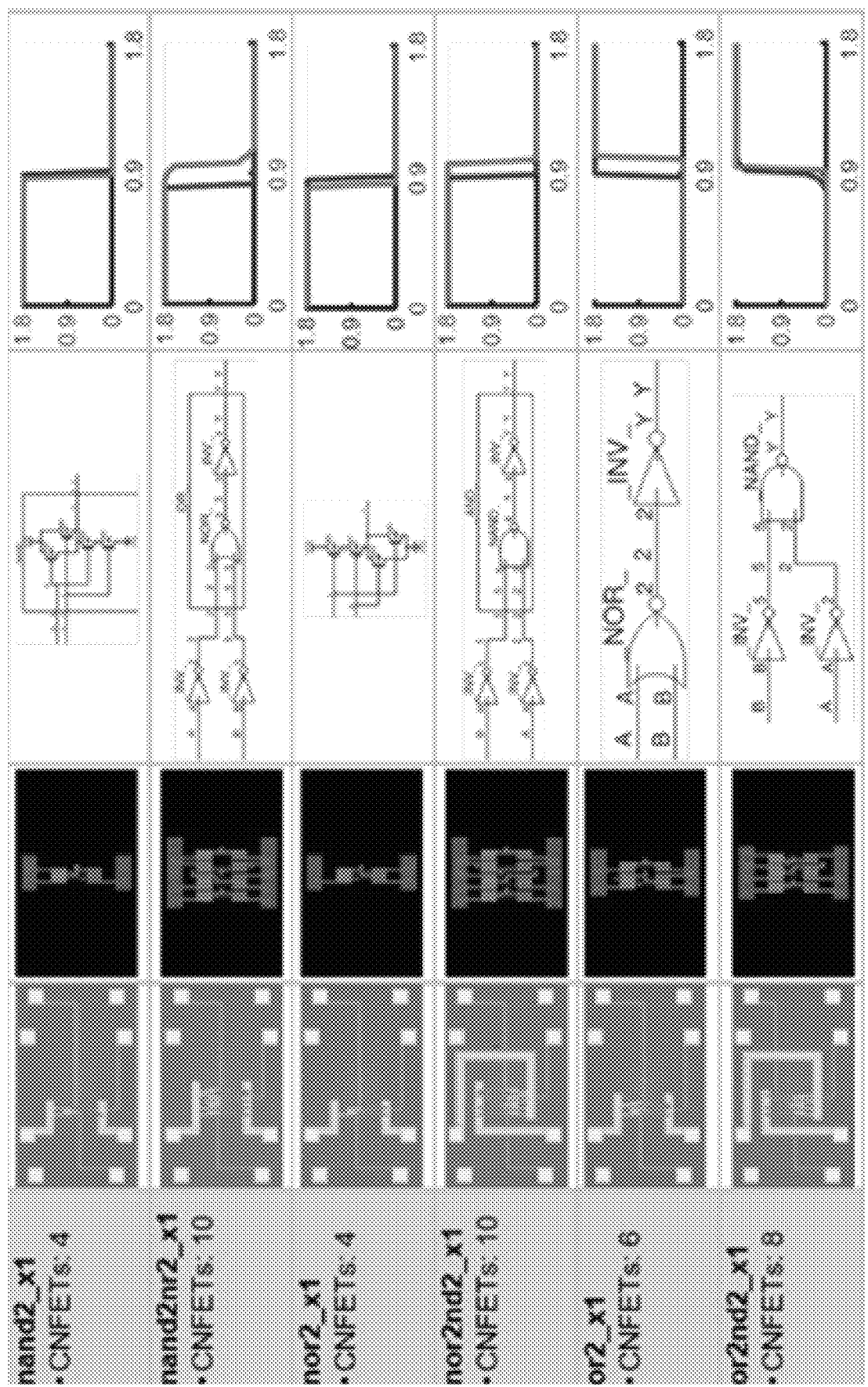
FIG. 19-contd.

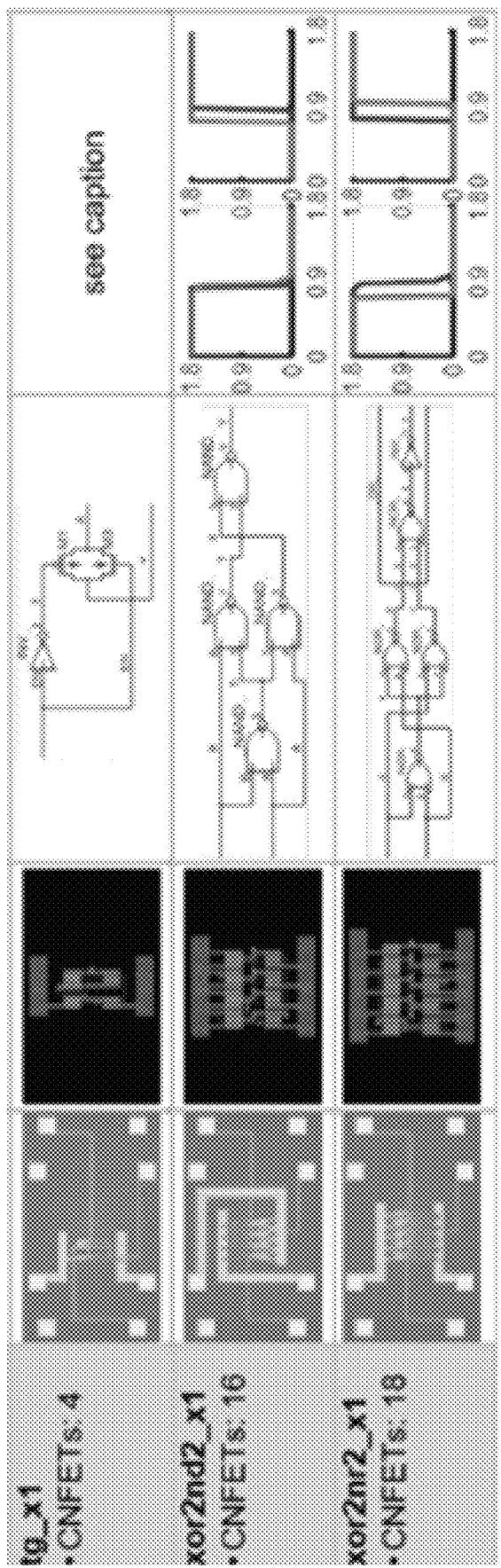
FIG. 19-contd.

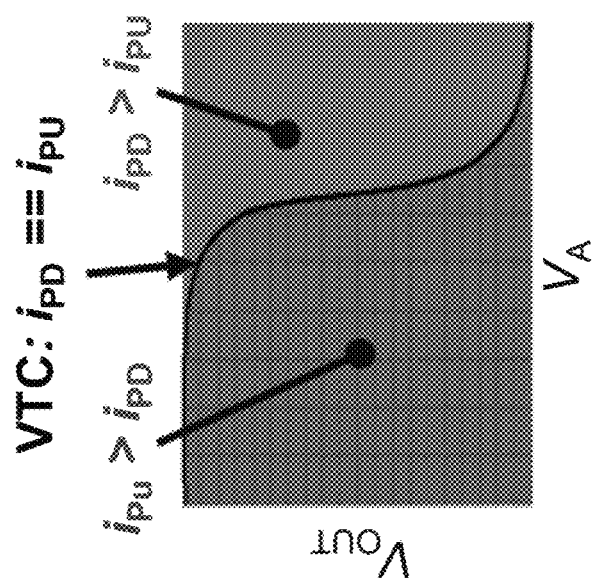
FIG. 24E
FIG. 24D
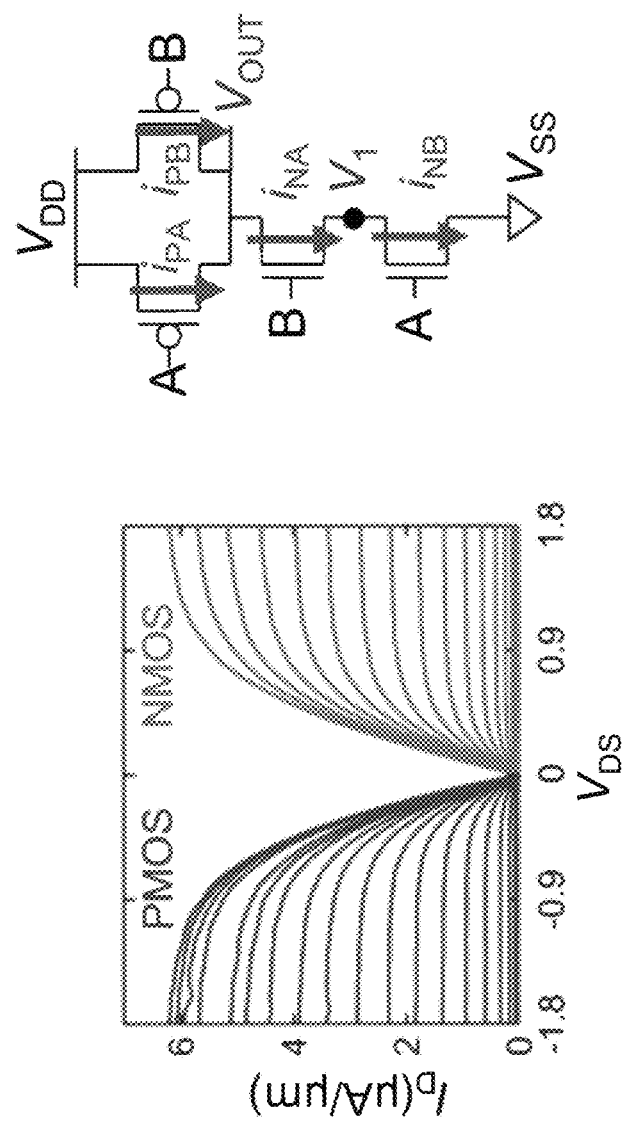
FIG. 24C

FIG. 25I
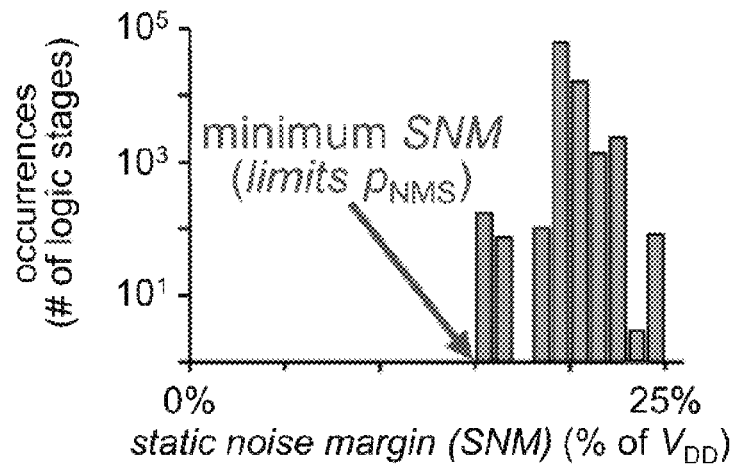
FIG. 25J
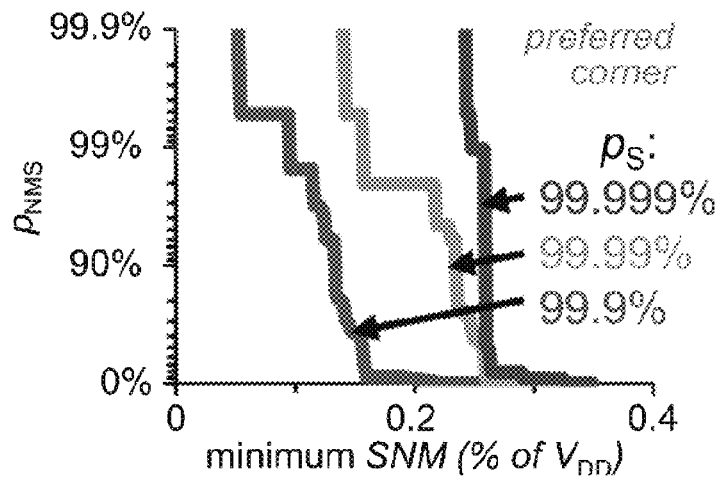
FIG. 25K
| parameter | value |
|---|---|
| technology node | "7 nm" |
| contacted gate pitch | 54 nm |
| gate, contact length | 9 nm, 9 nm |
| contact resistance | 3.3 kΩ/CNT |
| equivalent oxide thickness (EOT) | 0.7 nm |
| CNT pitch, diameter | 2 nm, 1.7 nm |
| m-CNT resistance | 40 kΩ |
| $I_{OFF}$ target | 100 nA/μm |

FIG. 26

| inst | format instruction (type format) category | summary | assembly |
|---|---|---|---|
| addi | register-immediate arithmetic | add constant, no overflow exception | addi rd, rs1, imm |
| add | register-register arithmetic | addition with 3 GPRs, an overflow exception | add rd, rs1, rs2 |
| andi | register-immediate arithmetic | bitwise AND with constant | andi rd, rs1, imm |
| and | register-register arithmetic | bitwise AND with 3 GPRs | and rd, rs1, rs2 |
| auipc | register-immediate arithmetic | load (pc + constant) into GPR | auipc rd, imm |
| beq | conditional branch | branch if 2 GPRs are equal | beq rs1, rs2, imm |
| bgeu | conditional branch | branch based on unsigned comparison of 2 GPRs | bgeu rs1, rs2, imm |
| bge | conditional branch | branch based on signed comparison of 2 GPRs | bge rs1, rs2, imm |
| bltu | conditional branch | branch based on unsigned comparison of 2 GPRs | bltu rs1, rs2, imm |
| blt | conditional branch | branch based on signed comparison of 2 GPRs | blt rs1, rs2, imm |
| bne | conditional branch | branch if 2 GPRs are not equal | bne rs1, rs2, imm |
| jalr | unconditional jump | jump to relative address, place return address in GPR | jalr rd, rs1, imm |
| jal | unconditional jump | jump to address, place return address in GPR | jal rd, imm |
| lh | memory instruction | load short from memory into GPR | lh rd, imm(rs1) |
| lui | register-immediate arithmetic | load upper bits of constant into GPR | lui rd, imm |
| ori | register-immediate arithmetic | bitwise OR with constant | ori rd, rs1, imm |
| or | register-register arithmetic | bitwise OR with 3 GPRs | or rd, rs1, rs2 |
| sh | memory instruction | store short into memory | sh rs2, imm(rs1) |
| slli | register-immediate arithmetic | shift left logical by constant | slli rd, rs1, imm |
| sll | register-register arithmetic | shift left logical by GPR value | sll rd, rs1, rs2 |
| slti | register-immediate arithmetic | set GPR based on signed comparison of GPR and constant | slti rd, rs1, imm |
| sltiu | register-immediate arithmetic | set GPR based on unsigned comparison of GPR and constant | sltiu rd, rs1, imm |
| slt | register-register arithmetic | set GPR based on signed comparison of 2 GPRs | slt rd, rs1, rs2 |
| sltu | register-register arithmetic | set GPR based on unsigned comparison of 2 GPRs | sltu rd, rs1, rs2 |
| srai | register-immediate arithmetic | shift right arithmetic by constant | srai rd, rs1, imm |
| sra | register-register arithmetic | shift right arithmetic by GPR value | sra rd, rs1, rs2 |
| srli | register-immediate arithmetic | shift right logical by constant | srli rd, rs1, imm |
| srl | register-register arithmetic | shift right logical by GPR value | srl rd, rs1, rs2 |
| sub | register-register arithmetic | subtraction with 3 GPRs, no overflow exception | sub rd, rs1, rs2 |
| xori | register-immediate arithmetic | bitwise XOR with constant | xori rd, rs1, imm |
| xor | register-register arithmetic | bitwise XOR with 3 GPRs | xor rd, rs1, rs2 |

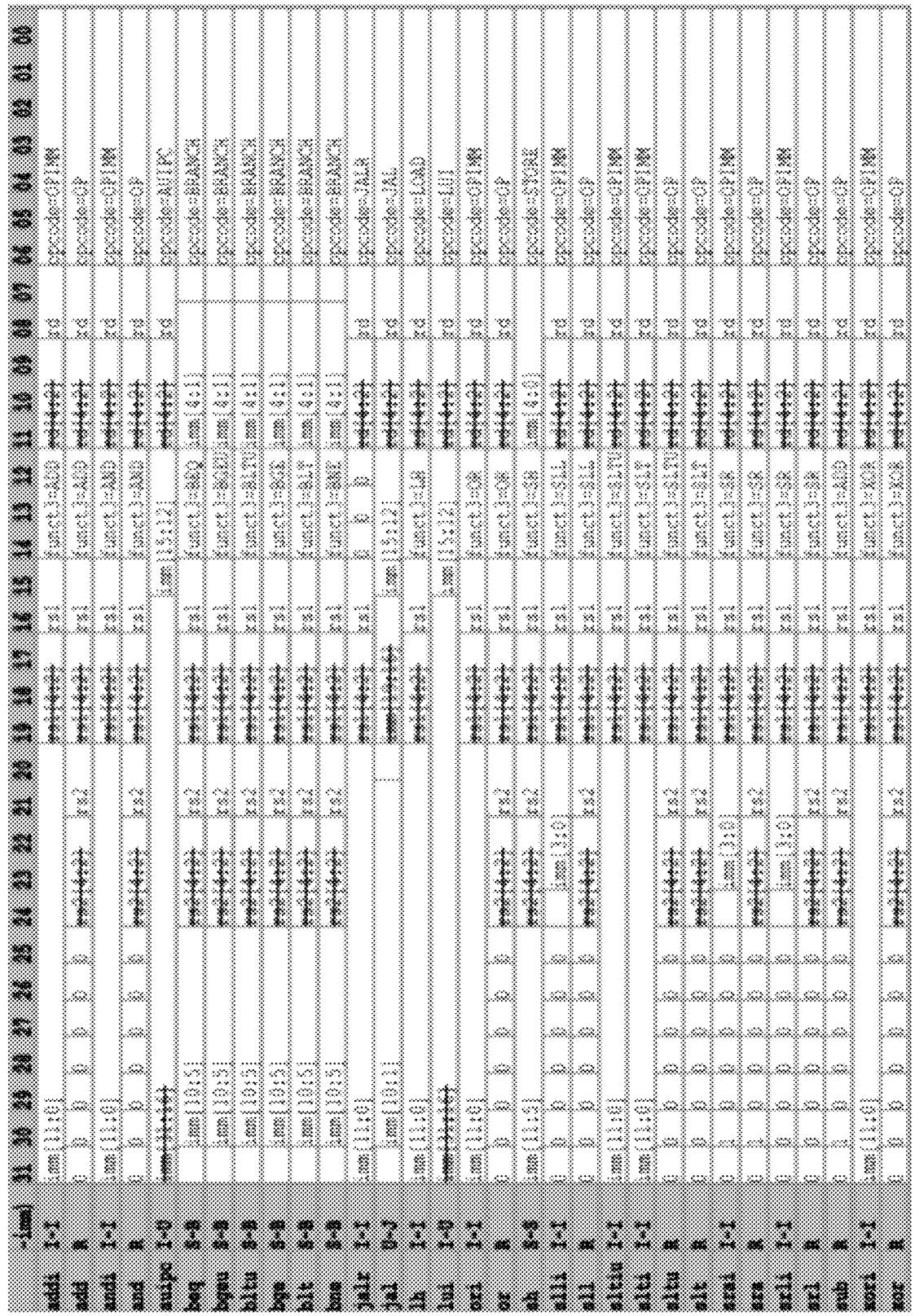
FIG. 26-contd.

2800

For each pair of connected logic stages possible for use in the integrated circuit, determining a static noise margin (SNM) for the pair of connected logic stages with a metallic carbon nanotube (m-CNT)
2810

Making the integrated circuit with only those pairs of connected logic stages having an SNM above a threshold SNM
2820

For each pair of connected logic stages possible for use in the integrated circuit, determining a static noise margin (SNM) for the pair of connected logic stages
2910

Selecting pairs of connected logic stages for use in the integrated circuit based on the SNMs for the pairs of connected logic stages and a desired probability of satisfying all noise margin constraints for the integrated circuit
2920

FIG. 29

SYSTEMS AND METHODS FOR DESIGNING INTEGRATED CIRCUITS

CROSS-REFERENCE TO RELATED APPLICATIONS

This application claims priority to and is a divisional of U.S. Non-Provisional application Ser. No. 16/565,634 titled "SYSTEMS AND METHODS FOR DESIGNING INTEGRATED CIRCUITS," filed Sep. 10, 2019, which claims priority to U.S. Provisional Application No. 62/729,056 titled "DREAM: Designing Resilience Against Metallic Carbon Nanotubes," filed Sep. 10, 2018, each of which is incorporated herein by reference in its entirety.

GOVERNMENT SUPPORT

This invention was made with government support under W909MY-16-1-0001 awarded by the Defense Advanced Research Projects Agency. The government has certain rights in the invention.

BACKGROUND

Carbon nanotube field-effect transistors (CNFETs) are a promising supplemental technology to silicon field-effect transistors (FETs), with a projected order of magnitude benefit in energy-delay product (EDP, a metric of energy efficiency) for digital very large scale integrated (VLSI) circuits. FIG. 1A shows a CNFET. Conventional photolithography defines the source, drain, and gate, while the channel comprises multiple carbon nanotubes (CNTs) (for sufficient drive current). Despite the promise of CNFETs, CNTs are subject to a major fundamental obstacle: CNT synthesis results in a combination of semiconducting CNTs (s-CNTs) and metallic CNTs (m-CNTs). The resulting leakage current from CNFETs (see FIG. 1C) that randomly comprise a fraction of m-CNTs poses two major challenges: (1) increased leakage power, degrading EDP benefits and (2) degraded noise immunity.

The static noise margin (SNM) of a pair of connected logic stages quantifies its immunity to noise. SNM can be quantified using the voltage transfer curves (VTCs) of logic stages. The probability that all connected logic stages meet a minimum SNM requirement ($SNM_R$) is $p_{NMS}$, i.e., the probability that all noise margin constraints are satisfied (defined below, where C is the set of all connected logic stages in a circuit, with driving logic stage $G_D$ and loading logic stage $G_L$).

$$p_{NMS} = \text{Probability}\{\cap_{(G_D, G_L) \in C} SNM(G_D, G_L) \geq SNM_R\}$$

While previous works have set s-CNT purity ($p_S$) requirements based on limiting m-CNT-induced leakage power, no existing works have provided guidelines for $p_S$ based on both increased leakage and degraded SNM due to m-CNTs for physical designs of VLSI circuits. While 99.999% $p_S$ is sufficient to limit EDP degradation to <5%, SNM imposes far stricter requirements on purity: $p_S$ should be about 99.999999% to achieve $p_{NMS} \geq 99\%$ (for circuits with 1 million gates).

Typical CNT synthesis today achieves $p_S$ of about 66%. While many different techniques have been proposed to overcome the presence of m-CNTs, the highest reported purity from any technique is about 99.99% $p_S$: a factor of 10,000 below the requirement for VLSI circuits. Moreover, these techniques require additional processing steps (e.g., applying high voltages for electrical "breakdown" of m-CNTs during fabrication), result in significant EDP penalties, or both.

SUMMARY

A system for designing an integrated circuit includes a database to store an indication of a plurality of logic stages for the integrated circuit, and a processor, operably coupled to the database, to, for each pair of logic stages, compute a static noise margin (SNM). The SNM represents immunity to noise of that pair of logic stages when connected. The processor also set an initial value of a SNM threshold based on a predetermined minimum SNM value and a predetermined maximum SNM value. The processor further identifies allowable pairs of connected logic stages as those pairs of connected logic stages with an SNM above the SNM threshold. The processor further generates a circuit design for the integrated circuit using only the allowable pairs of connected logic stages. The processor further determines a performance parameter for the integrated circuit based on the circuit design.

A method of making an integrated circuit includes, for each pair of connected logic stages possible for use in the integrated circuit, determining a static noise margin (SNM) for the pair of connected logic stages with a metallic carbon nanotube (m-CNT). The SNM represents an immunity to noise of the pair of logic stages when made with the m-CNT. The method also includes making the integrated circuit with only those pairs of connected logic stages having an SNM above a threshold SNM.

An integrated circuit includes a plurality of logic stages comprising carbon nanotube field-effect transistors (CNFETs), the plurality of logic stages having a probability that all noise margin constraints are satisfied of at least 99% and the CNFETs having a semiconducting carbon nanotube purity of between 99.9% and 99.99999%.

A method of making an integrated circuit includes, for each pair of connected logic stages possible for use in the integrated circuit, determining a static noise margin (SNM) for the pair of connected logic stages. The SNM represents an immunity to noise of the pair of logic stages. The method also includes selecting pairs of connected logic stages for use in the integrated circuit based on the SNMs for the pairs of connected logic stages and a desired probability of satisfying all noise margin constraints for the integrated circuit.

A method for designing an integrated circuit includes, at step (a), for each pair of logic stages of a plurality of logic stages, computing a static noise margin (SNM). The SNM represents immunity to noise of that pair of logic stages when connected and when at least one logic stage of that pair of connected logic stages includes a metallic carbon nanotube (m-CNT). The method further includes, at step (b), setting an initial value of a SNM threshold based on a predetermined minimum SNM value and a predetermined maximum SNM value and at step (c), identifying allowable pairs of connected logic stages as those pairs of connected logic stages with an SNM above the SNM threshold. The method further includes, at step (d), generating a circuit design for an integrated circuit using only the allowable pairs of connected logic stages, and at step (e), adjusting the SNM threshold based on the likelihood that the circuit design meets a predetermined noise criterion. The method also includes, at step (f), repeating steps (c), (d), and (e) based on the adjusted SNM threshold to generate a set of circuit designs. This includes, once two circuit designs in the set of circuit designs include the same allowable pairs of logic stages, selecting a circuit design of the set of circuit designs that 1) has a 99% likelihood that it meets the maximum noise criterion, and 2) has the lowest value among the set of circuit designs for one or more of the following: power consumption, switching delay, or surface area.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A illustrates a schematic of a CNFET, and a scanning electron microscope (SEM) image thereof (inset).

FIG. 1B illustrates a fabricated CNFET CMOS die with 1000 NMOS CNFETs and 1000 PMOS CNFETs. The $p_S$ is about 99.99%, or about 15-25 CNTs/CNFFET.

FIG. 1C illustrates plots of experimentally measured drain current $I_D$ versus gate-source voltage $V_{GS}$ for all 1000 NMOS ($V_{DS}$=1.8 V, right panel) and 1000 PMOS CNFETs ($V_{DS}$=−1.8 V, left panel) with no CNFETs omitted. m-CNTs present in CNFETs result in high off-state leakage current ($I_{OFF}$=$I_D$ at $V_{GS}$=0 V).

FIG. 1D illustrates reduction in CNFET EDP benefits versus $p_S$ (m-CNTs increase $I_{OFF}$). Results are simulated for VLSI circuit modules from a 7 nm node processor core.

FIG. 1E is a plot of $p_{NMS}$ versus $p_s$ (m-CNTs degrade SNM), shown for $SNM_R$=$V_{DD}$/5. Results are simulated for VLSI circuit modules from a 7 nm node processor core.

FIG. 2A is a CNFET-level schematic of a nand2 logic gate (left circuit) and a nor2 logic gate (right circuit).

FIG. 2B illustrates standard cell layouts derived using the "asap7sc7p5t" standard cell library and CNT correlation. Since the length of CNTs (e.g., 100 s of microns) is typically much longer versus the CNFET contacted gate pitch (CGP, e.g., 42-54 nm for a 7 nm node), the number of s-CNTs and m-CNTs in CNFETs can be uncorrelated or highly correlated depending on the relative physical placement of CNFET active regions. For many CMOS standard cell libraries at sub-10 nm nodes, the active regions of FETs are highly aligned, resulting in a highly correlated number of m-CNTs among CNFETs in library cells, further degrading VTCs (since 1 m-CNT can affect multiple CNFETs simultaneously).

FIG. 2C is a schematic for an example connected logic stage pair—nand2, nor2.

FIG. 2D is a VTC for driving a logic stage and a mirrored VTC for a loading logic stage, showing simulated SNM with up to 2 m-CNTs. The logic stage pair here is (nand2, nand2).

FIG. 2E is a VTC for driving a logic stage and a mirrored VTC for a loading logic stage, showing simulated SNM with up to 2 m-CNTs. The logic stage pair here is (nor2, nor2).

FIG. 2F is a VTC for driving a logic stage and a mirrored VTC for a loading logic stage, showing simulated SNM with up to 2 m-CNTs. The logic stage pair here is (nand2, nor2).

FIG. 2G is a VTC for driving a logic stage and a mirrored VTC for a loading logic stage, showing simulated SNM with up to 2 m-CNTs. The logic stage pair here is (nor2, nand2).

FIG. 4A is a plot of $p_{NMS}$ versus s-CNT purity for $SNM_R$=$V_{DD}$/5 shown for the optimal EDP designs in FIG. 4C. $p_{NMS}$ corresponds to a circuit comprising 106 logic gates, which is scaled using the $p_{NMS}$ for the "dec" module ($5 \times 10^3$ logic gates). Target $p_{NMS}$=99% corresponds to "dec" having $p_{NMS}$=$0.99^{(5000/1,000,000)}$=99.995%, which is simulated using the methodology described in FIG. 7, and assuming $p_{NMS}$ is independent for each block of 5000 logic gates.

FIG. 4B is a plot of $SNM_R$ versus s-CNT purity to achieve $p_{NMS}$=99%.

FIG. 4C is a plot of pareto-optimal energy versus clock frequency trade-off curves, for the baseline case and for DREAM.

FIG. 4D illustrates relative energy delay, area, and required $p_s$ (for $p_{NMS}$=99%), for baseline versus DREAM.

FIG. 6A illustrates generation of a variation-aware CNFET SNM model for a D-flip-flop derived from the asap7sc7p5t standard cell library. The CNFETs are grouped by logic stage.

FIG. 6B illustrates the layout used to extract netlists for each logic stage.

FIG. 6C illustrates that for each extracted netlist, there can be multiple VTCs. For each logic stage, output, a logic stage input is sensitized if the output state (0 or 1) depends on the state of that input given the state of all other inputs. For example, for a logic stage with a Boolean function Y=!(A*B+C), C is sensitized when (A, B)=(0,0), (0,1), or (1,0). All possible VTCs are simulated over all logic stage outputs and sensitized inputs, and also in the presence of m-CNTs. Shown here is a subset of the VTCs for the logic stage in FIG. 6A with output node MIR and sensitized input D (with (clkb, clkn, MS)=(0,1,0)). Dashed line: VTC with no m-CNTs, solid lines: example VTCs in the presence of m-CNTs (+CNT correlation). In each case, $V_{OH}$, $V_{IH}$, $V_{IL}$, and $V_{OL}$, ae modelled as affine functions of the number of m-CNTs in each of r regions ($M_1, \ldots, M_r$), with calibration parameters in SNM model matrix T shown in FIG. 6E.

FIG. 6D is an example calibration of the SNM model matrix T for the VTC parameters extracted in FIG.

6C, markers are VTC parameters extracted from circuit simulations (Cadence Spectre®). Solid lines are the calibrated model.

FIG. 6E illustrates the Affine model form of the CNFET SNM model of FIG. 6D.

Figure 7A:
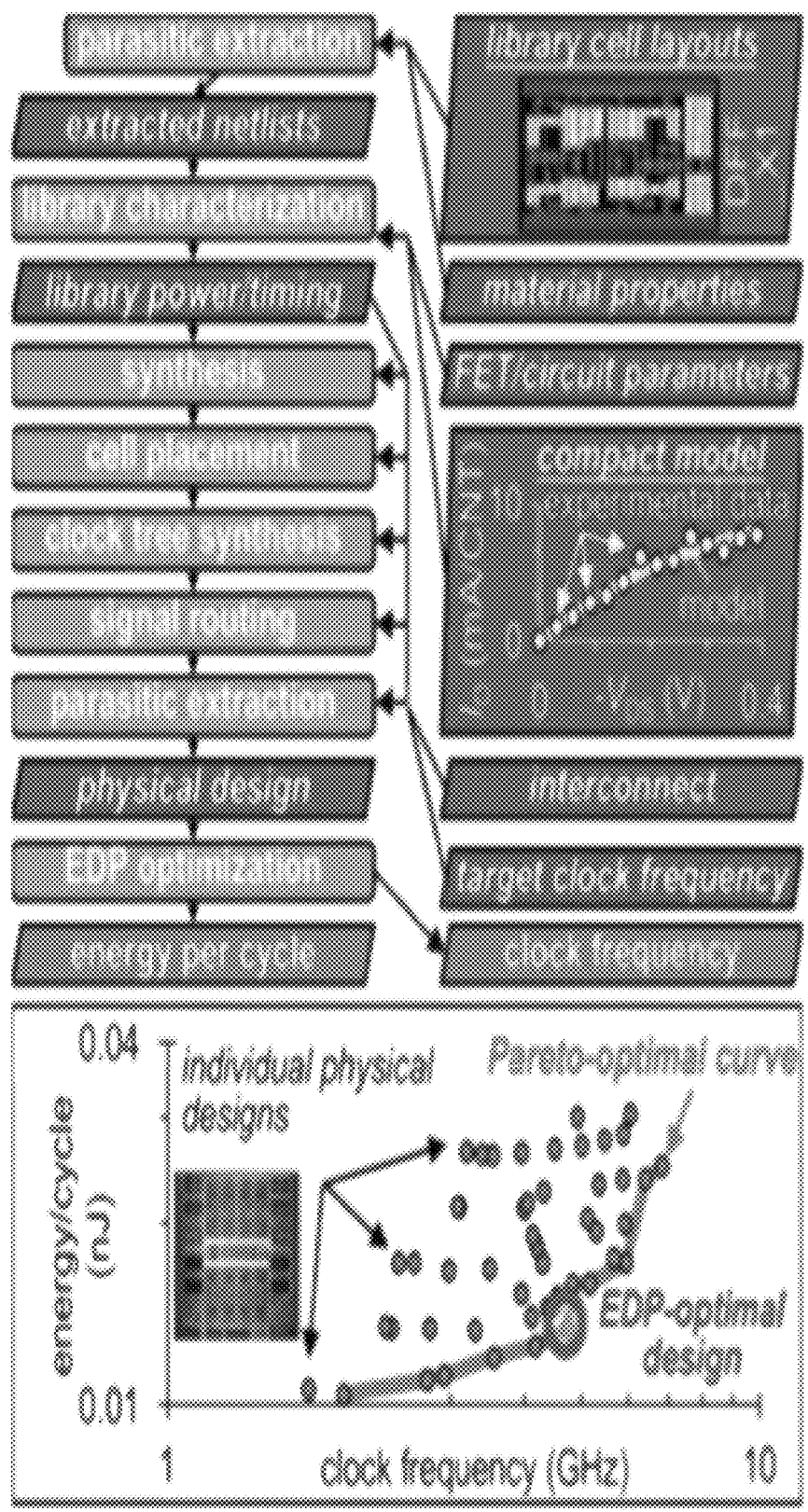

FIG. 7A illustrates a physical design for to optimize energy and delay of CNFET digital VLSI circuits, including: 1) library power/timing characterization (Candence Liberate®) across multiple $V_{DD}$ and using parasitics extracted from standard cell layouts derived from asap7sc7p5t), in conjunction with a CNFET compact model (parameters in FIG. 10); 2) Synthesis (Candence Genus®) place-and-route ((Candence Innovus®) with back-end-of-line (BEOL) wire parasitics from the ASAP7 PDK; 3) Circuit EDP optimization: both $V_{DD}$ and target clock frequency (during synthesis/place-and-route) are swept to create multiple physical designs. The one with best EDP is used to compare design options (e.g., DREAM versus baseline).

Figure 7B:
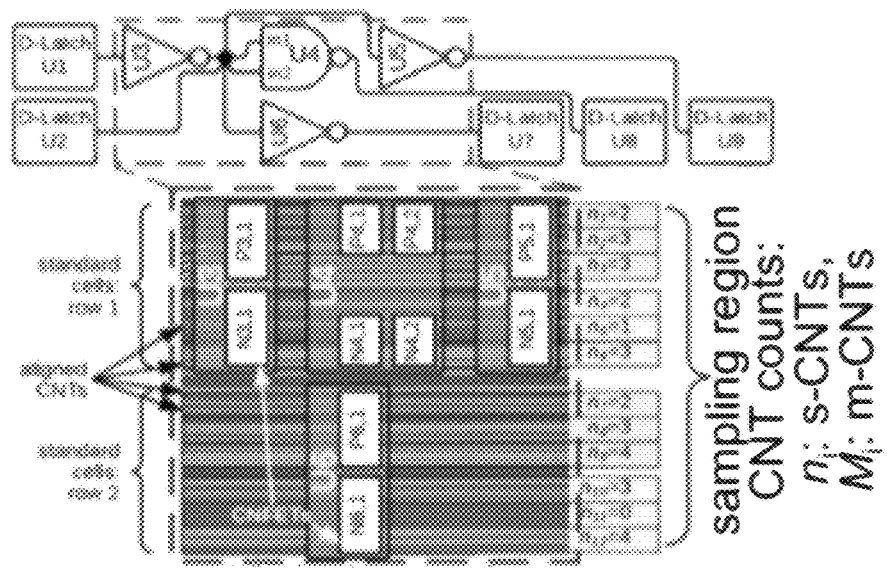

FIG. 7B illustrates a subset of logic gates in an example circuit module, showing the effect of CNT correlation at the circuit level (e.g., the m-CNT counts of CNFETs P3,1 and P5,1 are both equal to $M_1+M_2+M_3$).

Figure 7C:
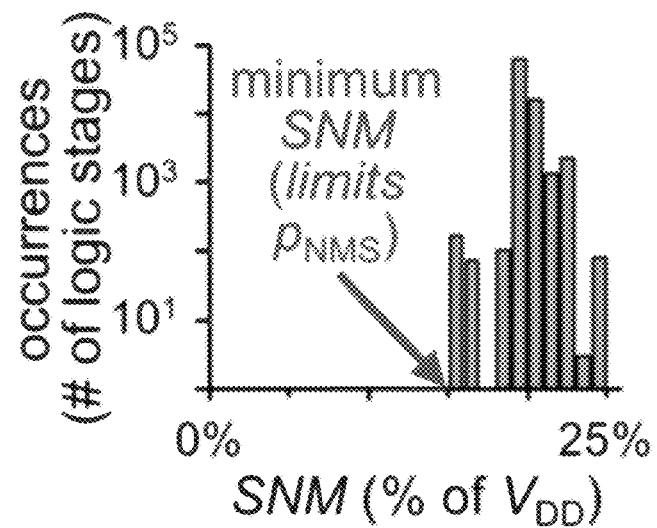

FIG. 7C illustrates distribution of SNM over all connected logic stage pairs for a single sample of the circuit m-CNT counts. The minimum SNM for each trial limits $p_{NMS}$.

Figure 7D:
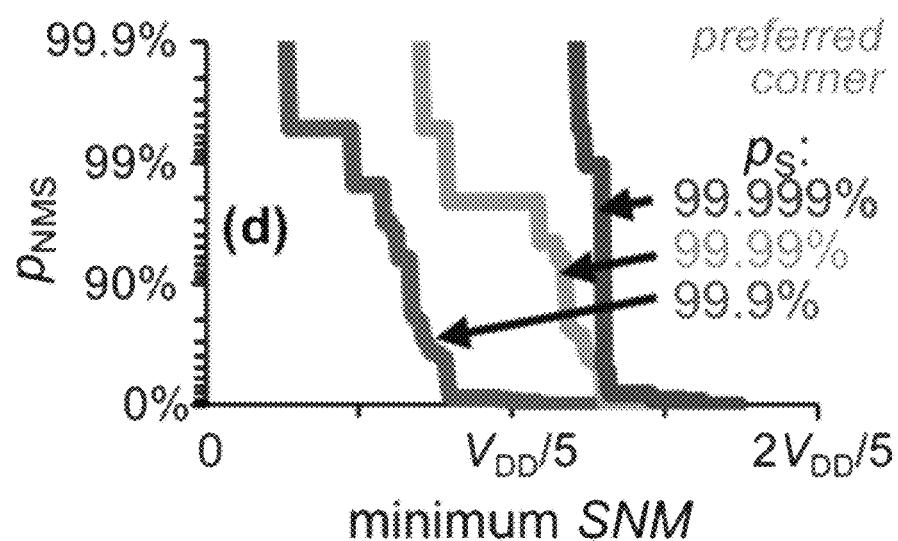

FIG. 7D illustrates cumulative distribution of minimum SNM over 10,000 Monte Carlo trials, shown for multiple target $p_s$ values. These results are used to find $p_{NMS}$ versus $p_s$ for a target $SNM_R$ (see FIG. 4A), where $p_{NMS}$ is the fraction of trials that meet the SNM requirement for all logic stage pairs. Note that $p_{NMS}$ can then be exponentiated to adjust for various circuit sizes based on the number of logic gates (see details in FIG. 4A).

Figure 8:
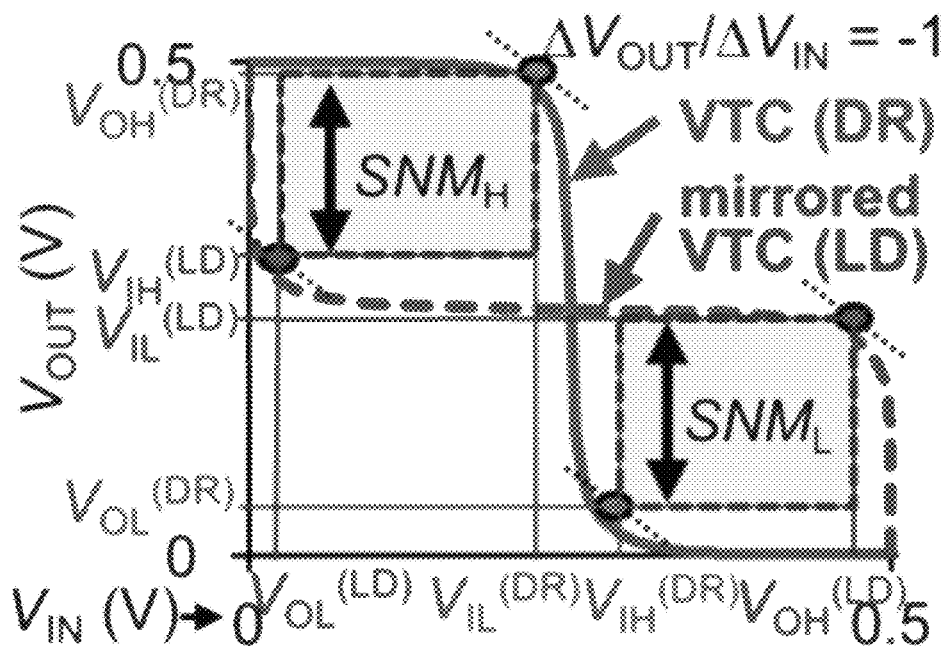

FIG. 8 illustrates VTC and SNM parameter definitions, e.g., for (nand2, nor2). (DR)=driving logic stage; (LD)=loading logic stage; $SNM=\min(SNM_H, SNM_L)$; $SNM_H=V_{OH}^{(DR)}-V_{IH}^{(LD)}$; and $SNM_L=V_{IL}^{(LD)}-V_{OL}^{(DR)}$.

Figure 9A:
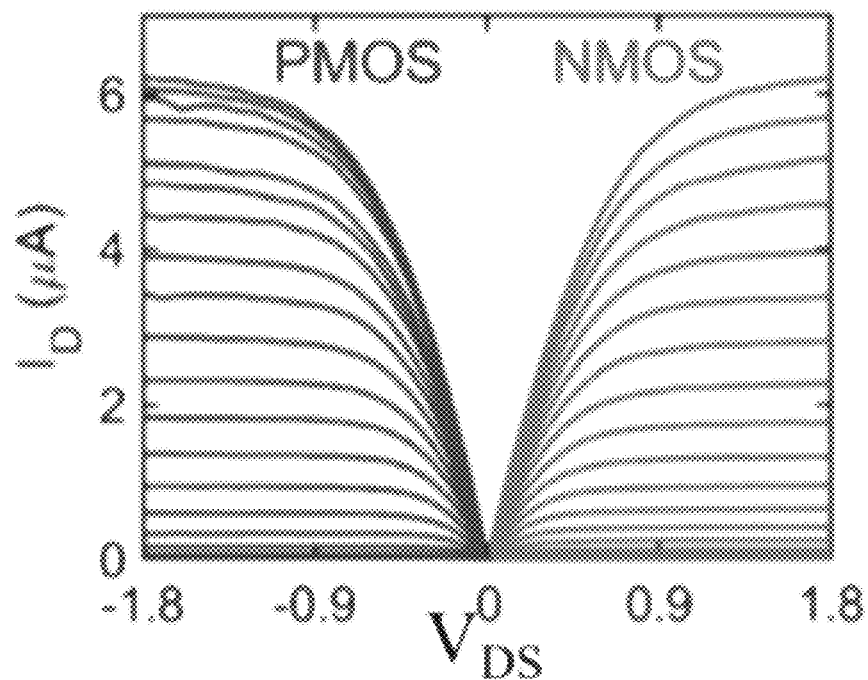

FIG. 9A illustrates a methodology to solve VTCs (e.g., for nand2) using experimentally measured CNFET I-V curves. Shown here is an example $I_D$ versus $V_{DS}$ for NMOS and PMOS CNFETs.

FIG. 9B is a schematic to solve a VTC (e.g. $V_{OUT}$ versus $V_A$ with $V_B=V_{DD}$). For each $V_A$, find $V_1$ and $V_{OUT}$ such that $i_{P4}+i_{PB}=i_{NA}=i_{NB}$ (DC convergence).

FIG. 9C shows current in the pull-up network ($i_{PU}=i_{P4}+i_{PB}$) and the pull-down network ($i_{PD}=i_{NA}=i_{NB}$) versus $V_{OUT}$ and $V_A$. The VTC is seen where these currents intersect.

FIG. 10 shows CNET compact model parameters for an example 7 nm node.

FIG. 11A is an image of a fabricated RV16X-NANO chip. The die area is 6.912 mm×6.912 mm, with input/output pads placed around the periphery. Scanning electron microscopy images with increasing magnification are shown inset. RV16X-NANO is fabricated entirely from CNFET CMOS, in a wafer-scalable, VLSI-compatible, and silicon-CMOS compatible fashion.

FIG. 11B is a three-dimensional to-scale rendered schematic of the RV16X-NANO physical layout (all dimensions are to scale except for the z axis, which is magnified to clarify each individual vertical layer). RV16X-NANO leverages a new three-dimensional (3D) physical architecture in which the CNFETs are physically located in the middle of the stack, with metal routing both above and below.

Figure 12A:
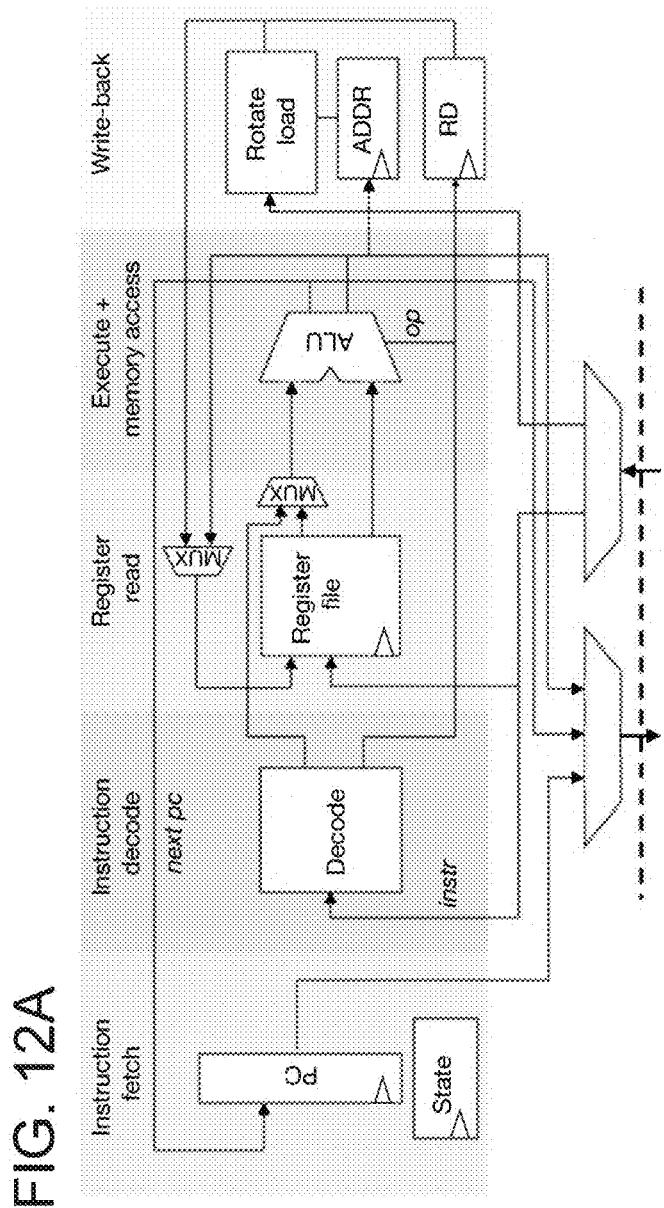

FIG. 12A is a block diagram of the architecture and design of RV16X-NANO, showing the organization of RV16X-NANO, including the instruction fetch, instruction decode, register read, execute+memory access, and write-back stages.

Figure 12B:
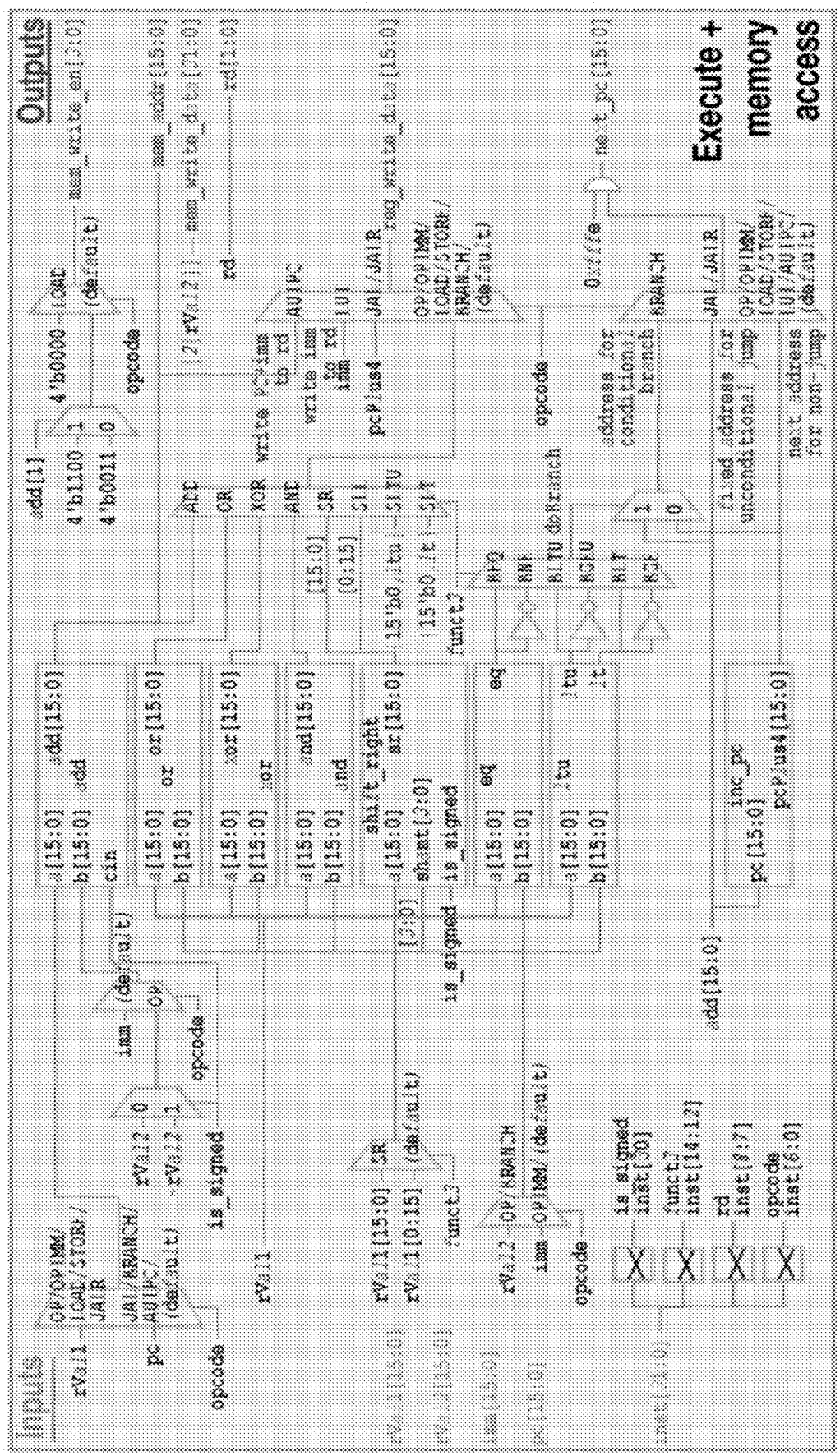

FIG. 12B is a schematic describing the high-level register transfer level (RTL) description of each stage of the design of FIG. 12A, including inputs, outputs and signal connections.

Figure 13A:
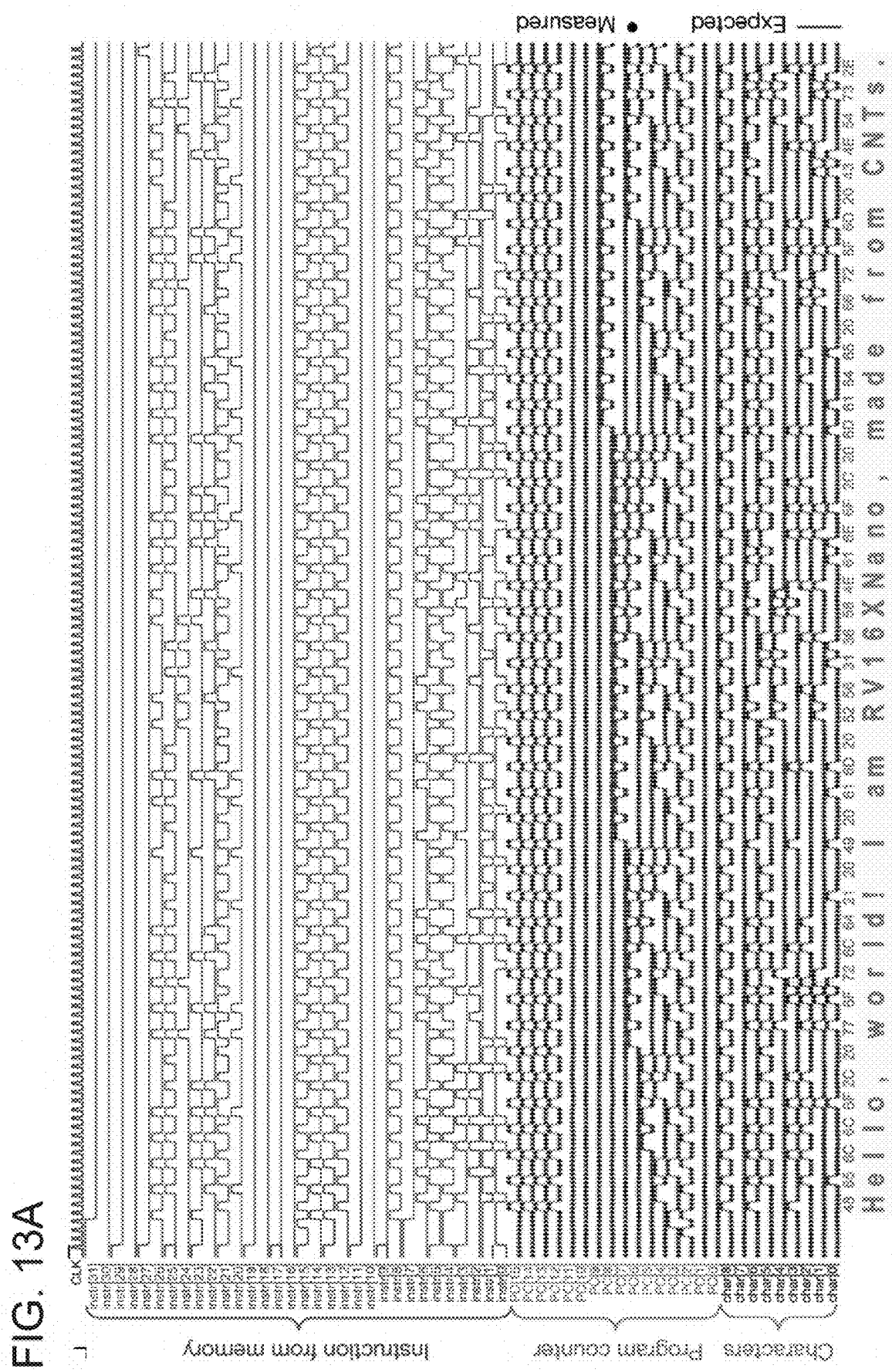

FIG. 13A shows an experimentally measured waveform from RV16X-NANO, executing the 'Hello, World' program. The waveform shows the 32-bit instruction fetched from memory, the program counter stored in RV16X-NANO, as well as the character output from RV16X-NANO. Below the waveform, the binary output (shown in hexadecimal code) is converted to their ASCII characters to their ASCII characters, showing RV16X-NANO printing out "Hello, world! I am RV16XNano, made from CNTs." In addition to this program, functionality was tested by executing all of the 31 instructions within RV32E (see Example 4).

Figure 13B:
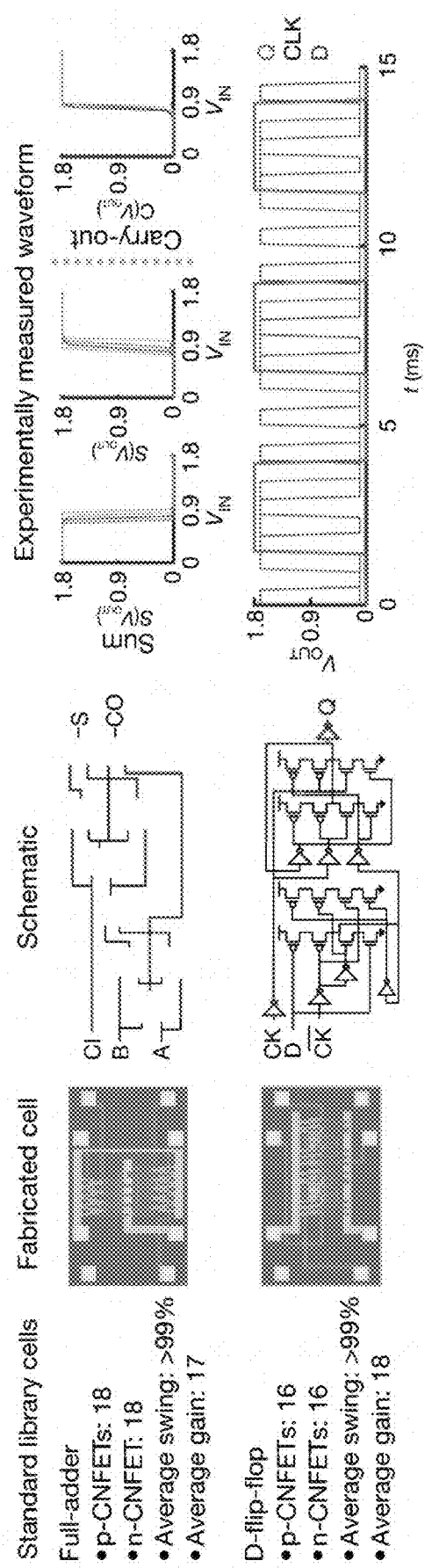

FIG. 13B shows RV16X-NANO as designed using conventional electronic design automation (EDA) tools, leveraging a CNT process design kit as disclosed here, and a CNT CMOS standard cell library. An example combinational cell (full-adder) and example sequential cell (D-flip-flop) are shown alongside an optical microscopy image of the fabricated cells, their schematics, as well as their experimentally measured waveforms. For the full-adder, shown here are the outputs (sum and carry-out outputs) for all possible biasing conditions in which sweeping the voltage of input (from 0 to $V_{DD}$) causes a change in the logical state of the output (that is, for the full adder, with $C_{OUT}=A*B+B*C_{IN}+A*C_{IN}$, with A=logical '0' and B=logical '1', then sweeping $C_{IN}$ from '0' to '1' causes $C_{OUT}$ to change from logical '0' to logical '1'). ($C_1$ indicates $C_{IN}$ and $C_O$ indicates $C_{OUT}$.) For the sum output $S(V_{OUT})$, there are 12 such conditions: six where $V_{OUT}$ has the same polarity as the swept input (positive unate) and six where $V_{OUT}$ has the opposite polarity to the swept input (negative unate). For the carry-out output $C(V_{OUT})$ there are six such conditions (all positive unate); the measurements are overlaid over one another. Gain for all transitions is >15, with output voltage swing>99%. The D-flip-flop waveform (voltage versus time) illustrates correct functionality of the positive edge-triggered D-flip-flop (output state Q shows correct functionality based on data input D and clock input CLK). CK and C⁻K⁻ are the clock input and the inverse of the clock input, respectively.

Figure 14A:
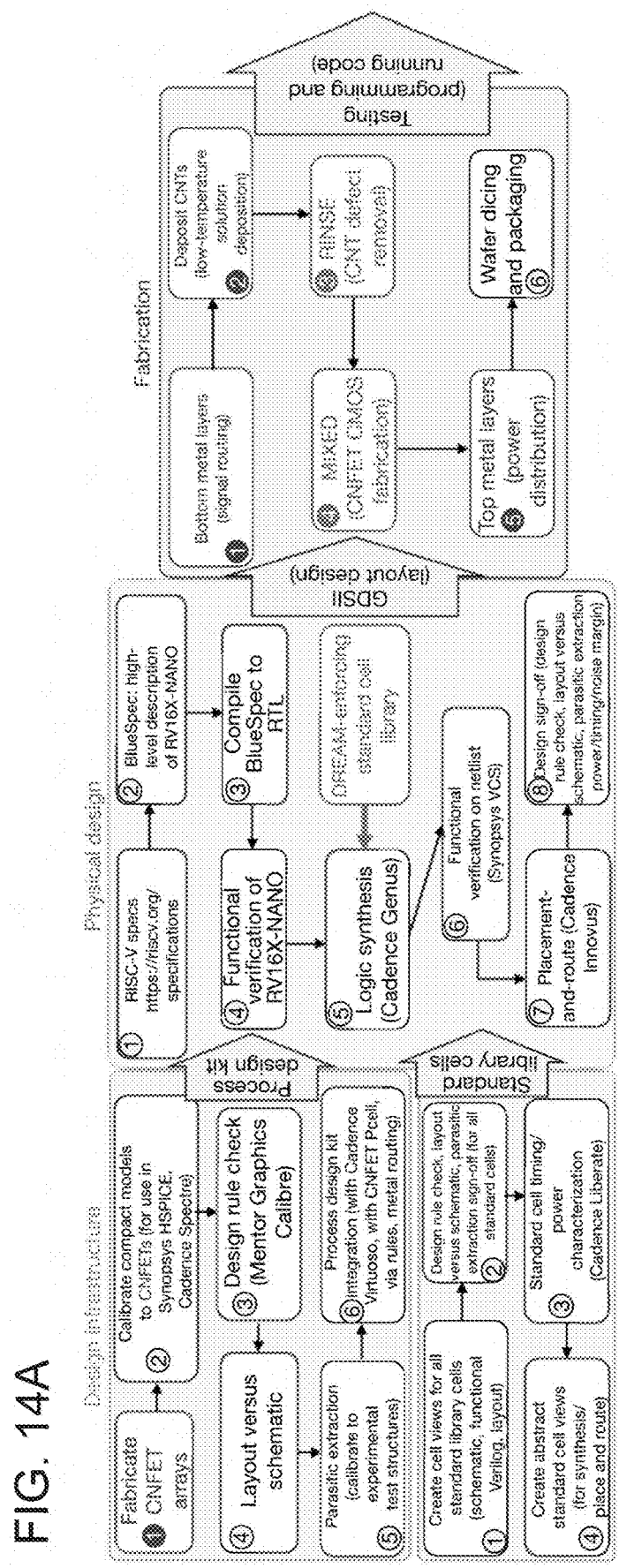

FIG. 14A illustrates design and manufacturing flow for RV16X-NANO, illustrating how the manufacturing methodology described herein seamlessly integrates within conventional silicon-based EDA tools. Black boxes show conventional steps in silicon-CMOS design flows. The "fabricate CNFET.", "Bottom metal layers", "Deposit CNTs . . ." and "Top metal layers . . ." steps are adjusted for CNTs instead of silicon. The "DREAM-enforcing . . . ", "MIXED" and "RINSE" steps represent the additions to implement the manufacturing methodology. RV16X-NANO is the first hardware demonstration of a beyond-silicon emerging nanotechnology leveraging a complete RTL-to-GDS physical design flow. Software packages are from Synopsys, Cadence, and Mentor Graphics.

FIG. 14B illustrates scanning electron microscopy images showing that CNTs inherently bundle together, forming thick CNT aggregates. These aggregates result in CNFET failure (reduced CNFET yield) as well as prohibitive particle contamination for VLSI manufacturing.

FIG. 14C illustrates the Removal of Incubated Nanotubes through Selective Exfoliation (RINSE) process steps: (1) CNT incubation, (2) adhesion coating, (3) mechanical exfoliation (see text for details).

FIG. 14D shows how, after performing RINSE, CNT aggregates are removed from the wafer.

FIG. 14E shows that after performing RINSE, the individual CNTs not in aggregates are not removed from the wafer, while without RINSE, sonication inadvertently removes large areas of all CNTs from the wafer. Top panel shows CNT incubation pre-RINSE, middle panel shows CNTs left on the wafer post-RINSE, and the bottom panel shows CNTs inadvertently removed from the wafer after sonicating a wafer to remove CNT aggregates without performing the adhesion-coating step in RINSE.

FIG. 14F illustrates particle contamination reduction due to RINSE. RINSE decreases particle density by >250×.

FIG. 14G shows how increasing the time of step 3 of FIG. 14C (sonication time) to over 7 hours results in no change in CNT density across the wafer.

Figure 15A:
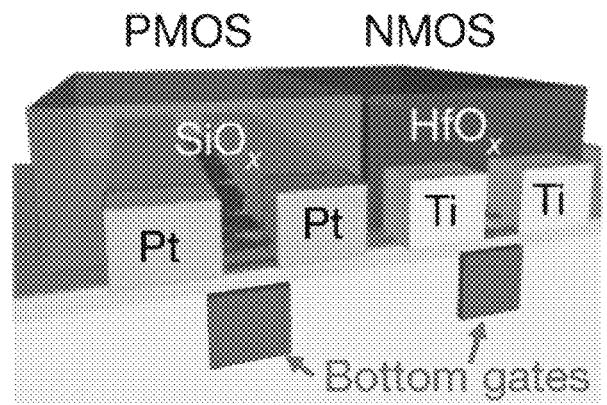

FIG. 15A is a schematic of CNFET CMOS fabricated using Metal Interface engineering Crossed with Electrostatic Doping (MIXED). MIXED is a combined doping process that leverages both metal contact work-function engineering as well as electrostatic doping to realize a robust wafer-scale CNFET CMOS process. Employed here are platinum contacts and SiOx passivation for p-CNFETs, and titanium contacts and HfOX passivation for n-CNFETs.

Figure 15B:
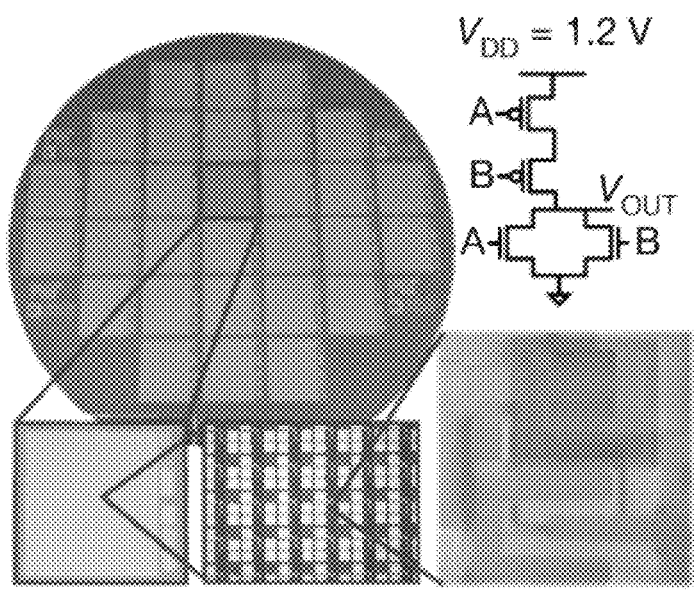

FIG. 15B shows dies fabricated with 10,400 CNFET CMOS digital logic gates across 150-mm wafers to characterize MIXED.

Figure 15C:
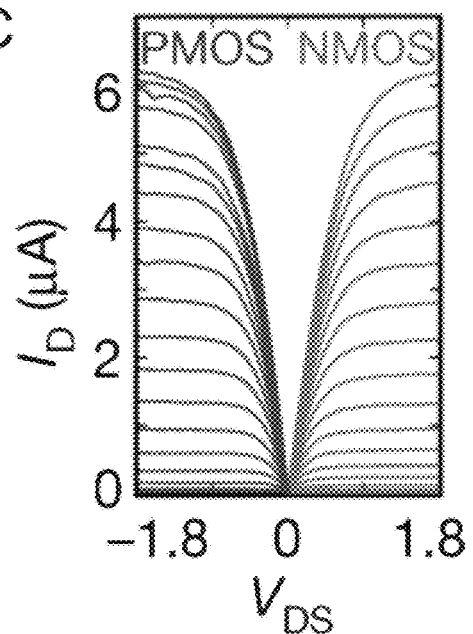

FIG. 15C illustrates $I_D$ versus Vis characteristics showing p-CNFETs and n-CNFETs that exhibit similar $I_D$-$V_{DS}$ characteristics (for opposite polarity of input bias conditions, for example, $V_{DS,P}=-V_{DS,N}$), achieved with MIXED. The gate-to-source voltage $V_{GS}$ is swept from $-V_{DD}$ to $V_{DD}$ in increments of 0.1 V. See Example 4 for $I_D$-$V_{GS}$ and additional CNFET characteristics.

Figure 15D:
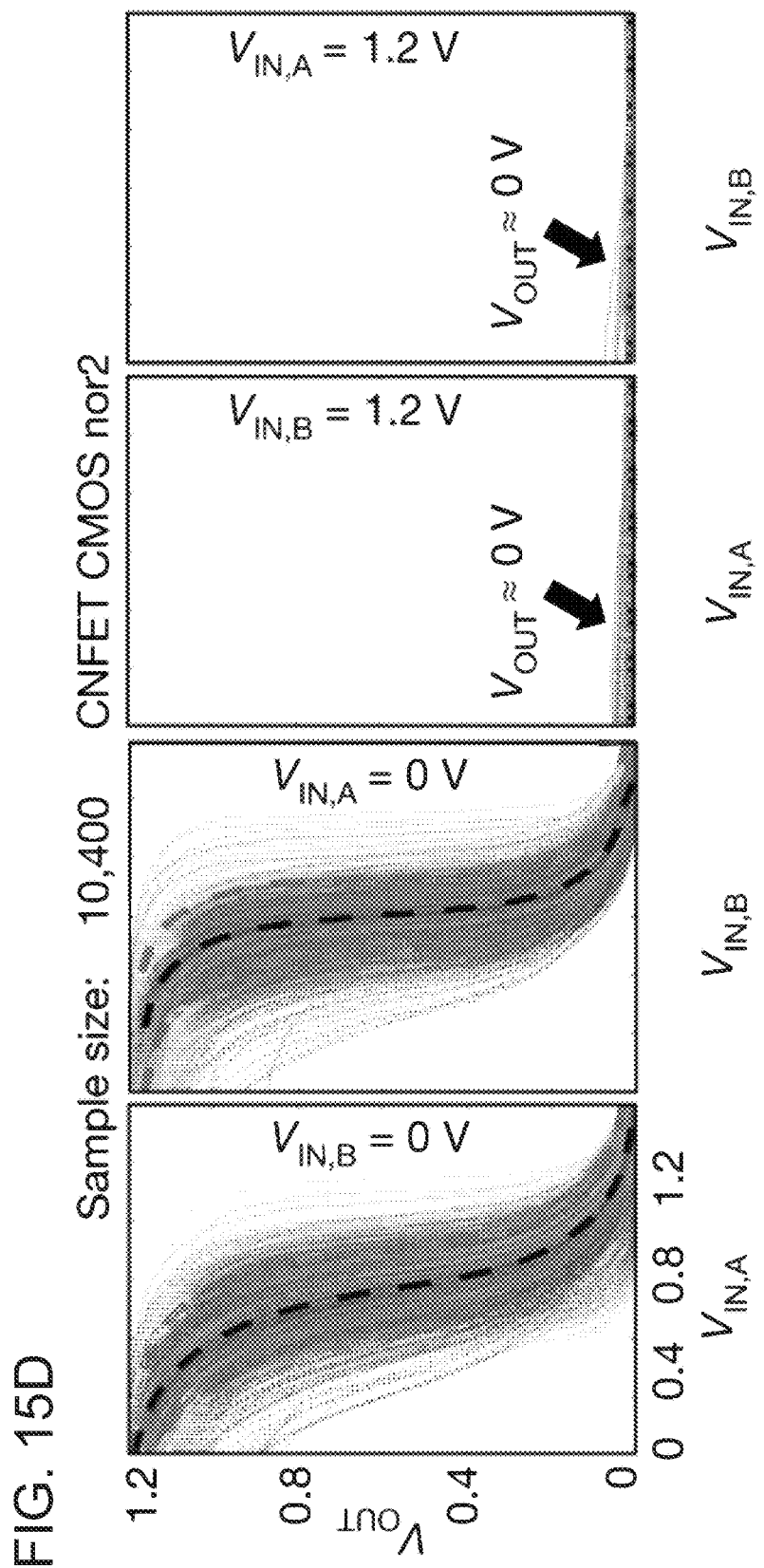

FIG. 15D illustrates output voltage transfer curves (VTCs, $V_{OUT}$ versus $V_{IN}$) for all 10,400 CNT CMOS logic gates (nor2) within a single die of FIG. 15B. Each VTC illustrates $V_{OUT}$ as a function of the input voltage of one input ($V_{IN}$), while the other input is held constant. For each nor2 logic gate (with logical function OUT=!($IN_A$|$IN_B$), the VTC is measured for each of two cases: $V_{OUT}$ versus $V_{IN,A}$ with $V_{IN,B}=0$ V and $V_{OUT}$ versus $V_{IN,B}$ with $V_{IN,A}=0$ V). All 10,400/10,400 exhibit correct functionality (defined as having output voltage swing>70%). The middle dotted line represents the average VTC (average $V_{IN}$ across all measured VTC for each value of $V_{OUT}$), while the outer dotted lines represent the boundary of ±3 standard deviations (again, across all $V_{IN}$ values for each value of $V_{OUT}$). See Example 4 for extracted distributions of key metrics from these experimental measurements (gain, output voltage swing and SNM analyzing>100 million possible cascaded logic gates pairs formed from these 10,400 samples), as well as uniformity characterization across the 150-mm wafer. Despite the high yield and robust CNFET CMOS enabled by MIXED and RINSE, there are outlier gates with degraded output swing (the outermost lines). These outliers are caused by CNT CMOS logic gates that contain metallic CNTs; the third component of the manufacturing methodology (DREAM), is a design technique for overcoming the presence of these metallic CNTs.

Figure 16A:
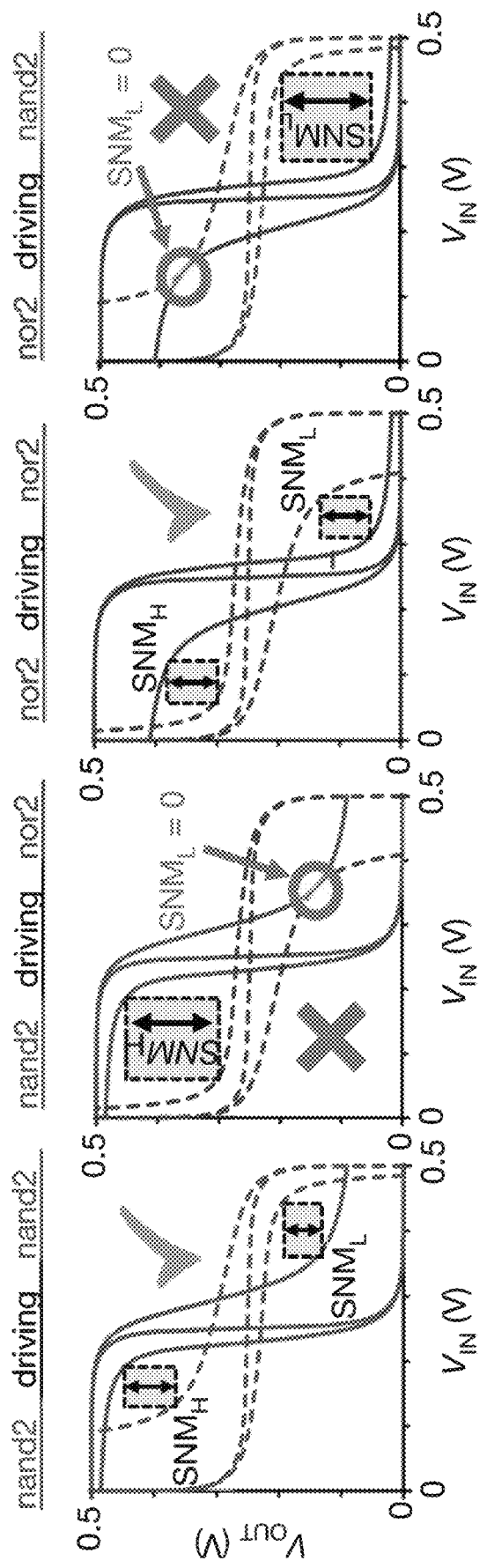

FIG. 16A illustrates, for DREAM, VTCs for driving logic stages and mirrored VTCs for loading logic stages, showing SNM simulated for 4 different logic stage pairs, with up to two metallic CNTs in all CNFETs. The logic stage pairs: (nand2, nand2) and (nor2, nor2) have lower SNMs than do (nand2, nor2) and (nor2, nand2) despite all logic stages having exactly the same VTCs. Logic stages (for example, an inverter) are distinguishable from logic gates (for example, a buffer, by cascading two inverters), where a logic gate can include multiple logic stages. Generally, DREAM overcomes the presence of metallic CNTs through circuit design, and is one component of the manufacturing methodology. DREAM relaxes the requirement on metallic CNT purity by about 10,000×, without imposing any additional processing steps or redundancy. DREAM is implemented using standard EDA tools, has minimal cost (≤10% energy, ≤10% delay and ≤20% area), and enables digital VLSI systems with CNT purities that are available commercially today (e.g., 99.99% semiconducting CNT purity).

Figures 16B, 16C:
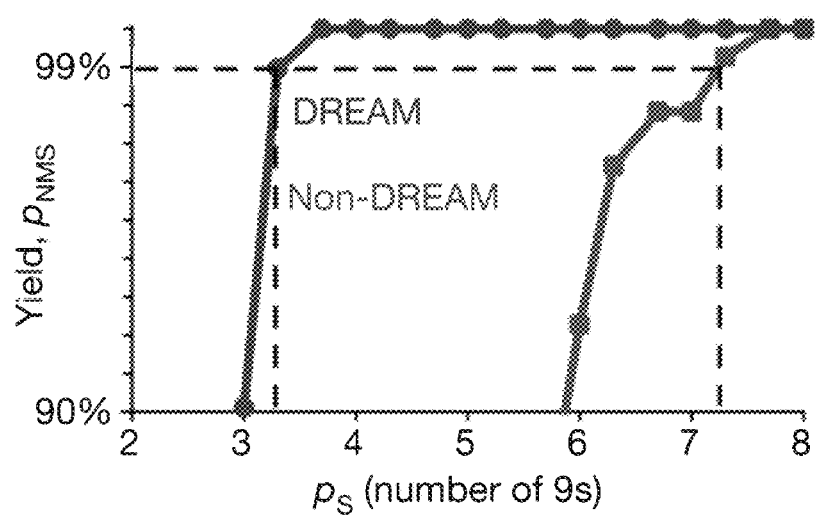

FIG. 16B is an example DREAM SNM table (analyzed for a projected 7-nm node with a scaled $V_{DD}$ of 500 mV), which shows the minimum SNM for each pair of connected logic stages. As an example, values less than 83 mV are highlighted and indicate that these combinations would not be permitted during design, to reduce overall susceptibility to noise at the VLSI circuit level.

FIG. 16C illustrates yield ($p_{NMS}$) versus semiconducting CNT purity for a required SNM level ($SNM_R$) of $SNM_R=V_{DD}/5$, shown for the OpenSparc 'dec' module designed using the 7-nm node CNFET standard library cells derived from the ASAP7 process design kit with a scaled $V_{DD}$ of 500 mV.

Figure 16D:
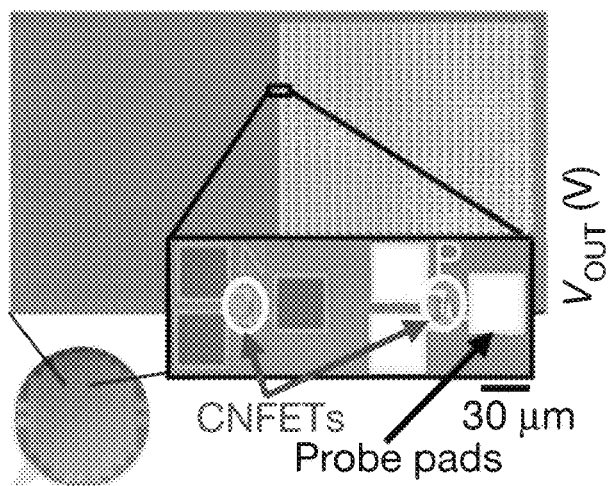

FIG. 16D shows a fabricated CNT CMOS die including 1,000 NMOS CNFETs and 1,000 PMOS CNFETs. Semiconducting CNT purity is $p_S \approx 99.99\%$, with around 15-25 CNTs per CNFET.

Figure 16E:
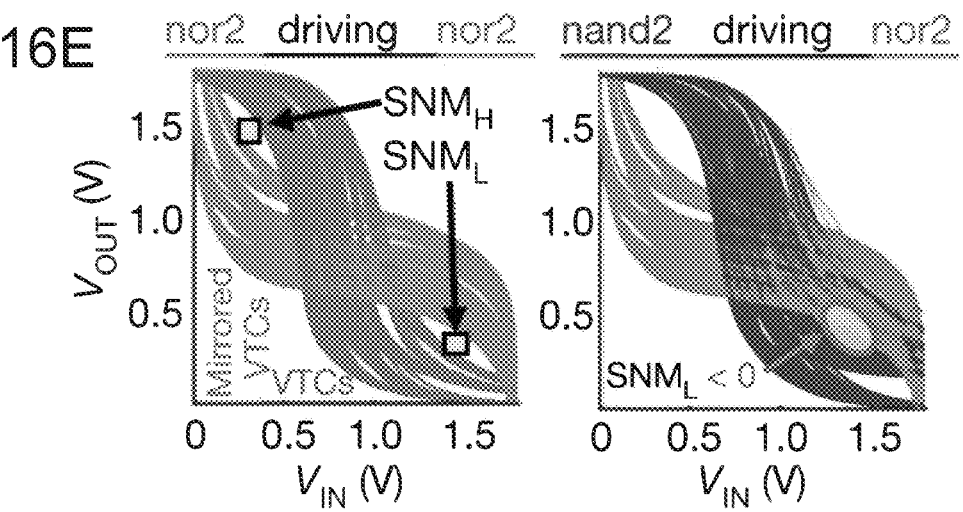

FIG. 16E illustrates VTCs for nand2 and nor2 generated by randomly selecting two NMOS and two PMOS CNFETs from FIG. 16D (some of which contain metallic CNTs). This is repeated to form 1,000 unique nor2 (left panel) and nand2 (right panel) VTCs. The (nor2, nor2) logic stage pairs maintain minimum SNM>0, while the (nand2, nor2) logic stage pairs suffer from minimum SNM<0 in the presence of metallic CNTs; >99.99% of the (nor2, nor2) and (nand2, nand2) logic stage pairs achieve SNM>0 V, while about 97% of the (nand2, nor2) logic stage pairs achieve SNM>0 V.

Figure 16F:
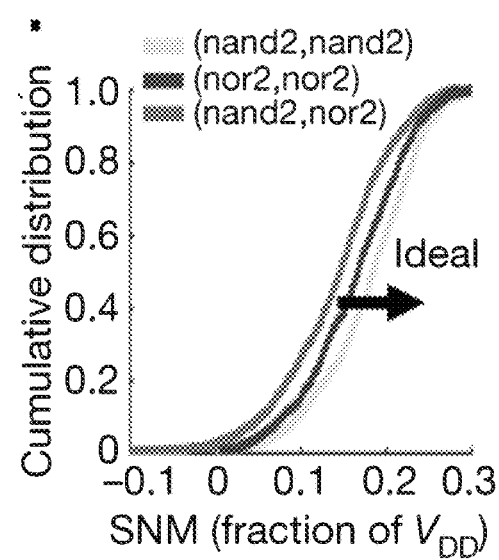

FIG. 16F illustrates cumulative distributions of SNM over one million logic stage pairs. The SNMs for over one million logic stage pairs are analyzed and correspond to all combinations of 1,000 VTCs for the driving logic stage and 1,000 VTCs for the loading logic stage shown in FIG. 16E.

FIGS. 17A-17N illustrate the fabrication process flow for RV16X-NANO. The fabrication process is a 5-metal-layer (M1 to M5) process and involves >100 individual process steps. s-CNT, semiconducting CNT; S/D, source/drain. FIG. 17A illustrates patterning of the first metal layer.

FIG. 17B illustrates deposition of an interlayer dielectric.

FIG. 17C illustrates patterning and etching of vias.

FIG. 17D illustrates bottom gate formation.

FIG. 17E illustrates atomic layer deposition of the gate dielectric.

FIG. 17F illustrates additional etching of vias.

FIG. 17G illustrates CNT deposition.

FIG. 17H illustrates etching to remove CNTs outside the CNFET.

FIG. 17I illustrates PMOS source and drain formation via metal layer deposition.

FIG. 17J illustrates passivation via $SiO_2$ deposition.

FIG. 17K illustrates NMOS source and drain formation via metal layer deposition.

FIG. 17L illustrates deposition of a nonstoichiometric doping oxide (NDO).

FIG. 17M illustrates additional etching of vias and removal of the NDO over the PMOS CNFET.

FIG. 17N illustrates formation of terminals for power distribution.

Figure 18:
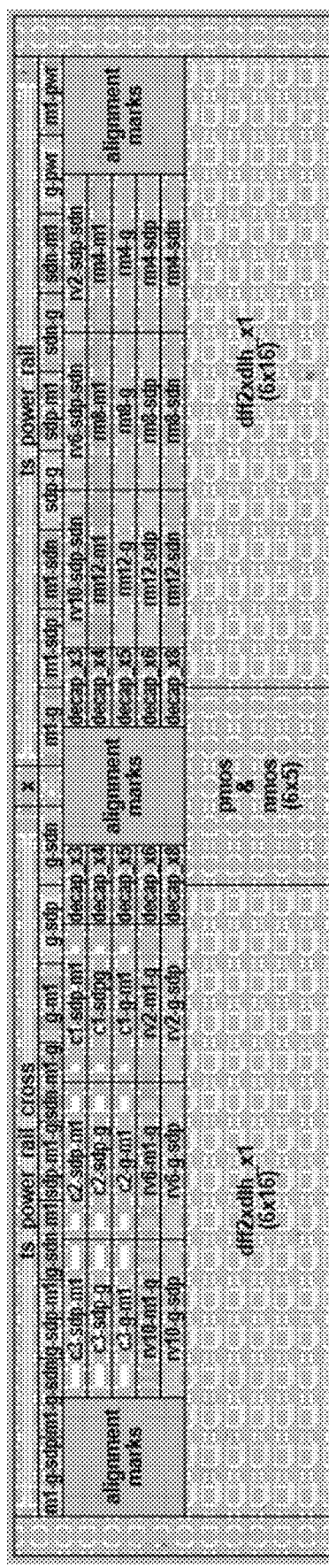

FIG. 18 is a microscopy image of a full fabricated RV16X-NANO die. The processor core is in the middle of the die, with test circuitry surrounding the perimeter (when the RV16X-NANO is diced for packaging, these test structures are removed). The test structures include test structures for monitoring fabrication, as well as for measuring and characterizing all of the 63 standard cells in the standard cell library of FIG. 19.

Figure 19:
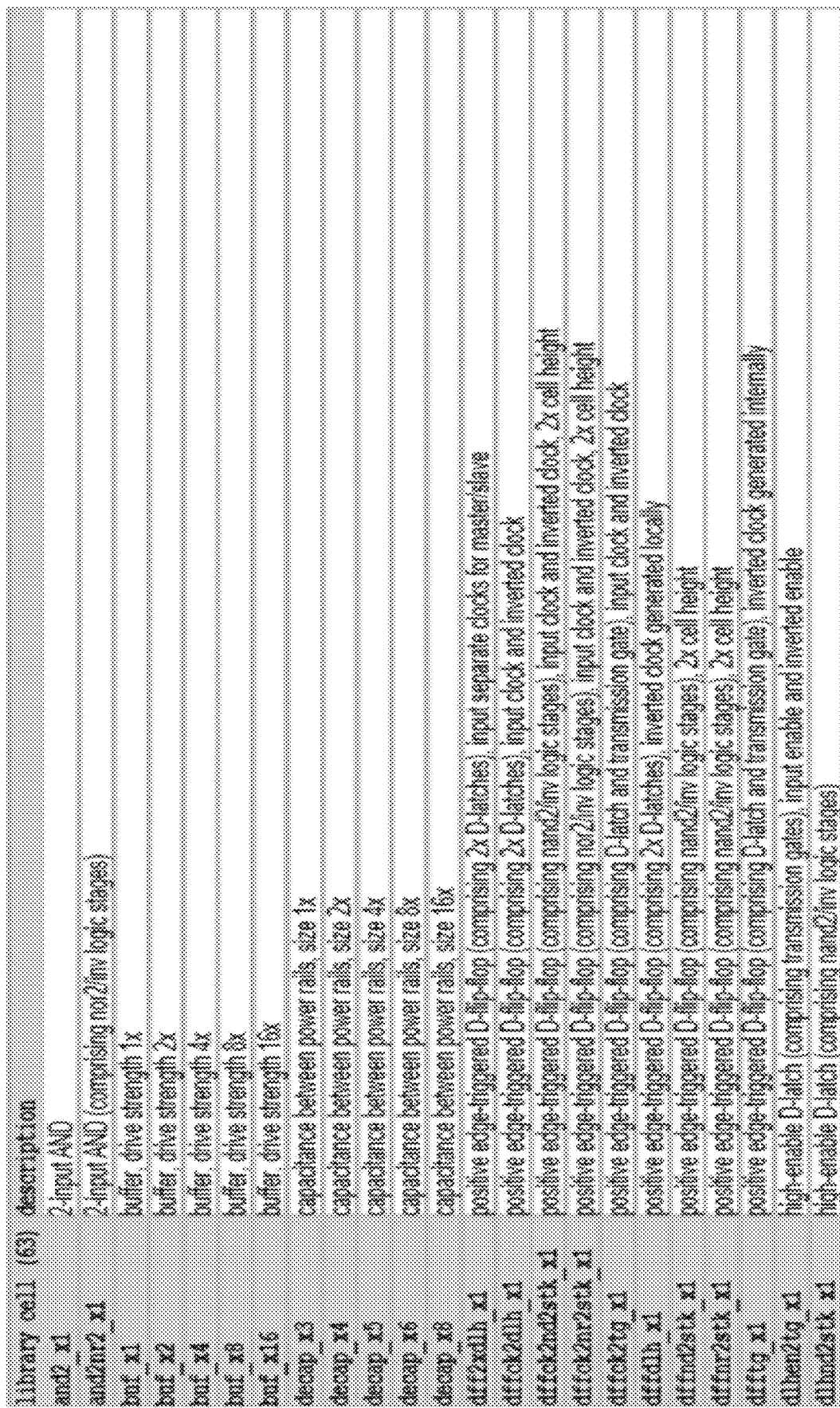

FIG. 19 illustrates a CNFET standard cell library. This is a list of all of the standard cells in a standard cell library as disclosed herein, along with a microscopy image of each fabricated standard cell, the schematic of each cell, and a typical measured waveform from each fabricated cell. As expected for static CMOS logic stages, the CNFET logic stages exhibit output voltage swing exceeding 99% of $V_{DD}$, and achieve gain of >15. Experimental waveforms are not shown for cells whose functionality is not demonstrated by output voltage as a function of either input voltage or time; for example, for cells without outputs (for example, fill cells: cell names that start with 'fill_' or decap cells: cell names that start with 'decap_'), for cells whose output is constant (tied high/low: cell names that start with 'tie_'), or for transmission gates (cell names that start with 'tg_').

Figure 20:
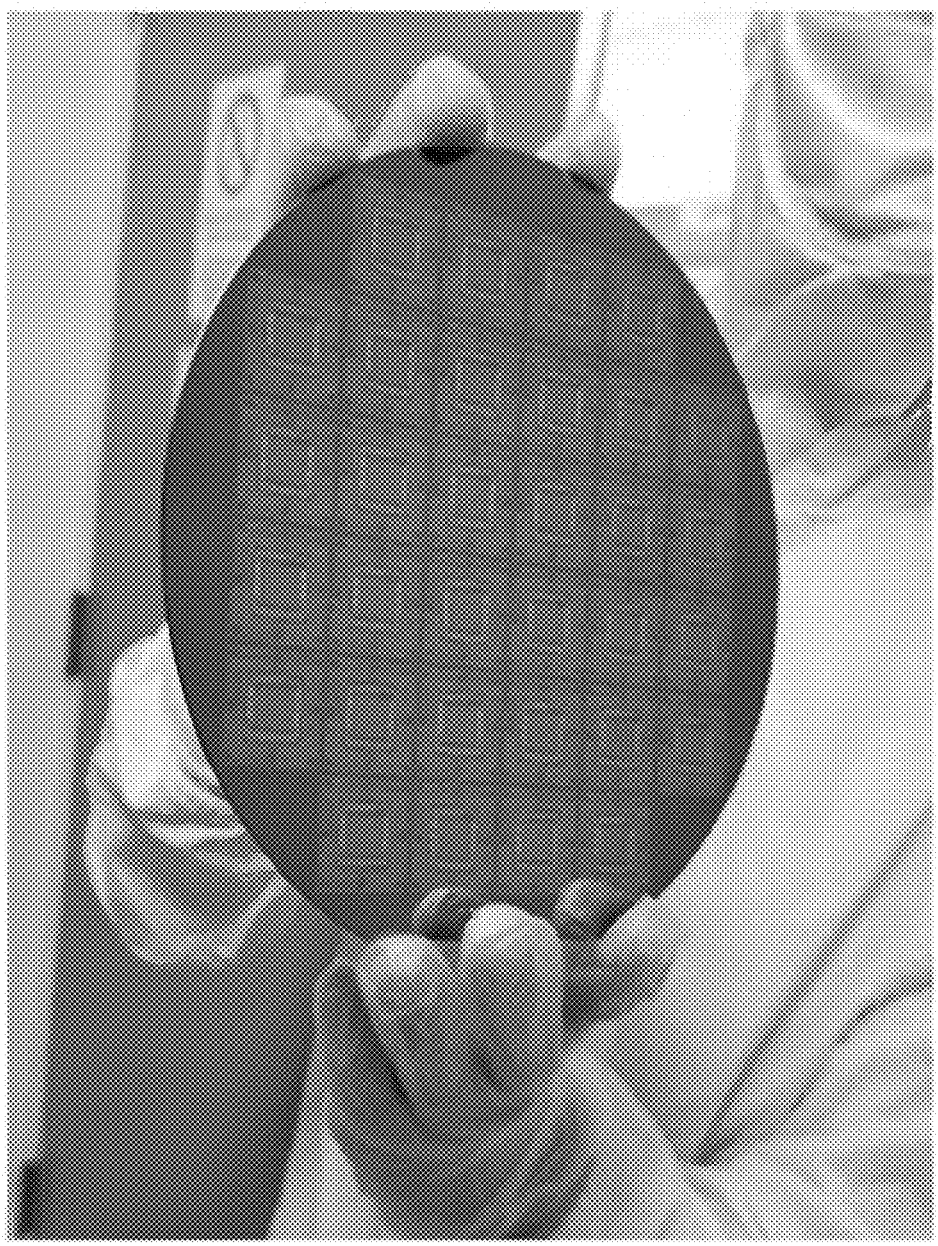

FIG. 20 is an image of a completed RV16X-NANO 150-mm wafer. Each wafer includes 32 dies.

Figure 21A:
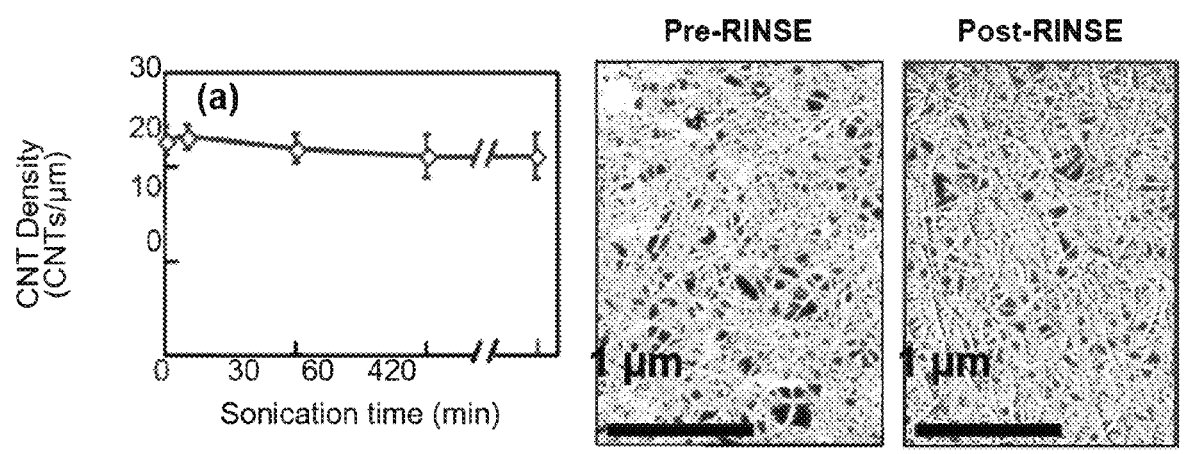

FIG. 21A illustrates the negligible effect of RINSE on CNTs and CNFETs, and that CNT density is the same pre-versus post-RINSE.

Figure 21B:
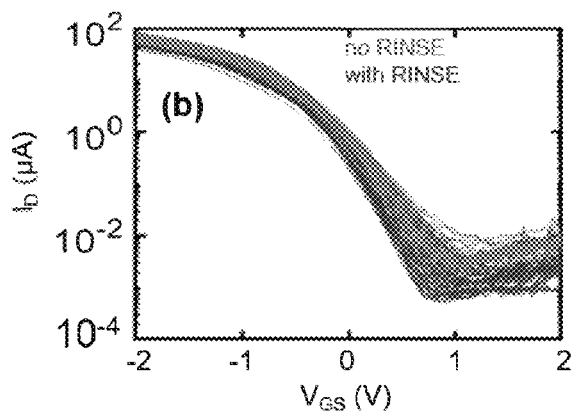

FIG. 21B illustrates how the CNFET $I_D$-$V_{GS}$ curve exhibit minimal change for sets of CNFETs fabricated with and without RINSE ($V_{DS}$=−1.8 V for all measurements shown). Both samples came from the same wafer, which was diced after the CNT deposition but before the RINSE process. One sample underwent RINSE while the other sample did not.

Figure 21C:
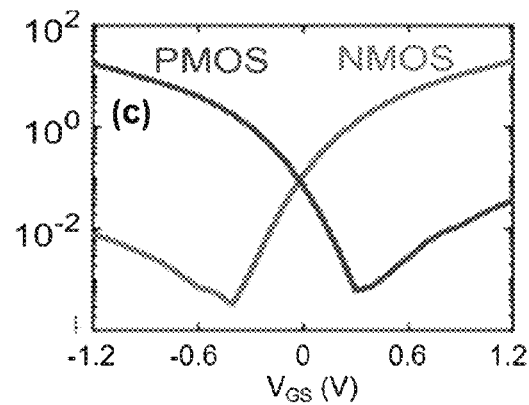

FIG. 21C is a plot illustrating that CNFETs can still be doped NMOS after the RINSE process, leveraging the MIXED process ($V_{DS}$=−1.2 V for all measurements shown).

Figure 22A:
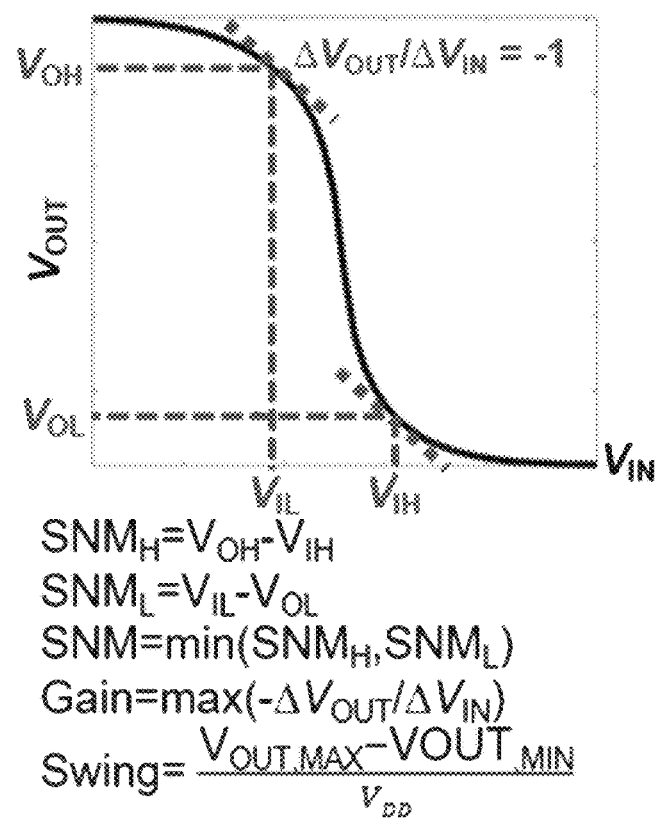

FIG. 22A shows definitions of metrics for characterizing logic gates, including SNM, gain and swing. $V_{OH}$, $V_{IH}$, $V_{IL}$ and $V_{IL}$ (labelled on the VTCs, where ($V_{IL}$, $V_{OH}$) and ($V_{IH}$, $V_{OL}$) are the points on the VTC where $\Delta V_{OUT}/\Delta V_{IN}$=−1) are used to extract the noise margin: SNM=min($SNM_H$, $SNM_L$).

Figure 22B:
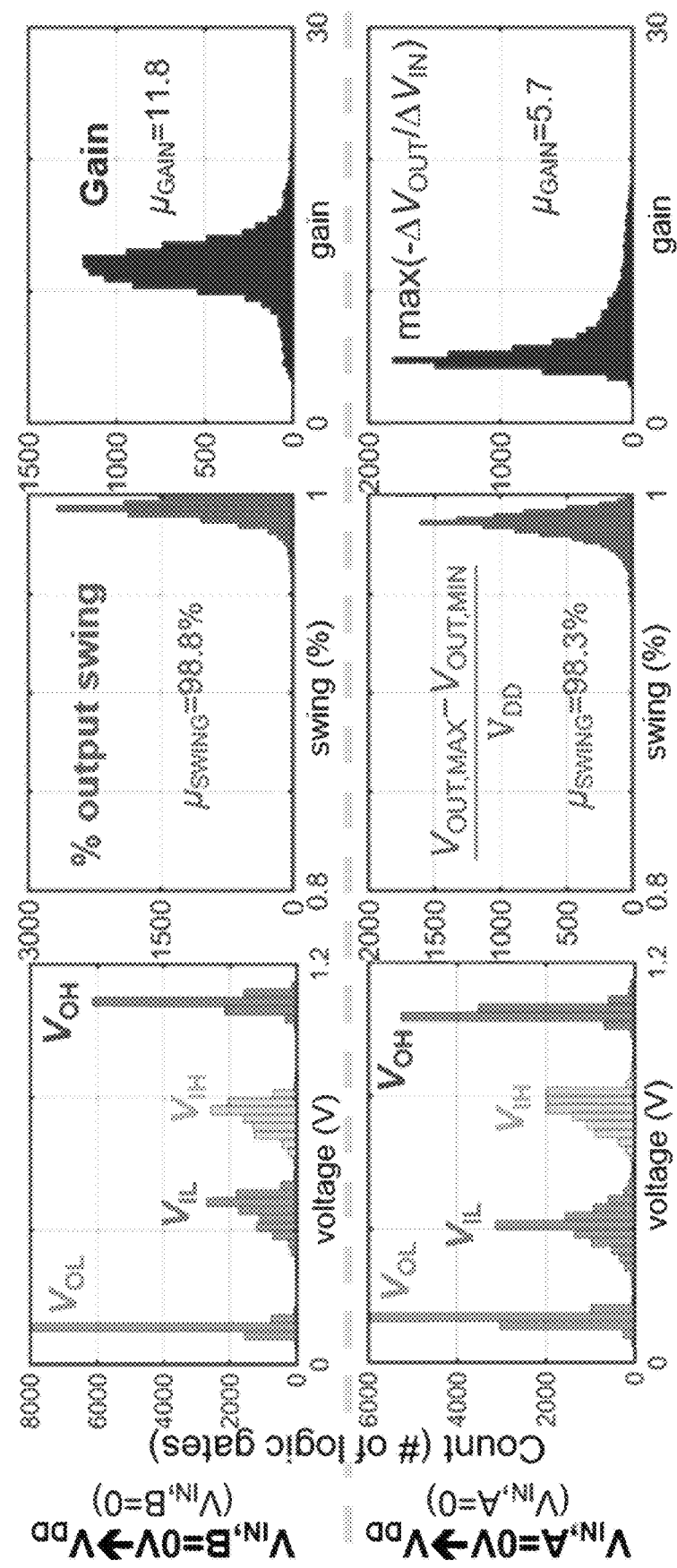

FIG. 22B illustrates metrics (defined in FIG. 22A) extracted for the 10,400 CNFET CMOS nor2 logic gates. $V_{DD}$ is 1.2 V.

Figure 22C:
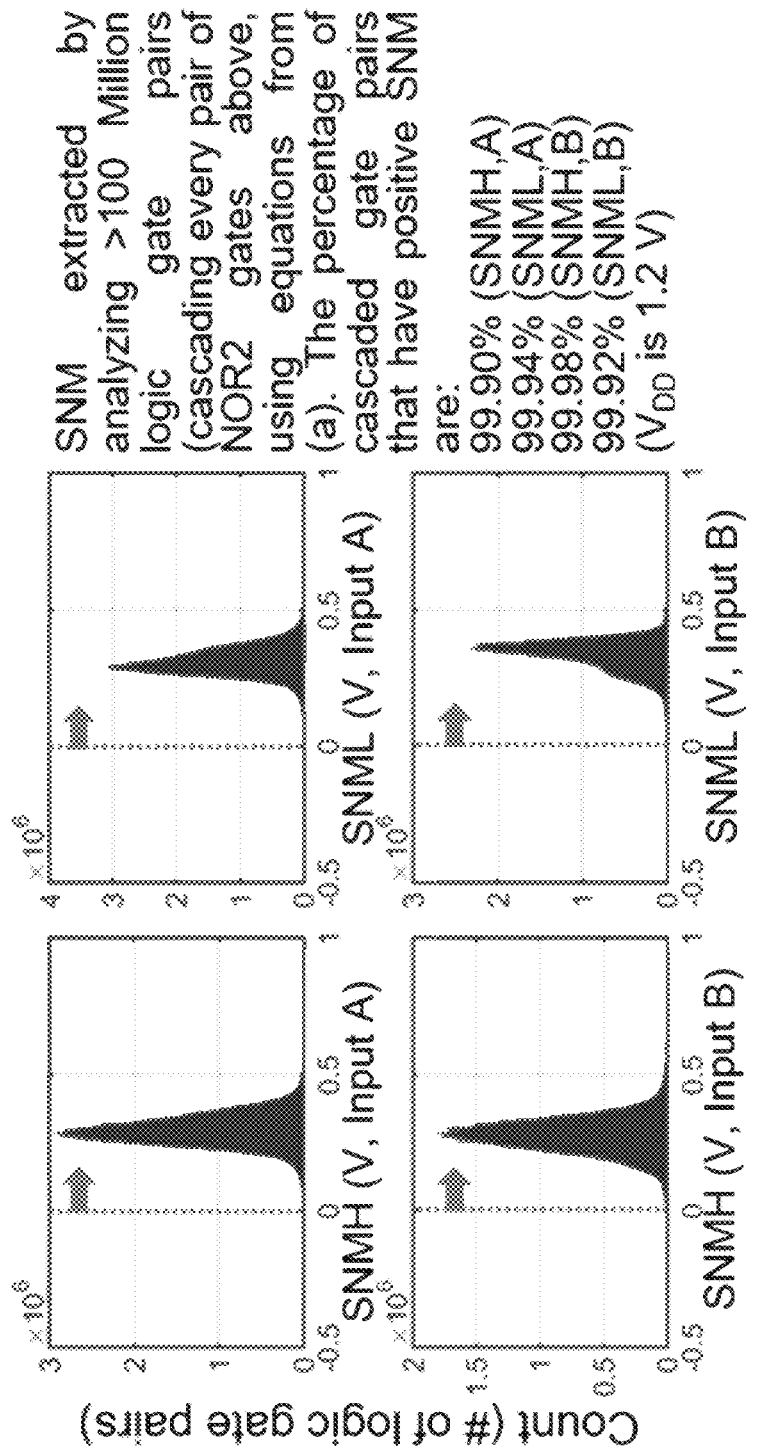

FIG. 22C illustrated SNM extraction based on the distributions from FIG. 22B. >100 million logic gate pairs are analyzed based on these experimental results.

Figure 22D:
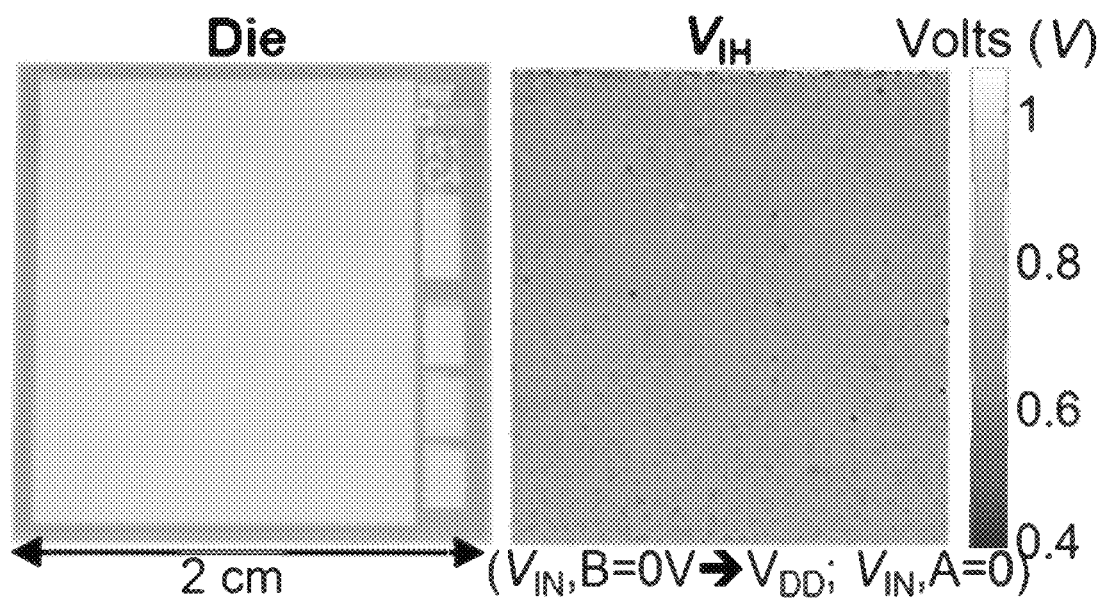

FIG. 22D shows spatial dependence of $V_{IH}$ (as an example parameter to compute SNM). Each pixel represents the VIH of the nor2 at that location in the die. VIH increases across the die (from top to bottom). The change in VIH corresponds with slight changes in CNFET threshold voltage. The fact that the threshold voltage variations are not independently and identically distributed (i.i.d.), but rather have spatial dependence, illustrates that a portion of the threshold voltage variations (and therefore variation in SNM) is due to wafer-level processing-related variations (CNT deposition is more uniform across the 150-mm wafer).

Figure 22E:
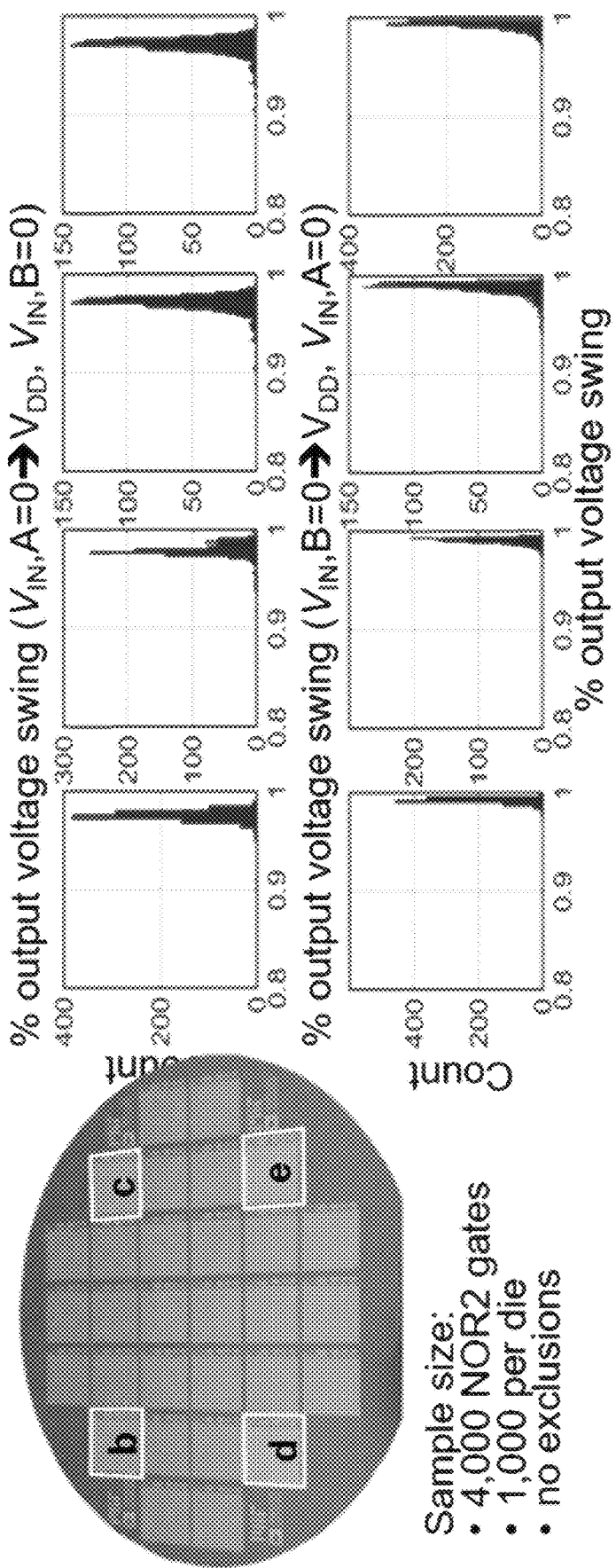

FIG. 22E illustrates wafer-scale CNFET CMOS characterization. Measurements from 4 dies across 150-mm wafer (1,000 CNFET CMOS nor2 logic gates are sampled randomly from the 10,400 such logic gates in each die). No outliers are excluded. Yield and performance variations are negligible across the wafer, as illustrated by the distribution of the output voltage swing.

Figure 23A:
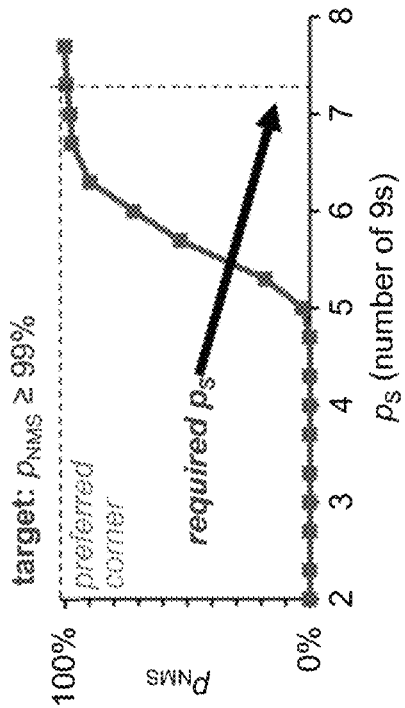

FIG. 23A generally illustrates the effect of metallic CNTs on digital VLSI circuits, and specifically shows reduction in CNFET EDP benefits versus $p_S$ (metallic CNTs increase $I_{OFF}$, degrading EDP). $p_S$≈99.999%, sufficient to minimize EDP cost due to metallic CNTs to ≤5%. Results are simulated for VLSI circuit modules from a 7-nm node processor core.

Figure 23B:
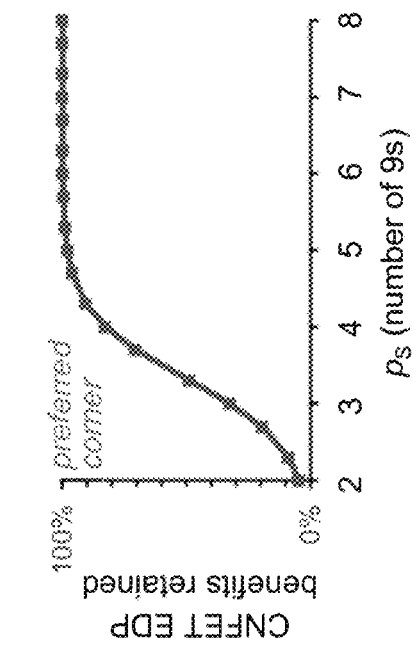

FIG. 23B illustrates, $p_{NMS}$ versus $p_S$ (metallic CNTs degrade SNM), (shown for $SNM_R$=$V_{DD}$/5, and for a circuit of one million logic gates). Although 99.999% $p_S$ is sufficient to limit EDP degradation to ≤5%, this plot shows that SNM imposes stricter requirements on purity: $p_S$≈99.999999% to achieve pNMS≥99%. Results are simulated for VLSI circuit modules from a 7-nm node processor core.

Figure 24B:
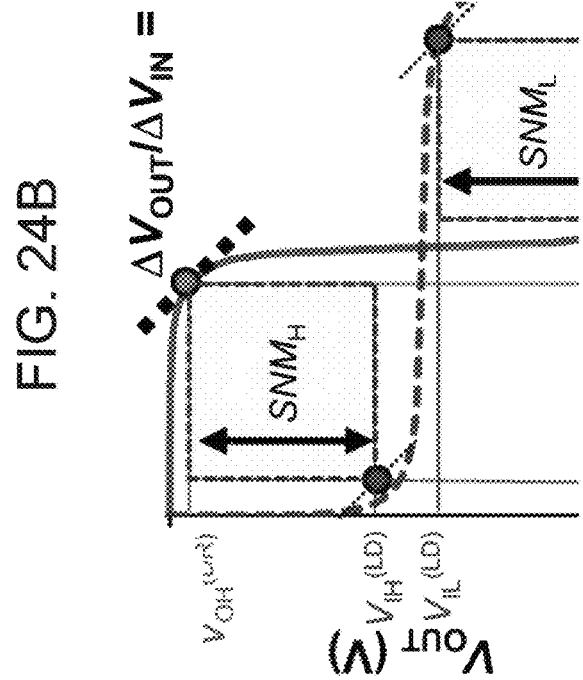
Figure 24A:
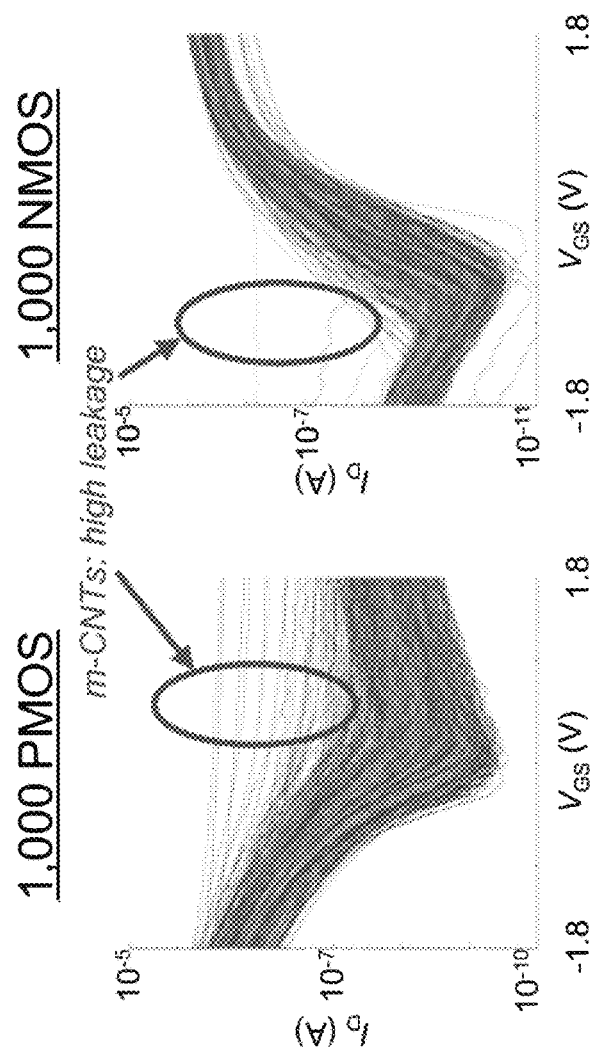

FIG. 24A generally shows a methodology to solve VTCs using CNFET I-V measurements, and specifically illustrates experimentally measured $I_D$ versus $V_{GS}$ for all 1,000 NMOS ($V_{DS}$=1.8 V) and 1,000 PMOS CNFETs ($V_{DS}$=−1.8 V), with no CNFETs omitted. Metallic CNTs (m-CNTs) present in some CNFETs result in high off-state leakage current ($I_{OFF}$=$I_D$ at $V_{GS}$=0 V). CNFETs are fabricated at a ~1 μm technology node, and the CNFET width is 19 μm.

FIG. 24B shows VTC and SNM parameter definitions, for example, for (nand2, nor2). DR is the driving logic stage; LD is the loading logic stage. SNM=min($SNM_H$, $SNM_L$), where $SNM_H$=$V_{OH}$(DR)−$V_{IH}$(LD) and $SNM_L$=$V_{IL}$(LD)−$V_{OL}$(DR).

FIG. 24C illustrates example $I_D$ versus $V_{DS}$ for NMOS and PMOS CNFETs ($V_{GS}$ is swept from −1.8 V to 1.8 V in 0.1-V increments).

FIG. 24D is a circuit schematic to solve a VTC (for example, $V_{OUT}$ versus $V_A$ with $V_B$=$V_{DD}$): for each $V_A$, find $V_1$ and $V_{OUT}$ such that $i_{PA}$+$i_{PB}$=$i_{NA}$=$i_{NB}$ (DC, direct current, convergence).

FIG. 24E illustrates current in the pull-up network ($i_{PU}$, where $i_{PU}$=$i_{PA}$+$i_{PB}$, and $i_{PA}$ and $i_{PB}$ are the labelled drain currents of the PMOS FETs gated by A and B, respectively) and current in the pull-down network ($i_{PD}$, where $i_{PD}$=$i_{NA}$=$i_{NB}$, and $i_{NA}$ and $i_{NB}$ are the labelled drain currents of the NMOS FETs gated by A and B, respectively) versus $V_{OUT}$ and $V_A$. The VTC is seen where these currents intersect.

Figures 25A, 25B:
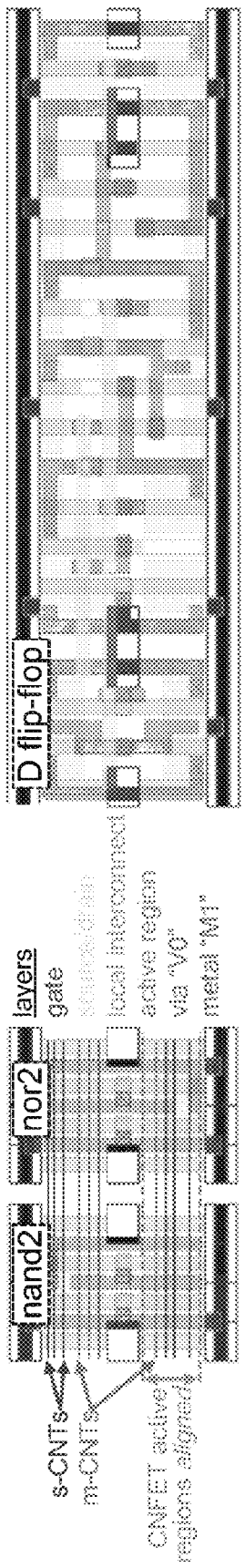

FIG. 25A generally illustrates DREAM implementation and methodology, and specifically shows standard cell layouts (derived using the 'asap7sc7p5t' standard cell library), illustrating the importance of CNT correlation: because the length of CNTs (which can be of the order of hundreds of micrometers) is typically much longer compared with the CNFET contacted gate pitch (CGP, for example about 42-54 nm for a 7-nm node), the number of s-CNTs and m-CNTs in CNFETs can be uncorrelated or highly correlated depending on the relative physical placement of CNFET active regions. For many CMOS standard cell libraries at sub-10-nm nodes, the active regions of FETs are highly aligned, resulting in highly correlated number of m-CNTs among CNFETs in library cells, further degrading VTCs (because one m-CNT can affect multiple CNFETs simultaneously).

FIG. 25B generally illustrates how to generate a variation-aware CNFET SNM model, shown for a D-flip-flop (dff)

derived from the asap7sc7p5t standard cell library. Specifically, shown is a layout used to extract netlists for each logic stage.

Figure 25C:
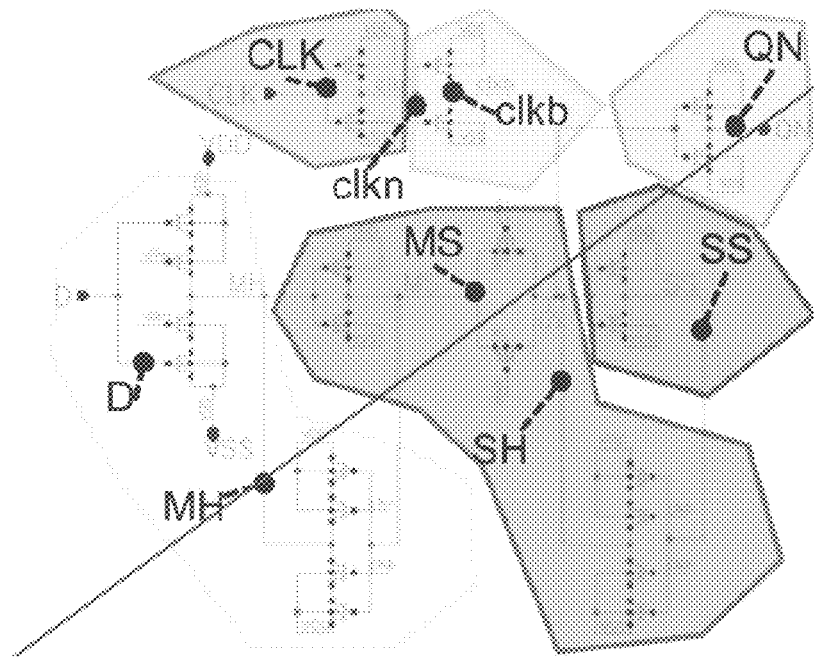

FIG. 25C is a schematic illustrating how CNFETs are grouped by logic stage (with nodes arbitrarily labelled 'D', 'MH', 'MS', SH', 'SS', 'CLK', 'clkn', 'clkb' and 'QN' for ease of reference).

Figure 25D:
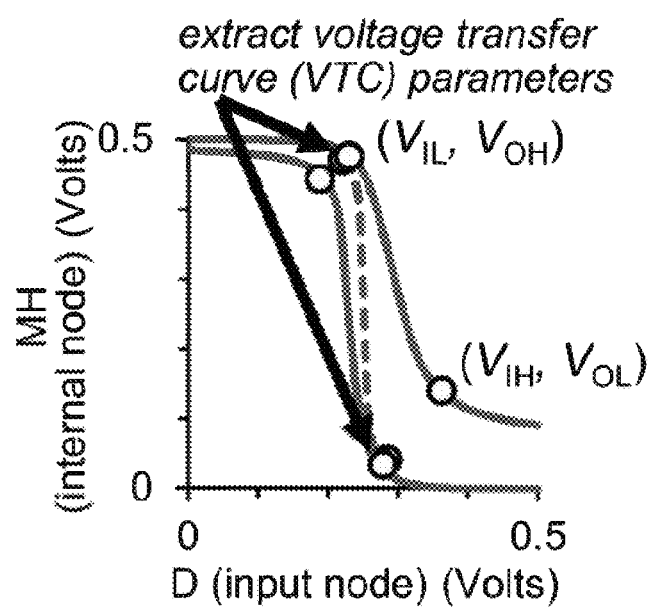

FIG. 25D shows that for each extracted netlist, there can be multiple VTCs: for each logic stage output, a logic stage input is sensitized if the output state (0 or 1) depends on the state of that input (given the states of all the other inputs). For example, for a logic stage with Boolean function: Y=!(A*B+C), C is sensitized when (A, B)=(0, 0), (0, 1) or (1, 0). All possible VTCs are simulated (over all logic stage outputs and sensitized inputs), and also in the presence of m-CNTs. For example, FIG. 25D shows a subset of the VTCs for the logic stage in FIG. 25B with output node 'MH' (labelled in FIG. 25C), and sensitized input '13' (with labelled nodes 'clkn', 'MS')=(0, 1, 0)). The dashed line indicates VTC with no m-CNTs, and the solid lines are example VTCs in the presence of m-CNTs (including the effect of CNT correlation). In each case, VOH, VIH, VIL and VOL are modeled as affine functions of the number of m-CNTs ($M_i$) in each of r regions ($M_1$, . . . , $M_r$), with calibration parameters in the static noise margin (SNM) model matrix T (shown in FIG. 25F).

Figures 25E, 25F:
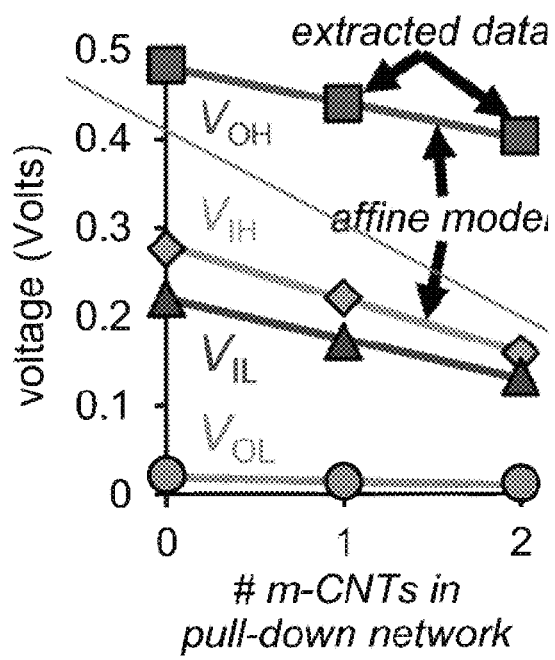

FIG. 25E illustrates an example calibration of the SNM model matrix T for the VTC parameters extracted in FIG. 25D. The symbols are VTC parameters extracted from circuit simulations (using Cadence Spectre), and solid lines are the calibrated model.

FIG. 25F illustrates the Affine model form used to compute SNM in the presence of metallic carbon nanotubes (m-CNTs).

Figure 25G:
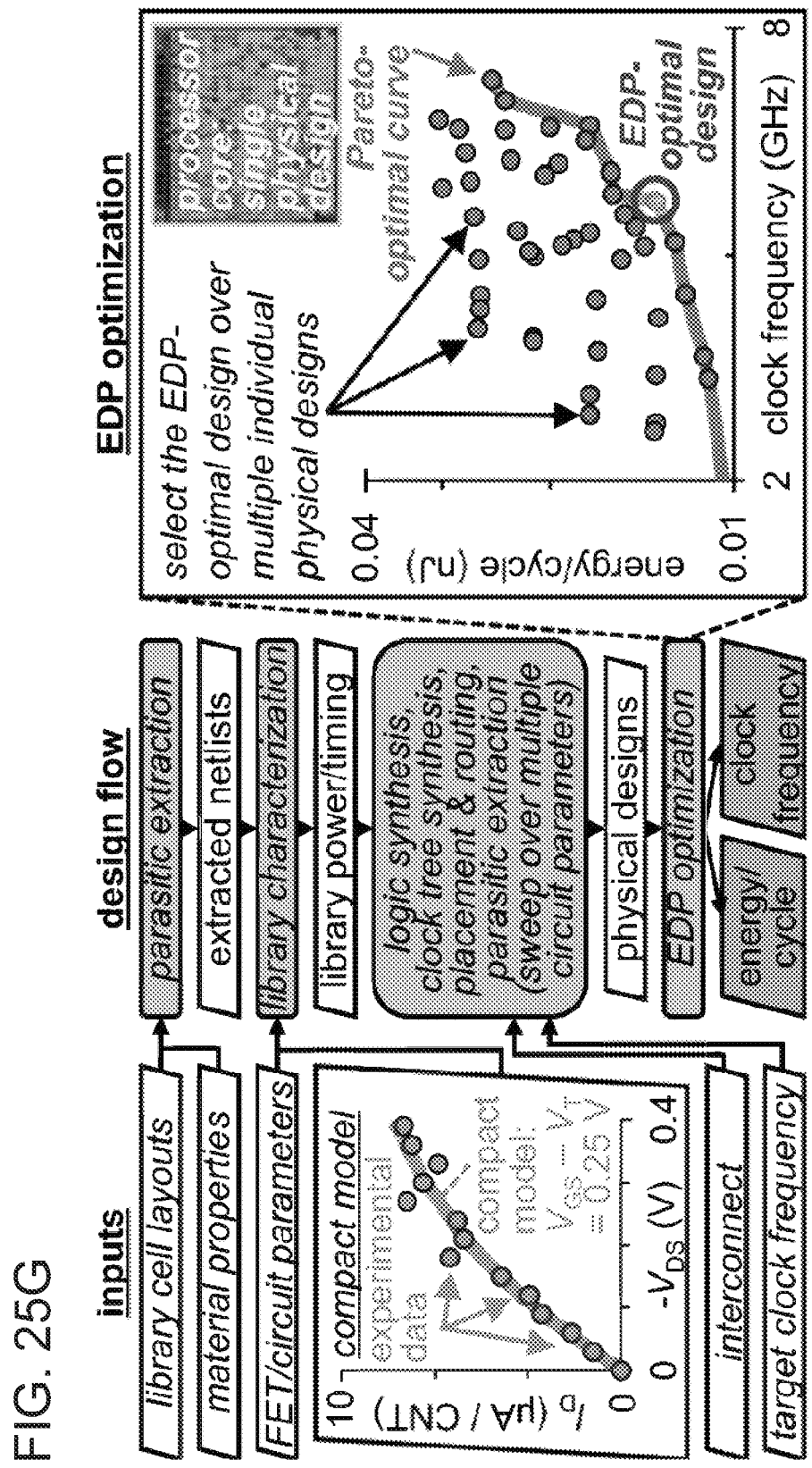

FIG. 25G illustrates design flow to optimize energy and delay of CNFET digital VLSI circuits, including: (1) library power/timing characterization (using Cadence Liberate) across multiple VDD and using parasitics extracted from standard cell layouts (derived from the asap7sc7p5t standard cell library), in conjunction with a CNFET compact model; (2) Synthesis (using Cadence Genus), place-and-route (using Cadence Innovus) with back-end-of-line (BEOL) wire parasitics from the ASAP7 process design kit (PDK); (3) Circuit EDP optimization: both VDD and target clock frequency are swept (during synthesis/place-and-route) to create multiple physical designs. The one with best EDP is used to compare design options (for example, DREAM versus baseline).

Figure 25H:
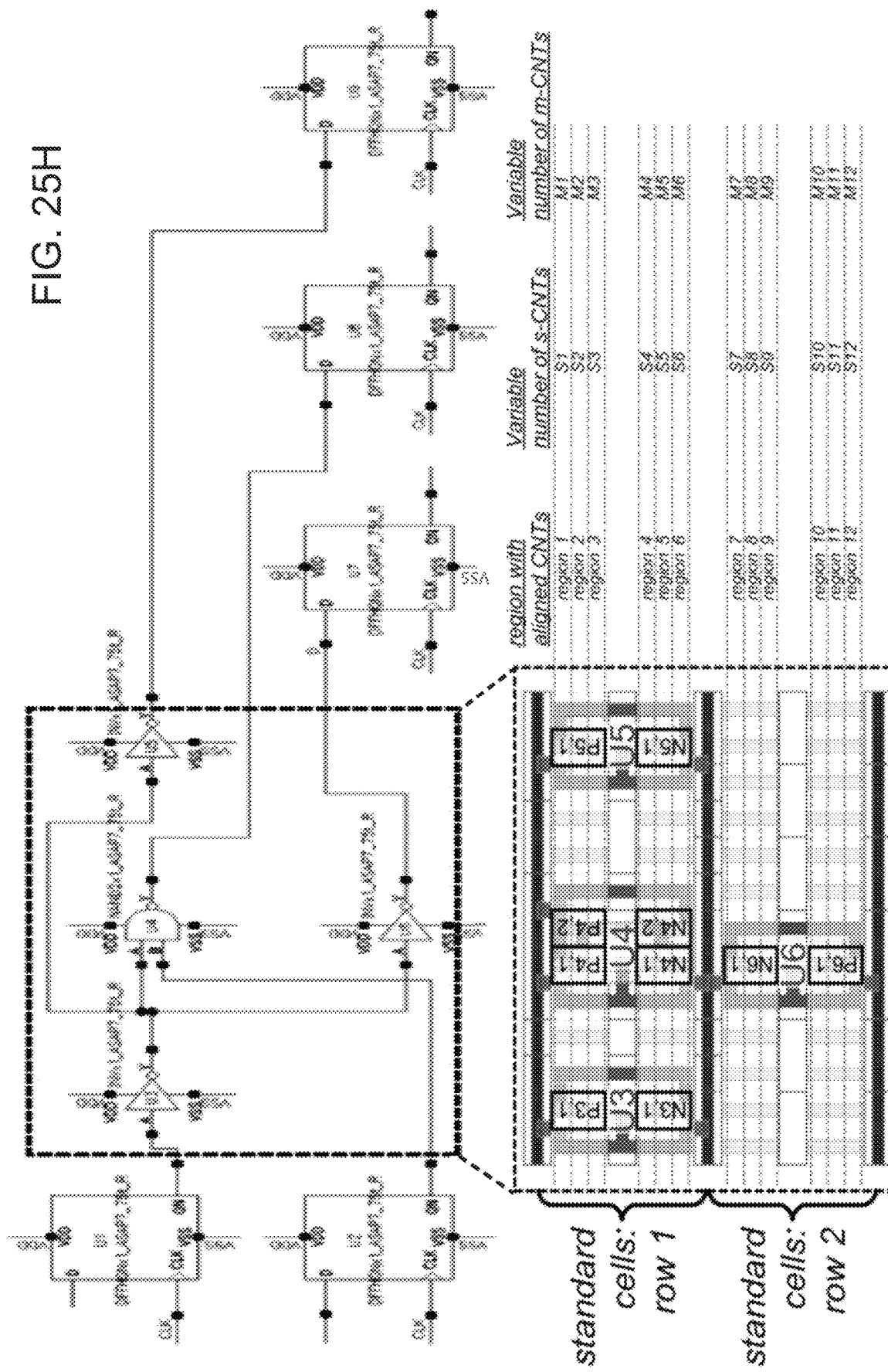

FIG. 25H illustrates a subset of logic gates in an example circuit module, showing the effect of CNT correlation at the circuit level (for example, the m-CNT counts of CNFETs $P_{3,1}$ and $P_{5,1}$ are both equal to $M_1+M_2+M_3$).

FIG. 25I illustrates distribution of SNM over all connected logic stage pairs, for a single sample of the circuit m-CNT counts. The minimum SNM for each trial limits the probability that all noise margin constraints in the circuit are satisfied ($p_{NMS}$).

FIG. 25J illustrates cumulative distribution of minimum SNM over 10,000 Monte Carlo trials, shown for multiple target $p_S$ values, where $p_S$ is the probability that a given CNT is a semiconducting CNT. These results are used to find $p_{NMS}$ versus $p_S$ for a target SNM requirement ($SNM_R$), where $p_{NMS}$ is the fraction of trials that meet the SNM requirement for all logic stage pairs. Note that $p_{NMS}$ can then be exponentiated to adjust for various circuit sizes based on the number of logic gates.

FIG. 25K illustrates CNFET compact model parameters (for example, for a 7-nm node).

FIG. 26 illustrates details of implementing RISC-V instruction set architecture. The top panel shows all supported instructions implemented in RV16X-NANO, adhering to RISC-V format specifications for RV32E, with high-level description summary for each. Each instruction is categorized into one of six formats, including instruction type (R-type, I-type, S-type, U-type) and immediate variant (I-immediate, U-immediate, B-immediate, J-immediate, S-immediate), forming one of six formats (type immediate): R, I-I, I-U, S-B, S-S, U-J (shown in the bottom panel). For the assembly code, 'rd' is the destination register, 'rs1' is the source register 1, 'rs2' is the source register 2, 'imm' is immediate. The bottom panel shows the bit-level description of each instruction format. The bottom 7 bits (inst[6:0]) are always the OPCODE, and then the remaining bits are decoded depending on the instruction format (determined by the OPCODE). Values that are crossed out indicate bits that are not used for the 16-bit data path implementation (RV16E) with four registers, instead of 32-bit data path implementation (RV32E) with 16 registers. For example, for instruction 'auipc', only 2 of the 5 reserved bits for 'rd' are required to address the register file for register 'rd' (because there are only $2^2=4$ registers instead of $2^5=32$), and also the upper 16 bits of the 32-bit immediate (that is, imm[31:16]) are not used because the data path is truncated to 16 bits.

Figure 27:
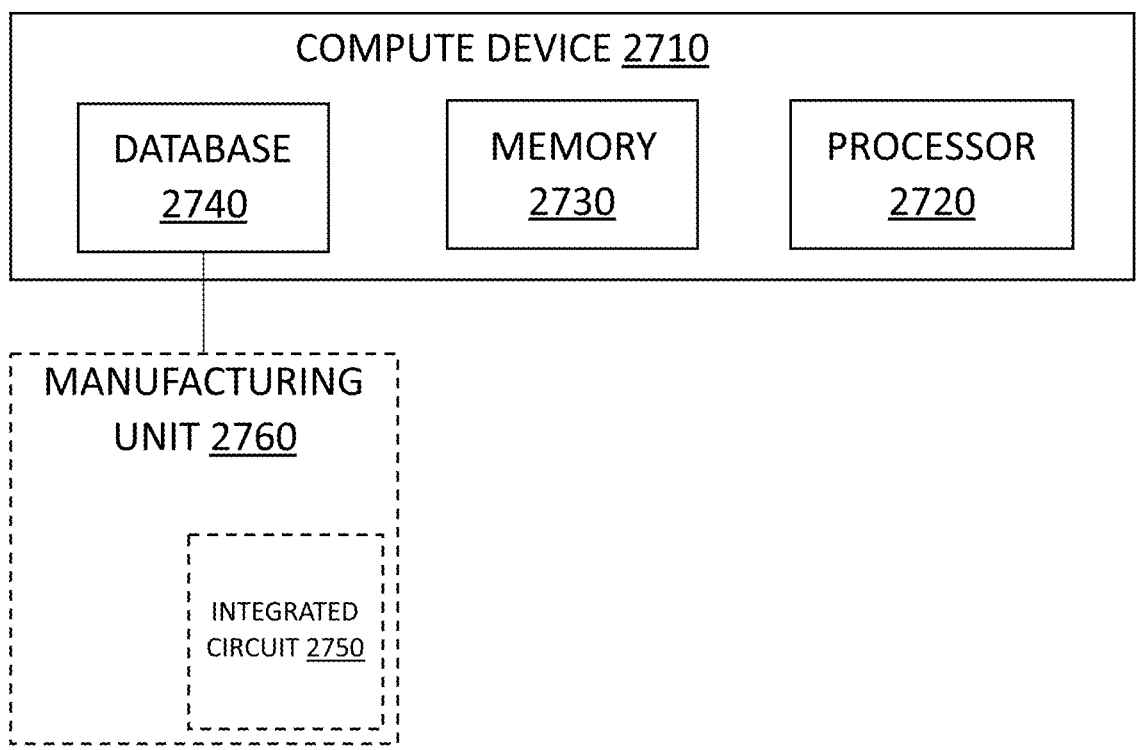

FIG. 27 illustrates a system for designing an integrated circuit.

FIG. 28 illustrates a method for designing an integrated circuit.

FIG. 29 illustrates another method for designing and making an integrated circuit.

Figure 30:
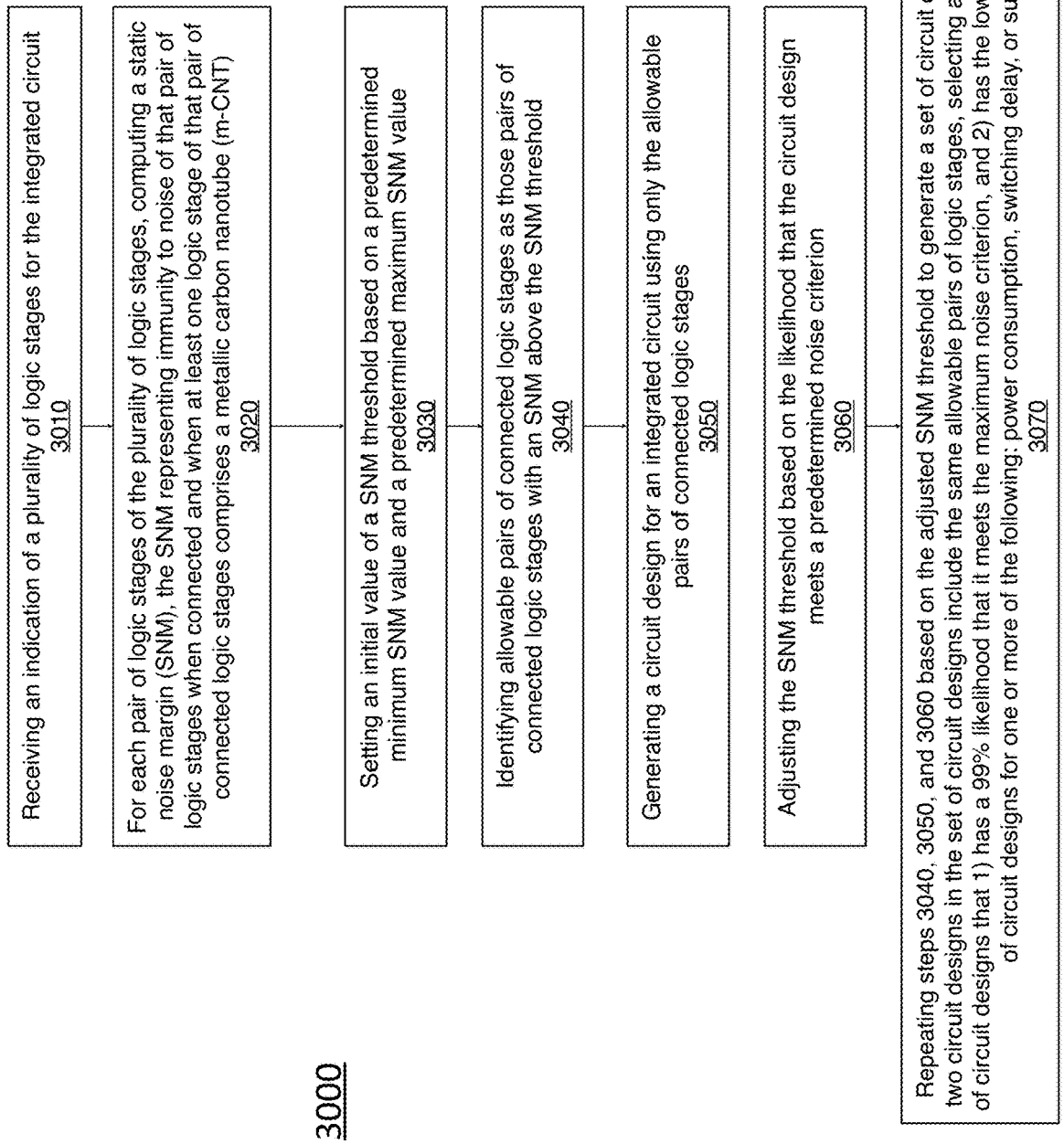

FIG. 30 illustrates another method for designing an integrated circuit.

DETAILED DESCRIPTION

Although Carbon Nanotube (CNT) Field-Effect Transistors (CNFETs) promise to improve the energy efficiency of digital logic circuits, CNTs are subject to metallic carbon nanotubes (m-CNTs) that prevent these benefits from being realized. m-CNTs cannot be controlled by the gate and therefore leak power and can cause incorrect logic functionality. Despite many attempts, no technique to overcome m-CNTs has yet been able to achieve the desired semiconducting CNT (s-CNT) purity ($p_S$). While ~99.999,999% $p_S$ is desired for digital VLSI circuits, previous approaches achieve a maximum $p_S$ of 99.99% and impose substantial additional (and often not high-volume manufacturing (HVM)-compatible) processing steps.

Systems and methods as described herein, also referred to as "DREAM" (Designing Resilience Against Metallic CNTs), overcome or mitigate the presence of metallic CNTs through circuit design. Generally, such a system can include a database and/or a memory that stores a cell library, which in turn can be a specification of logic stages that can be used, or are useful, for the circuit design. A processor coupled to the database/memory calculates the SNM for any two pairs of logic stages that are connected or are connectable. The processor accounts for the probability that a given logic stage may include an m-CNT and the effect that the m-CNT would have on the SNM of the pairs that include that logic stage. If the SNM for the logic stage pair exceeds some SNM threshold despite the possible presence of an m-CNT, the processor may use that pair as connected logic gates in the circuit design. By using only those pairs of connected logic gates whose SNMs are above the threshold SNM, the processor can design an IC whose performance meets one or more desired criteria despite the presence of m-CNTs.

Such a circuit design can be evaluated for several parameters, such as against a predetermined noise criterion for the circuit, energy/power consumption, switching delay, surface area, etc. The SNM can then be varied as described in greater detail below, and additional circuit designs can be generated based on which logic stage are allowable for that design. The generated designs can then be compared to each other based on one or more of the parameters, such as the noise criterion and area, to select the design that is optimized for an intended use. In this manner, the presence of m-CNTs is mitigated while reducing purity demands but nonetheless delivering acceptable circuit performance. In some cases, such a system can include a manufacturing unit that generates the integrated circuit based on the design as further described herein with respect to, for example, FIG. 17.

DREAM techniques can be used for anything that degrades SNM, not just m-CNTs (although m-CNTs are a good example). They can also be used for any transistor technology, including CMOS and CNT transistor technology, and can be used to optimize an IC over a wide variety of parameters, including IC area, speed, power consumption, and cost. DREAM techniques can make chips more robust to several different types of radiation effects, including total-ionizing-dose and soft-errors, which can be useful for designing chips for outer-space applications. They are also useful for designing ultra-low-power ICs and sub-threshold ICs that work with lower supply voltages.

Systems and Methods

FIG. 27 is a schematic illustration of an environment/system 2700 in which such integrated circuit design can be implemented and/or carried out. In some embodiments, aspects of the system 2700 can perform circuit design as described with respect to FIGS. 1-26 and/or can perform the methods shown in FIGS. 28-30.

The system 2700 includes a compute device 2710 and optionally (as shown by dotted lines) a manufacturing unit 2760. In some embodiments, all components of the system 2710 can be included in a common casing, such as a single housing that presents the system 2700 as an integrated, one-piece device for a user. In other embodiments, the components of the system 2700 can be in separate locations, housings, and/or devices. For example, the compute device 2700 can be a laptop device in communication with the manufacturing unit 2760 via one or more networks, such as a local area network (LAN), a wide area network (WAN), a virtual network, a telecommunications network, and/or the Internet, implemented as a wired network and/or a wireless network. Any or all communications can be secured (e.g., encrypted) or unsecured, as is known in the art. The system 2700 and/or the compute device 2710 can be or encompass a personal computer, a server, a workstation, a tablet, a mobile device, a cloud computing environment, an application or a module running on any of these platforms, and/or the like.

The compute device 2710 includes at least a processor 2720 and a memory 2730. FIG. 27 also illustrates a database 2740, although it will be understood that, in some embodiments, the database 2740 and the memory 2730 can be a common data store. Some embodiments may include a set of databases instead of a single database. Further, in other embodiments (not shown), at least one database can be external to the device 2710 and/or the system 2700. The compute device 2710 can also include one or more input/output (I/O) interfaces (not shown), implemented in software and/or hardware, for other components of the system 2700, and/or external to the system 2700, to interact with the device 2710.

The memory 2730 and/or the database 2740 can each be, for example, a random access memory (RAM), a memory buffer, a hard drive, a database, an erasable programmable read-only memory (EPROM), an electrically erasable read-only memory (EEPROM), a read-only memory (ROM), Flash memory, and/or so forth. The memory 2730 and/or the database 2740 can store instructions to cause the processor 2720 to execute processes and/or functions associated with the system 2700 such as, for example, for circuit design. The database 2740 and/or the memory 2730 can store indications of logic stages and connected logic stages for designing an integrated circuit. Each set of logic stages can include a cell library, described in more detail below (e.g., see FIG. 3A).

The processor 2720 can be any suitable processing device configured to run and/or execute a set of instructions or code associated with the device 2710. The processor 2720 can be, for example, a general purpose processor, a Field Programmable Gate Array (FPGA), an Application Specific Integrated Circuit (ASIC), a Digital Signal Processor (DSP), and/or the like.

The processor 2720 can be communicably coupled to the memory 2730 and/or the database 2740. The processor 2720 can, for each pair of logic stages of the set of logic stages, compute a static noise margin (SNM). The SNM represents immunity to noise of that pair of logic stages when connected to each other. The computed SNM values can be stored in a SNM table (e.g., see FIG. 3B) in the memory 2730 and/or the database 2740. The processor 2720 can compute the SNM for that pair of connected logic stages by measuring voltage-transfer characteristics (e.g., generating VTC curves) for that pair of connected logic stages. It can generate such characteristics by varying a number of metallic-carbon nanotube (m-CNT) in one or both logic stages of that pair of logic stages.

The processor 2720 can also set an initial value of a SNM threshold against which to compare these SNM values. The SNM threshold can be based on a predetermined minimum SNM value and a predetermined maximum SNM value that can be user provided and/or otherwise determined. Then, the processor 2720 can identify allowable pairs of connected logic stages as those pairs of connected logic stages with an SNM above the SNM threshold (e.g., see resulting SNM table in FIG. 3C). The processor 2720 can further generate a circuit design for the integrated circuit using only the allowable pairs of connected logic stages. The processor 2720 can also determine one or more performance parameter for the integrated circuit based on the circuit design such as, for example, power consumption, a switching delay, and/or a surface area.

The processor 2720 can also generate additional circuit designs as follows. The processor 2720 determines an adjusted SNM threshold based on a likelihood that the circuit design meets a predetermined noise criterion such as, for example, an overall $p_{NMS}$ for that circuit design. Adjusting the SNM threshold can change the pairs of connected/connectable logic gates that are allowable, with adjusted allowable pairs of connected logic stages identified as those pairs of connected logic stages with an SNM above the adjusted SNM threshold. An adjusted circuit design can then be generated based on the adjusted allowable pairs of connected logic stages. These adjustments can be done iteratively until adjusting the SNM threshold yields previously identified allowable pairs of connected logic gates or the same circuit design as obtained in a previous iteration.

Then, of all the circuit designs generated, one or more can be selected based on, for example, whether it meets the predetermined noise criterion, and/or whether one or more of the parameter values meet a specific requirement (e.g., a maximum allowable surface area or a maximum allowable power consumption).

The resulting circuit design can include at least 1000 connected logic gates, at least 10,000, at least 100,000, at least one million connected logic stages, including all values and sub-ranges in between. The optional manufacturing unit 2760 can generate the integrated circuit 2750 (shown here with dotted lines to indicate a resulting product, rather than a system component) based on the circuit design. In some cases, the set of logic stages include at least one carbon nanotube field-effect transistor (CNFET), and the resulting circuit 2750 has a semiconductor-carbon nanotube (s-CNT) purity (also sometimes referred to as s-CNT purity measure $p_S$) of less than 100% e.g., about 99.99%, 99.995% and so on.

FIG. 28 is a flow chart illustrating a method 2800 of designing an integrated circuit. Some or all aspects of the method 2800 can be implemented by one or more of the systems and devices as described herein such as, for example, the system 2700 and/or the device 2710, as described in greater detail with respect to FIG. 27.

The method 2800 includes, at step 2810, determining a SNM for each pair of connected/connectable logic stages with a carbon nanotube field-effect transistor with an m-CNT that can be used in an integrated circuit (e.g., such as logic gates specified in a cell library). The SNM represents an immunity to noise of the pair of logic stages when made with the m-CNT. The SNM for each pair of connected logic stages can encompass determining all possible combinations of m-CNTs in the pair of connected logic stages such as by, for example, varying the number of m-CNTs in one or both logic stages of that pair.

The method 2800 also includes, at step 2820, making the integrated circuit with only those pairs of connected logic stages having an SNM above a threshold SNM value, which can be determined, for example, as described for FIG. 27. The method 2800 can also include determining a probability (e.g., a $p_{NMS}$ value) that all noise margin constraints are satisfied using only those pairs of connected logic stages having an SNM above the threshold SNM. Then, the threshold SNM can be adjusted based on the probability that all noise margin constraints are satisfied using only those pairs of connected logic stages having an SNM above the threshold SNM.

The method 2800 can also include storing models of SNMs (e.g., see the example CNFET SNM model of FIGS. 6A-6E) for the pairs of connected logic states possible for use in the integrated circuit in a library, such as, for example, in the database 2740 and/or the memory 2730. The method 2800 can then also encompass designing the integrated circuit with an electronic design automation (EDA) tool linked to the stored library. For example, the EDA tool can include software instructions stored in the database 2740 and/or the memory 2730, or outside the system 2700, and executable by the processor 2720, and/or another processor outside the system 2700.

FIG. 29 is a flow chart illustrating another method 2900 of designing an integrated circuit. In some embodiment, some or all aspects of the method 2800 can be implemented by one or more of the systems and devices as described herein such as, for example, the system 2700 and/or the device 2710, as described in greater detail with respect to FIG. 27.

The method 2900 includes, at step 2910, for each pair of connected logic stages possible for use in the integrated circuit, determining a SNM for the pair of connected logic stages. The SNM represents an immunity to noise of the pair of connected logic stages. The SNM can be determined for a first pair of connected logic stages based on a probability of having a metallic carbon nanotube field-effect transistor in the first pair of connected logic stages. For example, the number of m-CNTs in each logic gate of the pair can be varied to determine the SNM for that pair. In some cases, the SNM for the first pair of connected logic stages can be determined based on a device-to-device variability of transistors in the first pair of connected logic stages such as, for example, based on the presence and/or number of m-CNTs in transistors in either logic stage.

The method 2900 also includes, at step 2920, selecting pairs of connected logic stages for use in the integrated circuit based on 1) the SNMs for the pairs of connected logic stages, and b) a desired probability of satisfying all noise margin constraints (e.g., a $p_{NMS}$ measure) for the integrated circuit.

FIG. 30 is a flow chart illustrating another method 3000 of designing an integrated circuit. In some embodiment, some or all aspects of the method 3000 can be implemented by one or more of the systems and devices as described herein such as, for example, the system 2700 and/or the device 2710, as described in greater detail with respect to FIG. 27.

The method 3000 includes, at step 3010, receiving an indication (e.g., a cell library) of a set of logic stages for the integrated circuit. The method 3000 also includes, at step 3020 and for each pair of logic stages of the plurality of logic stages, computing a SNM. The SNM representing immunity to noise of that pair of logic stages when connected (to each other other) and when at least one logic stage of that pair of connected logic stages is composed of a m-CNT. This can include measuring voltage-transfer curves for that pair of logic stages by varying a number of metallic-carbon nanotubes (m-CNTs) in at least one connected logic stage of that pair.

The method 3000 also includes, at step 3030, setting an initial value of a SNM threshold based on a predetermined minimum SNM value and a predetermined maximum SNM value, as also explained for FIG. 27. At step 3040 allowable pairs of connected logic stages are identified as those pairs of connected logic stages with an SNM above the SNM threshold.

The method 3000 further includes, at step 3050, generating a circuit design for an integrated circuit using only the allowable pairs of connected logic stages. At step 3060, the SNM threshold is adjusted based on the likelihood that the circuit design meets a predetermined noise criterion (e.g., based on the $p_{NMS}$ measure for that circuit design).

At step 3070, steps 3040-3060 are repeated based on the adjusted SNM threshold to generate a set of circuit designs. At this stage, once two circuit designs include the same allowable pairs of logic stages, or once the allowable pairs of connected logic stages at step 3040 are the same as those previously identified, one or more circuit designs of the set of circuit designs is selected. This selection can be based on that the selected circuit design 1) has a 99% likelihood that it meets the maximum noise criterion, and 2) has the lowest value among the set of circuit designs for one or more of the following: power consumption, switching delay, or surface area.

The method 3000 can further include manufacturing (e.g., via the manufacturing unit 2760) the integrated circuit (e.g., the circuit 2750) based on the selected circuit design. The integrated circuit can have a s-CNT purity (e.g., a $p_S$ value) of at most about 99.99%, and can include at least one million connected logic gates in its circuit design.

In some aspects, a non-transitory computer-readable medium (e.g., the database 2740 and/or the memory 2730) stores computer executable instructions for carrying out any of the methods of FIGS. 28-30.

The resulting integrated circuit (e.g., the circuit 2750 and/or a circuit generated per the methods of FIGS. 28-30) can include a set of logic stages that in turn include CNFETs. Overall, the set of logic stages can have a probability that all noise margin constraints are satisfied (e.g., that the $p_{NMS}$ of the set of logic stages) of at least 99% of the CNFETs. The CNFETs can have a s-CNT purity (e.g., aps value) of between 99.9% and 99.99999%.

General Explanation

Generally, such systems (e.g., the system 2700) and methods (e.g., the methods of FIGS. 28-30) can provide: (a) digital VLSI circuits to meet circuit-level noise margin constraints with commercially available $p_S$=99.99%, relaxing requirements of $p_S$ by ~10,000×, (b) imposes no additional processing steps for m-CNT removal, and (c) can be implemented using standard electronic design automation tools with minimal cost (e.g., <10% energy/power consumption, <10% switching delay, and <20% surface area, also sometimes referred to as "performance parameters", with further optimization possible). Also presented herein are results for fabricated CNFET circuits, demonstrating the effectiveness of these system and methods. While specifically described herein with respect to CNFETs, such systems and methods, including DREAM, are general approaches that broadly improves noise resilience for digital VLSI circuits. Also described herein is an example, experimental demonstration of DREAM using experimentally fabricated and characterized CNFETs (1,000 PMOS and 1,000 NMOS CNFETs), 1 million combinations of CNFET digital logic gates are analyzed to show the benefits of DREAM.

More generally, these systems and methods can be used to performing physical synthesis of any technology (e.g., CNTs or silicon-based devices) that optimizes not just for area, delay, and energy, but also noise margin. By accounting for noise margin, it possible to create circuits with a desired balance of performance and purity requirements for the constituent logic gates. For example, it is possible to increase performance while reducing purity level requirements, which can simplify fabrication and reduce fabrication costs. DREAM exploits the insight that m-CNTs affect different pairs of logic stages uniquely depending on how the logic stages are implemented (including both the schematic and physical layout). As a result, the SNMs of specific combinations of logic stages are more susceptible to m-CNTs (quantified using the VTCs of logic stage pairs as shown in FIGS. 2A-2G, described in more details). To improve overall $p_{NMS}$ for a digital VLSI circuit, a logic transformation is applied during logic synthesis to achieve the same circuit functionality, while inhibiting or prohibiting the use of specific logic stage pairs whose SNM is most susceptible to m-CNTs.

As an example, let ($G_D$, $G_L$) be a logic stage pair with driving logic stage $G_D$ and loading logic stage $G_L$. FIGS. 2D-2G shows that some logic stage pairs have better SNM in the presence of m-CNTs than others, despite using the exact same VTCs for the logic stages comprising the circuit (in this instance, logic stage pairs (nand2, nand2) and (nor2, nor2) have better SNM than (nand2, nor2) or (nor2, nand2)). This is verified in both simulation (using a compact model for CNFETs) and using experimentally fabricated CNFETs (FIGS. 2D-2G, see also FIGS. 5A-5B). A designer can improve $p_{NMS}$ by avoiding the use of logic stage pairs that are more susceptible to m-CNTs, while permitting logic stage pairs that maintain better SNM despite the presence of m-CNTs.

To quantify the impact of m-CNTs on $p_{NMS}$ of VLSI circuits (which can be useful for both analyzing and implementing DREAM), variation-aware CNFET SNM models can be built and employed that compute SNM for any logic stage pair in a standard cell library, as a function of the number of m-CNTs in all CNFETs in that logic stage pair (FIGS. 6A-6E). These models are then used in conjunction with circuit physical designs to compare $p_{NMS}$ for different circuit implementations (using the design flow in FIG. 7A). The physical design can be optimized for power, timing/delay, and area, not considering $p_{NMS}$. Variation-aware CNFET SNM models can also be used to determine prohibited logic stage pairs while optimizing power, timing, and area. To implement one example approach of DREAM for CNFETs, consider the following process:

1) Generate a "DREAM SNM table"—for each pair of logic stages in the standard cell library, quantify its susceptibility to m-CNTs as follows: use a variation-aware CNFET SNM model to compute SNM for (all) possible combinations of whether or not each CNFET comprises an m-CNT (e.g., in a (nand2, nor2) logic stage pair, there are 28 such combinations since there are 8 total CNFETs). Record the minimum computed SNM in a DREAM SNM table (FIG. 3B).

Figures 3A, 3B, 3C:
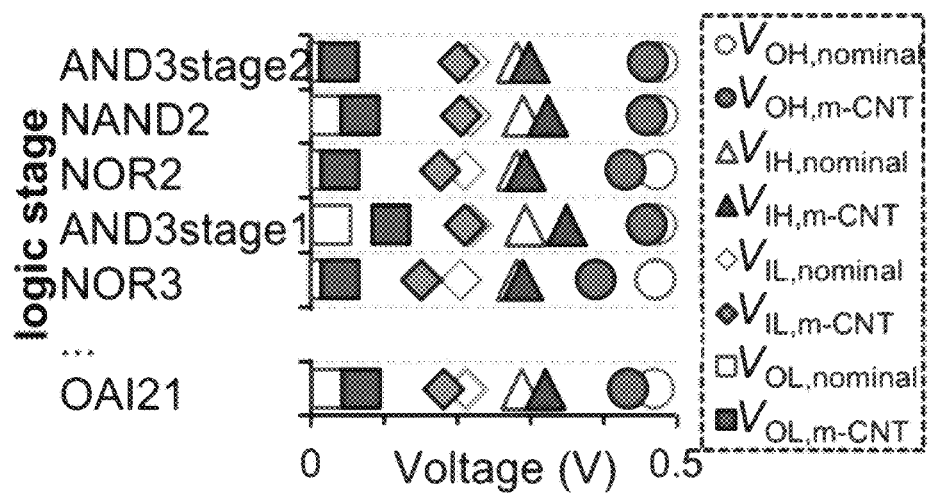
FIG. 3A illustrates VTC parameters for a subset of logic stages in the 7 nm node standard cell library. "Nominal"=no m-CNTs, filled markers are the worst case VTC parameters when building the DREAM SNM table. Logic stages with the suffix "stage*" are for logic gates comprising multiple logic stages, e.g., AND3 is a nand3 (AND3stage1) driving an inverter (AND3stage2). Since AND3stage1 can only drive AND3stage 2, other logic stage pairs with driving logic stage AND3stage1 are not applicable (n/a).
FIG. 3B is an example SNM table for Designing Resilience Against Metallic CNTs (DREAM) using SNM, =83 mV.
FIG. 3C the DREAM SNM table of FIG. 3B showing prohibited logic stage pairs.
Figure 5A:
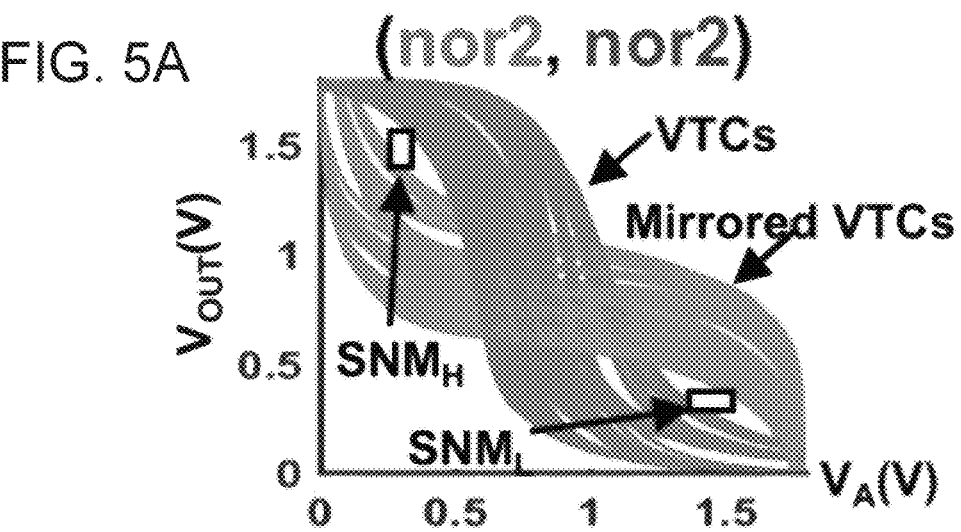
FIG. 5A shows a (nor2, nor2) pair that maintains minimum SNM>0 V, and greater than 99.99% of (nor2, nor2) and (nand2, nand2) pairs achieve SNM>0 V. VTCs for nand2 and nor2 are generated by randomly selecting 2 NMOS and 2 PMOS CNFETs from FIG. 1C, some of which contain m-CNTs, repeated to form 1000 unique nor2 and nand2 VTCs.
Figure 5B:
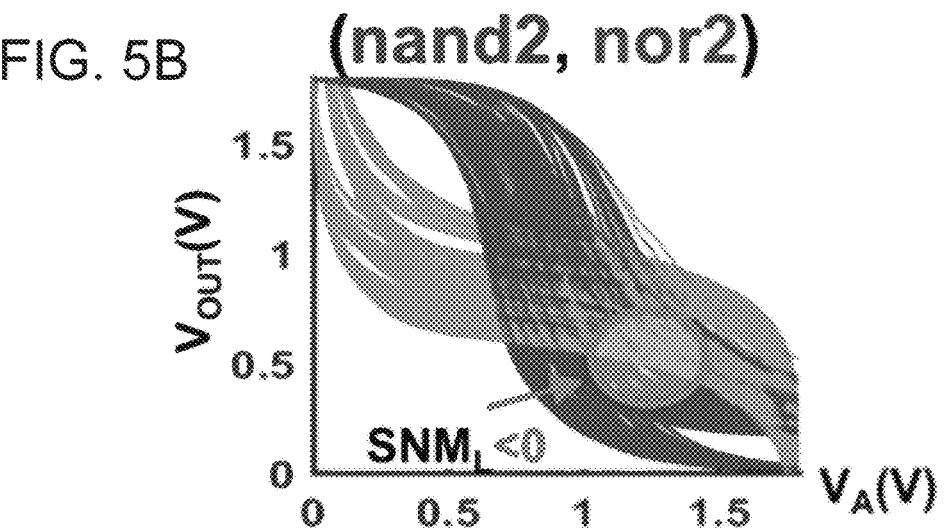
FIG. 5B shows a (nand2, nor2) pair that suffers from minimum SNM<0 V in the presence of m-CNTs, with about 97% of (nand2, nor2) pairs achieving SNM>0 V. The process for VTC generation is similar to that for FIG. 5A.
Figure 5C:
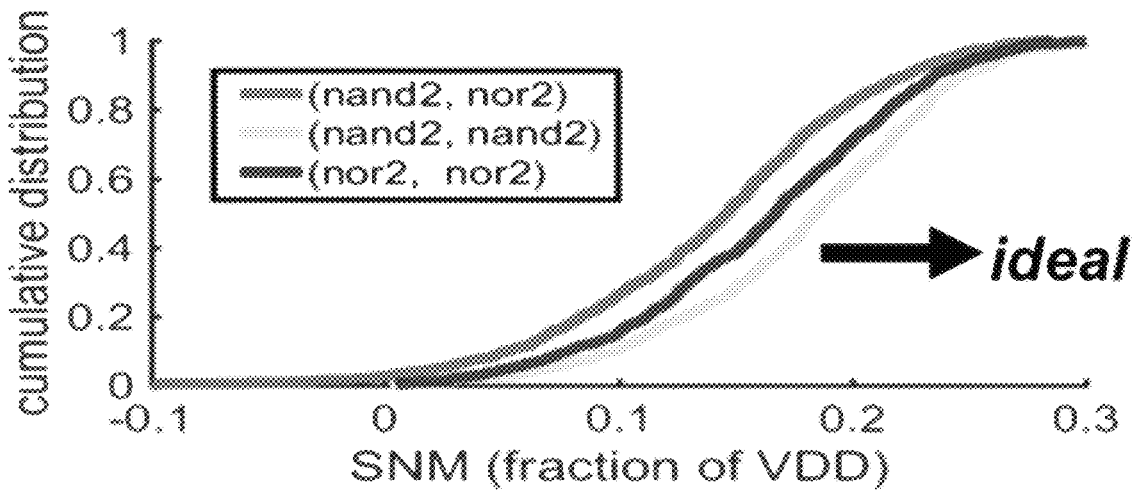
FIG. 5C shows the cumulative distribution of SNM over 1 million logic stage pairs, corresponding to all combinations of 1000 VTCs for the driving logic stage and 1000 VTCs for the loading logic stage as shown in FIGS. 5A, 5B.

2) Determine prohibited logic stage pairs—choose an SNM cut-off value or threshold ($SNM_C$), such that all logic stage pairs whose SNM in the DREAM SNM table is less than $SNM_C$ are prohibited during physical design (example in FIG. 3C).

3) Physical design—use design flows and electronic design automation (EDA) tools to implement VLSI circuits without using the prohibited logic stage pairs, i.e., using only allowable stage pairs. The EDA tools can enable designers to set which logic stage pairs to prohibit during power/timing/area optimization. For example, this can be accomplished by using the EDA tools with a DREAM-enforcing library that comprises a subset of library cells such that no possible combination of cells can be connected to form a prohibited logic stage pair.

Logic stage pairs don't have to be prohibited in step (2) above. Instead, each type of logic stage pair can be weighted based on its SNM, and the DREAM process can be used to choose combinations of logic stage pairs that yield a target noise margin in step (3) above. The DREAM process can even use SNMs for different types of logic stage pairs directly to select the combinations of logic stage pairs that yield a target noise margin performance in step (3). Similarly, DREAM can use other parameters, such as noise margin improvements, noise margin design targets, timing, power consumption, and area, in addition to or instead of SNM for preferentially selecting logic stage pairs when designing a circuit.

Larger $SNM_C$ can prohibit or inhibit more logic stage pairs, resulting in better $p_{NMS}$ with higher energy/delay/area cost (and vice versa). To satisfy target $p_{NMS}$ constraints (e.g., $p_{NMS} \geq 99\%$) in step (2) above, while reducing or minimizing cost, the $SNM_C$ value can be determined and modified via an example bisection search process:

A. Initialize a lower bound (L, also sometimes referred to as a predetermined minimum SNM value) and upper bound (predetermined maximum SNM value U) for $SNM_C$. L=0, and U is the maximum value of $SNM_C$ that enables the EDA tools to synthesize arbitrary logic functions; For example, if $SNM_C$ is high enough such that (inv, inv) is the only allowable logic stage, then that value of $SNM_C$ is too high since arbitrary digital logic functions cannot be synthesized using only inverters (i.e., prohibiting all logic stage pairs except (inv, inv) would be insufficient).

B. Find $p_{NMS}$ (also sometimes referred to as a predetermined noise criterion) using $SNM_C=(L+U)/2$, using the design flow in FIG. 17. Record the set of prohibited logic stage pairs, as well as the resulting circuit physical design, $p_{NMS}$, energy, delay, and area after using EDA tools (e.g., for logic synthesis).

C. If $p_{NMS}$ satisfies the target constraint (e.g., $p_{NMS}$>99%), set U=$SNM_C$. Otherwise set L=$SNM_C$.

D. Set $SNM_C=(L+U)/2$. If $p_{NMS}$ has already been analyzed for the resulting set of prohibited logic stage pairs (i.e., a design has already been created and analyzed using these logic stage pairs), terminate. Otherwise, return to step B.

For the physical designs recorded in step B, choose the one that satisfies the target $p_{NMS}$ constraint with minimum energy/delay/area cost. While this is an example approach to selecting $SNM_C$, other approaches for selecting $SNM_C$ are also possible such as, for example, sweeping $SNM_C$ from a minimum value L to a maximum value U, and selecting the best resulting design according to some pre-determined criterion.

Either or both of the processes disclosed above can be integrated in an EDA tool. This enables the EDA tool to consider noise margin constraints (and noise margin improvements and noise margin design targets) while optimizing for other integrated circuit metrics (such as timing, power, and area).

Example 1: Processor Core Using DREAM

To quantify the benefit of DREAM for VLSI circuits, circuit modules were analyzed that were synthesized from the processor core of OpenSparc T2, a large multi-core chip that closely resembles the commercial Oracle/SUN Niagara 2 system. Results presented here account for effects present in realistic VLSI circuits—such as wire parasitics, buffer insertion to meet timing constraints, and SNM for cross-coupled logic stages in sequential logic elements—that are not present in small circuit benchmarks. Standard cell libraries derived from the reference library "asap7sc7p5t" included with the ASAP7 process design kit (PDK) were used to create physical designs of the OpenSparc modules at an example 7 nm technology node, to compare optimized energy, delay, area, and $p_S$ required to achieve $p_{NMS}$=99% for VLSI circuits, with and without using DREAM (using the design flow in FIG. 7A, results in FIGS. 4A-4D). The baseline case ("non-DREAM"), which permits all pairs of logic stages, requires $p_S$>99.999,996,3% to achieve $p_{NMS}$≥99% (for $SNM_R=V_{DD}/5$). For DREAM, this $p_S$ requirement is reduced to below 99.99% by using a DREAM-enforcing library as described above. DREAM improves the $p_S$ requirement by 8,500×, with a cost of <10% energy, <10% delay, and <20% area (FIG. 4D). Additional trade-offs include relaxing $SNM_R$ and $p_{NMS}$ targets to relax the $p_S$ requirement (FIGS. 4A, 4B). Furthermore, as described above, integrating DREAM into EDA tools—enabling $p_{NMS}$ optimization simultaneously with power/timing/area optimization—can improve $p_S$ versus power/timing/area trade-offs.

Example 2: Experimental CNFET Circuits

To experimentally demonstrate DREAM, fabrication and measurement of I-V characteristics for 1,000 PMOS and 1,000 NMOS CNFETs (similar to those in FIGS. 1B, 1C) was carried out. Random selection of 2 NMOS and 2 PMOS CNFETs was carried out and the VTC was solved assuming these 4 CNFETs were configured as nor2 and nand2 logic gates, so the exact same CNFETs are used for nand2 and nor2 logic gates for direct comparison (FIGS. 7A, 7B). This is repeated to form 1,000 unique nor2 and nand2 VTCs. The SNM is analyzed over 1 million logic stage pairs, corresponding to all combinations of 1,000 VTCs for the driving logic stage and 1,000 VTCs for the loading logic stage.

FIG. 7C shows the distributions of SNM for the 1 million combinations for different logic stage pairs. Based on the fabricated CNFETs, >99.99% of (nor2, nor2) and (nand2, nand2) logic stage pairs achieve SNM>0 V, while about 97% of (nand2, nor2) achieve SNM>0 V (due to some CNFETs containing m-CNTs). So a non-DREAM design containing 1,000 (nand2, nor2) logic stage pairs would have $p_{NMS}$ about equal to 0%, while a DREAM design with 1,000 (nand2, nand2) or (nor2, nor2) logic stage pairs would have $p_{NMS}$>90%.

Example 3—Microprocessor Built from Carbon Nanotube Transistors

Electronics is approaching a major paradigm shift as silicon transistor scaling no longer yields historical energy efficiency benefits, spurring research on beyond-silicon nanotechnologies. In particular, carbon nanotube (CNT) field-effect transistor (CNFET)-based digital circuits promise significant energy efficiency benefits, but the inability to perfectly control intrinsic nanoscale defects and variability in CNTs have made realizing very-large-scale systems infeasible. Here, these challenges are overcome to experimentally show a beyond-silicon microprocessor built entirely from CNFETs. This 16-bit microprocessor is based on the RISC-V instruction set, runs standard 32-bit instructions on 16-bit data and addresses, comprises >14,000 complementary metal-oxide-semiconductor (CMOS) CNFETs, and is designed and fabricated using industry-standard design flows and processes. This demonstration uses a set of combined processing and design techniques for overcoming nanoscale imperfections at macroscopic scales.

With diminishing returns of silicon field-effect transistor (FET) scaling, the need for FETs leveraging nanotechnologies has been steadily increasing. Carbon nanotubes (or CNTs, nano-scale cylinders made of a single sheet of carbon atoms with diameters of ~10-20 Å) are prominent among a variety of nanotechnologies that are being considered for next generation energy-efficient electronic systems. Due to the nano-scale dimensions and simultaneously high carrier transport of CNTs, digital systems built from FETs fabricated with CNTs as the transistor channel (i.e., CNFETs) are projected to improve energy efficiency of today's silicon-based technologies by an order of magnitude.

Over the past decade, CNT technology has progressed in maturity: from single CNFETs to individual digital logic gates to small-scale digital circuits and systems. In 2013, this progress led to the demonstration of a complete digital system: a miniature computer comprising 178 CNFETs that implemented only a single instruction operating on only a single bit of data (see Example 4 for a full discussion of prior works). However, as with all emerging nanotechnologies, there remained a significant disconnect between these small-scale demonstrations and modern systems comprising tens of thousands of FETs (e.g., microprocessors) to billions of FETs (e.g., high performance computing servers). Perpetuating this divide is the inability to achieve perfect atomic-level control of nanomaterials across macroscopic scales (e.g., yielding consistent 10 Å diameter CNTs uniformly across industry-standard 150-300 mm diameter wafer substrates). Resulting intrinsic defects and variations have made realizing such modern systems infeasible. For CNTs, these major intrinsic challenges are:

Material defects: while semiconducting CNTs (s-CNTs) form energy-efficient FET channels, the inability to precisely control CNT diameter and chirality results in every CNT synthesis containing some percentage of metallic CNTs (m-CNTs). m-CNTs have little to no bandgap and therefore their conductance cannot be sufficiently modulated by the CNFET gate, resulting in high leakage current and potentially incorrect logic functionality.

Manufacturing defects: during wafer fabrication, CNTs "bundle" together forming thick CNT aggregates. These aggregates can result in CNFET failure (reducing CNFET circuit yield), as well as prohibitively high particle contamination rates for very-large-scale integration (VLSI) manufacturing.

Variability: energy-efficient complementary metal-oxide-semiconductor (CMOS) digital logic requires the ability to fabricate CNFETs of complementary polarities (p-CNFETs and n-CNFETs) with well-controlled characteristics (e.g., tunable and uniform threshold voltages, and p- and n-CNFETs with matching on- and off-state current). Prior techniques for realizing CNFET CMOS have relied on either extremely reactive, not air-stable, non-silicon CMOS compatible materials or have lacked tunability, robustness, and reproducibility. This severely limited the complexity of CNT CMOS demonstrations, and no complete CNT CMOS digital system has ever been fabricated till date.

While substantial prior work has focused on overcoming these challenges, none meets all of the strict requirements for realizing VLSI systems. In this work, the intrinsic CNT defects and variations are overcome to enable the first demonstration of a beyond-silicon modern microprocessor: RV16X-NANO, designed and fabricated entirely using CNFETs. RV16X-NANO is a 16-bit microprocessor based on the open-source and commercially available RISC-V instruction set processor, running standard RISC-V 32-bit instructions on 16-bit data and addresses. It integrates >14,000 CMOS CNFETs, and operates as modern microprocessors today (e.g., it can run compiled programs; in addition, its functionality is demonstrated by executing all types and formats of instructions in the RISC-V instruction-set architecture (ISA)). This is made possible by a set of original processing and circuit design techniques that are combined to overcome the intrinsic CNT challenges. The elements of this manufacturing methodology for CNTs are:

RINSE (Removal of Incubated Nanotubes through Selective Exfoliation): removes CNT aggregate defects through a new selective mechanical exfoliation process. RINSE can reduce CNT aggregate defect density by >250× without affecting non-aggregated CNTs or degrading CNFET performance.

MIXED (Metal Interface engineering Crossed with Electrostatic Doping): this combined CNT doping process leverages both metal contact work function engineering as well as electrostatic doping to realize the first robust wafer-scale CNFET CMOS process. Entire dies with >10,000 CNFET CMOS digital logic gates (2-input "not-or" gates with functional yield 14,400/14,400, comprising 57,600 total CNFETs) are made, and presented here is the first wafer-scale CNFET CMOS uniformity characterization across 150 mm wafers (such as analyzing yield for >100 million combinations pairs of cascaded experimental logic gates).

DREAM (Designing Resiliency Against Metallic CNTs): overcomes the presence of m-CNTs entirely through circuit design. DREAM relaxes the requirement on m-CNT purity by ~10,000× (from 99.999,999% m-CNT purity requirement relaxed to 99.99%), without imposing any additional processing steps or redundancy. DREAM is implemented using standard electronic design automation (EDA) tools, has minimal cost, and enables digital VLSI systems with CNT purities that are available commercially today.

The entire Manufacturing Methodology for CNTs is wafer-scale, VLSI-compatible, and is seamlessly integrated within existing infrastructures for silicon CMOS—both in terms of design and processing. RV16X-NANO is designed with standard EDA tools, and leverages materials and processes that are compatible with and exist within commercial silicon CMOS manufacturing facilities.

RV16X-NANO—FIG. 11A shows an optical microscopy image of a fabricated RV16X-NANO die alongside three-dimensional to-scale rendered schematics of the physical layout. It is the largest CMOS electronic system ever realized using beyond-silicon nanotechnologies: comprising 3,762 CMOS digital logic stages, totaling 14,702 CNFETs containing >10 million CNTs, and includes logic paths comprising up to 86 stages of cascaded logic between flip-flops (i.e., that evaluate sequentially in a single clock cycle). It operates with 1.8 supply voltage ($V_{DD}$), receives an external referenced clock (generating local clock signals internally), receives inputs (instructions and data) from and writes directly to an off-chip main memory (dynamic random-access memory: DRAM), and stores data on-chip in a register file—no other external biasing or control signals are supplied. Furthermore, RV16X-NANO demonstrates a new three-dimensional (3D) physical architecture, as the metal interconnect layers are fabricated both above and below the layer of CNFETs (see FIG. 11B). This is in stark contrast to silicon-based systems where all metal routing can only be fabricated above the bottom layer of silicon FETs. In RV16X-NANO, the metal layers below the CNFETs are primarily used for signal routing, while the metal layers above the CNFET are primarily used for power distribution (FIG. 11B). The fabrication process implements 5 metal layers and includes >100 individual processing steps. Such new 3D layout promises improved routing congestion (a major challenge for today's systems), and is uniquely enabled by CNTs (due to their low-temperature fabrication)

Physical Design—The design flow of RV16X-NANO can leverage industry-standard tools and techniques: here, a standard process design kit (PDK) for CNFETs as well as a library of standard cells for CNFETs was created that is compatible with existing EDA tools and infrastructure without modification. This CNFET PDK includes a compact model for circuit simulations that is experimentally calibrated to the fabricated CNFETs. The standard cell library comprises 63 unique cells, and includes both combinational and sequential circuit elements implemented with both static CMOS and complementary transmission-gate digital logic circuit topologies (see Example 4 for a full list of standard library cells, including circuit schematic and physical layouts). The CNFET PDK is used to characterize the timing and power for all of the library cells, which are experimentally validated by fabricating and measuring all cells individually (see Example 4 for full description and experimental characterization of the standard cell library). A full description of the VLSI design methodology, including how DREAM is implemented during logic synthesis and place-and-route, is provided below.

Computer Architecture—FIGS. 12A-12B illustrate the architecture of RV16X-NANO, which can follow conventional microprocessor design (implementing instruction fetch, instruction decode, register read, execute/memory access, and write-back stages). It is designed from RISC-V, a standard open instruction set architecture used in commercial products today and gaining wide-spread popularity in both academia and industry. RV16X-NANO is derived from a full 32-bit RISC-V microprocessor supporting the RV32E instruction set (31 different 32-bit instructions, see Supplemental Information), while truncating the data path width from 32-bits to 16-bits, and reducing the number of registers from 16 to 4. It is designed using publicly available Bluespec, and is verified using SMT-based bounded model checking against a formal specification of the RISC-V ISA (see Supplemental Information). Correct functionality of the microprocessor is demonstrated by experimentally running and validating correct functionality of all types and formats of instructions on the fabricated RV16X-NANO. FIGS. 13A-13B show the first program executed on RV16X-NANO: the famous "Hello, world", as described further below Manufacturing Methodology for CNTs—Described here is a manufacturing methodology for CNTs—a set of combined processing and design techniques for making the RV16X-NANO (FIG. 14A). All design and fabrication processes are wafer-scale and VLSI compatible, not requiring any per-unit customization or redundancy.

RINSE—The CNFET fabrication process begins by depositing CNTs uniformly over the wafer. 150 mm wafers (with the bottom metal signal routing layers and gate stack of the CNFET already fabricated for the 3D design) are submerged in solutions containing dispersed CNTs (Methods). While CNTs uniformly deposit over the wafer, the CNT deposition also inherently results in manufacturing defects, where CNT aggregates deposited randomly across the wafer (FIG. 14B). These CNT aggregates act as particle contamination, reducing die yield. While several existing techniques have attempted to remove these aggregates prior to CNT deposition, none is sufficient to meet wafer-level yield requirements for VLSI systems: (a) excessive high-power sonication for dispersing aggregates in solution damages CNTs, resulting in degraded CNFET performance, and does not disperse all CNTs; (b) centrifugation does not remove all smaller aggregates (and aggregates can re-form post centrifugation), (c) excessive filtering removes both aggregates and the CNTs themselves from the solution, and (d) etching the aggregates is infeasible due to lack of selectivity versus the underlying CNTs themselves. To remove these aggregates, a new process technique, RINSE, is developed that consists of three steps (FIG. 14C):

1) CNT incubation: solution-based CNTs are deposited on wafers pre-treated with a CNT adhesion promoter (HMDS, Bis(trimethylsilyl)amine).

2) Adhesion coating: a standard photoresist (Polymethyl-glutarimide, PMGI) is spin-coated on the wafer and cured at ~200° C.

3) Mechanical exfoliation: the wafer is placed in solvent (NMP) and sonicated.

Without adhesion coating (step 2), sonicating the wafer may inadvertently remove section of CNTs in addition to the aggregates (FIG. 14D). The adhesion coating leaves an atomic layer of carbon that remains after step 3, which can exert sufficient force to adhere the CNTs to the wafer surface while still allowing for the removal of the aggregates. Experimental results for RINSE are shown in FIGS. 14D-14G. By optimizing the adhesion-coating cure temperature and time as well as the sonication power and time, RINSE reduces CNT aggregate density by >250× (quantified by the number of CNT aggregates per unit area) without damaging the CNTs or impacting CNFET performance (see Example 4).

MIXED—After using RINSE to overcome intrinsic CNT manufacturing defects, CNFET circuit fabrication continues. While energy-efficient CMOS logic requires both p-CNFETs and n-CNFETs with controlled and tunable properties (such as threshold voltage), techniques for realizing CNT CMOS today result in significant FET-to-FET variability that has made realizing large-scale CNFET CMOS systems infeasible. Moreover, the vast majority of existing techniques are not air-stable (e.g., they use materials that are extremely reactive in air), are not uniform or robust (e.g., they do not always successfully realize CMOS), or rely on materials not compatible with conventional silicon CMOS processing (e.g., molecular dopants that contain ionic salts prohibited in commercial fabrication facilities).

These challenges are overcome by the processing technique MIXED, described in FIGS. 15A-15D. MIXED is based on a combined doping approach that engineers both the oxide deposited over the CNTs to encapsulate the CNFET as well as the metal contact to the CNTs. First, the CNFETs are encapsulated in oxide (deposited by atomic-layer deposition, ALD) to isolate them from their surroundings. By leveraging the atomic-layer control of ALD, the precise stoichiometry of this oxide encapsulating the CNTs is engineered, which enables simultaneous electrostatic doping of the CNTs (the stoichiometry dictates both the amount of redox reaction at the oxide-CNT interface as well as the fixed charge in the oxide). In addition, the metal source/drain contacts to the CNTs are engineered to further optimize the p- and n-CNFETs. A lower work function metal (Titanium) is employed as contacts to n-CNFETs and a higher work function metal is employed as contacts to p-CNFETs (Platinum), improving the on-state drive current of both (for a given off-state leakage current). In contrast to previous approaches, MIXED leverages silicon CMOS-compatible materials, allows for precise threshold voltage tuning through controlling the stoichiometry of the ALD doping oxide, and is robust due to tight process control by using ALD and air-stable materials.

FIG. 15C shows the current-voltage (I-V) characteristics of p-CNFETs and n-CNFETs, demonstrating well-matched characteristics (such as on- and off-state currents). To demonstrate the reproducibility of MIXED at a wafer scale, FIG. 15D shows measurements from 10,400/10,400 correctly functioning 2-input "not-or" (NOR2) CNFET logic gates within a single die, and 1,000/1,000 correctly functioning NOR2 gates randomly selected from across a 150 mm wafer. Additional characterization results (including output voltage swing, gain, and static noise margin for >100 million possible combinations of cascaded logic gate pairs), are in Example 4. This is the first wafer-scale demonstration of solid-state, air-stable, VLSI- and silicon-CMOS compatible CNFET CMOS.

DREAM—Despite the robust CNFET CMOS enabled by RINSE and MIXED, a small percentage (~0.01%) of CNTs are m-CNTs, which stems from a major fundamental CNT material defect: the random presence of m-CNTs. Unfortunately, 0.01% m-CNT fraction can be prohibitively large for VLSI-scale systems, due to two major challenges: (1) increased leakage power, degrading EDP benefits, and (2) degraded noise immunity, potentially resulting in incorrect logic functionality. To quantify noise immunity of digital logic, the static noise margin (SNM) is extracted for each pair of connected logic stages, using the voltage transfer curves (VTCs) of each stages (details in FIGS. 25A-25K). The probability that all connected logic stages meet a minimum SNM requirement ($SNM_R$, typically chosen by the designer as a fraction of $V_{DD}$, e.g., $SNM_R=V_{DD}/4$) is $p_{NMS}$: the probability that all noise margin constraints are satisfied. While previous works have set requirements on s-CNT purity ($p_S$) based on limiting m-CNT-induced leakage power, no existing works have provided VLSI circuit-level guidelines for $p_S$ based on both increased leakage and the resulting degraded SNM. While 99.999% $p_S$ is sufficient to limit EDP degradation to ≤5%, SNM imposes far stricter requirements on purity: $p_S$~99.999,999% to achieve $p_{NMS}$≥99% (analyzed for 1 million gate circuits, Example 4).

Unfortunately, typical CNT synthesis today achieves $p_S$~66%. While many different techniques have been proposed to overcome the presence of m-CNTs (Supplemental Information), the highest reported purity is ~99.99% $p_S$: 10,000× below the requirement for VLSI circuits[34,35,36]. Moreover, these techniques have significant cost, requiring either: (a) additional processing steps (e.g., applying high voltages for electrical "breakdown" of m-CNTs during 'fabrication') or (b) redundancy incurring significant energy efficiency penalties. Presented and experimentally validated here is a new technique, DREAM, that overcomes, for the first time, the presence of m-CNTs entirely through circuit design. DREAM reduces the required $p_S$ by ~10,000×, allowing 99% $p_{NMS}$ with $p_S$=99.99% (for 1 million logic gate circuits). This enables digital VLSI circuits using CNT processing available today: $p_S$=99.99% is already commercially available (and can be achieved through several means, including solution-based sorting which is used in the process for fabricating RV16X-NANO).

The key insight for DREAM is that m-CNTs affect different pairs of logic stages uniquely depending on how the logic stages are implemented (considering both the schematic and physical layout). As a result, the SNM of specific combinations of logic stages is more susceptible to m-CNTs. To improve overall $p_{NMS}$ for a digital VLSI circuit, DREAM applies a logic transformation during logic synthesis to achieve the same circuit functionality, while prohibiting the use of specific logic stage pairs whose SNM is most susceptible to m-CNTs. As an example, let ($G_D$, $G_L$) be a logic stage pair with driving logic stage $G_D$ and loading logic stage $G_L$. FIGS. 16A-16F show that some logic stage pairs have better SNM in the presence of m-CNTs versus others, despite using the exact same VTCs for the logic stages comprising the circuit (in this instance, logic stage pairs (nand2, nand2) and (nor2, nor2) have better SNM than (nand2, nor2) or (nor2, nand2)). Thus, a designer can improve $p_{NMS}$ by prohibiting the use of logic stage pairs that are more susceptible to m-CNTs, while permitting logic stage pairs that maintain better SNM despite the presence of m-CNTs. Beyond this example to illustrate DREAM, the benefit of DREAM is quantified using both simulation and experimental analysis for VLSI-scale circuits; in simulation, a compact model for CNFETs is leveraged, which accounts for both s-CNTs and m-CNTs, to analyze the impact of m-CNTs on the leakage power, energy consumption, speed, and noise susceptibility of physical designs of VLSI-scale circuits at a 7 nm technology node designed using standard EDA tools, with and without DREAM (results in FIGS. 16A-16F, additional discussion in Example 4). 2,000 CMOS CNFETs are fabricated with MIXED (1,000 PMOS and 1,000 NMOS CNFETs: FIGS. 16A-16F) and characterized. Using I-V measurements from these 2,000 CNFETs, 1 million combinations of CNFET digital logic gates are analyzed (whose electrical characteristics are solved using the I-V characteristics of the measured CNFETs, FIGS. 25A-25K) to show the benefits of DREAM to improve circuit susceptibility to noise. Further details of these analysis and implementation of DREAM for arbitrary digital VLSI circuits are provided below, including how to implement DREAM using standard industry-practice physical design flows, how to implement DREAM for RV16X-NANO, and an efficient algorithm to satisfy targetpNMS constraints (e.g., $p_{NMS}$>99%), while minimizing energy, delay, and area costs.

These combined processing and design techniques overcome the major intrinsic CNT challenges. This complete Manufacturing Methodology for CNTs enables the most advanced demonstration of a beyond-silicon modern microprocessor fabricated from CNTs, RV16X-NANO. In addition to demonstrating the RV16X-NANO microprocessor, all facets of this manufacturing methodology for CNTs is characterized and analyzed, illustrating the feasibility of this approach and more broadly of a future CNT technology.

Fabrication Process—The fabrication process is shown in FIG. 17. It uses 5 metal layers and over 100 individual processing steps.

Bottom metal routing layers—The starting substrate is a 150 mm silicon wafer with 800 nm thermal oxide for isolation. The bottom metal wire layers are defined using conventional processing (e.g., lithographic patterning, metal deposition, etching, etc.). After the first metal layer is patterned (FIG. 17, step (a)), an oxide spacer (300° C.) is deposited to separate this first metal layer from the subsequent second metal layer (FIG. 17, step (b)). To define inter-layer vias between the first and second metal layer (hereby referred to simply as vias), vias are lithographically patterned and etched through this spacer dielectric using dry reactive ion etching (ME) that stops on the bottom metal layer (FIG. 17, step (c)). The second metal layer is then defined lithographically and deposited. The vias are formed simultaneously with the second metal wire layer, as the vias are filled during the metal deposition (FIG. 17, step (d)). RV16X-NANO has two bottom metal layers which are used for signal routing. The second metal layer also acts as the bottom gates for the CNFETs Bottom gate CNFETs—The second metal layer (FIG. 17, step (d)) acts as both signal routing (local interconnect) as well as the bottom gate for the CNFETs. To fabricate the remaining bottom gate CNFET structure, a high-k gate dielectric (dual-stack of $AlO_2$ and $HfO_2$) is deposited through atomic layer deposition (ALD, at 300° C.) over the bottom metal gates (FIG. 17, step (e)). The $HfO_2$ is used as the majority of the dielectric stack due to its high-k dielectric constant, while the $AlO_2$ is used for its improved seeding and increased dielectric breakdown voltage.

Following gate dielectric deposition, contact vias through the gate dielectric are patterned, and again RIE is used to etch the contact vias, stopping on the local bottom gates (FIG. 17, step (f)). These contact vias are used by the top metal wiring to contact and route to the bottom gates and bottom metal routing layers. Post-etch, the surface is cleaned with both a solvent rinse as well as oxygen plasma, in preparation for the CNT deposition. Prior to CNT deposition, the surface is treated with hexamethyldisilazane (HMDS), a common photoresist adhesion promoter, which improves the CNT deposition (both density and uniformity) over the high-k gate dielectric. The 150 mm wafer is then submerged in a toluene-based solution of 99.99% s-CNT purified CNTs (similar to the commercial Isosol-100 available from NanoIntegris). The amount of time the wafer incubates in the solution, as well as the concentration of the CNT solution, both affect the final CNT density; this process is optimized to achieve ~40-60 CNTs/µm of CNTs (FIG. 17, step (g)). Immediately prior to CNT incubation, the CNT solution is diluted to the target concentration and is horn-sonicated briefly to maximize CNT suspension (some CNT aggregates will always remain). Post-CNT deposition, the RINSE method is performed to remove CNT aggregates that deposit on the wafer, leaving CNTs uniformly deposited across the 150 mm wafer. RINSE does not degrade the remaining CNTs or remove the non-aggregated CNTs on the wafer (FIGS. 22A-22E). After CNT incubation, the CNT active etch is performed in order to remove CNTs outside of the active region of the CNFETs (i.e., channel region of the CNFETs). To do so, the active region of the CNFETs is lithographically patterned (protecting CNTs in these regions with photoresist), and all CNTs are etched outside of these regions in oxygen plasma. The photoresist is then stripped in a solvent rinse, leaving CNTs patterned in the intended locations (i.e., in the channel region of the CNFETs) on the wafer (FIG. 17, step (h)). While solution-based CNTs are used, alternative methods for depositing CNTs on the substrate include aligned growth of CNTs on a crystalline substrate followed by transfer of the CNTs onto the wafer used for circuit fabrication. Both methods have shown the ability to achieve high drive current CNFETs.

MIXED method for CNT CMOS—Following active etch of the CNTs (described above), the p-CNFET source and drain metal contacts and lithographically patterned and defined. The p-CNFET contacts are deposited (0.6 nm Titanium for adhesion followed by 85 nm Platinum) through electron-beam evaporation, and the contacts are patterned through a dual-layer lift-off process (FIG. 17, step (i)). This third metal layer acts as both the p-CNFET source and drain contacts, as well as local interconnect. Following the p-CNFET source and drain contacts, the p-CNFETs are passivated by depositing 100 nm $SiO_2$ over the p-CNFETs (FIG. 17, step (j)). Following p-CNFET passivation, the wafer undergoes an oxide densification anneal in forming gas (dilute $H_2$ in $N_2$) at 250° C. for 5 minutes. This concludes the p-CNFET fabrication. To fabricate the n-CNFETs, the fourth metal layer (100 nm Titanium, n-CNFET source and drain contacts) is defined (FIG. 17, step (k), similar to p-CNFET source and drain contact definition). For the electrostatic doping, nonstoichiometric $HfO_X$ is deposited through ALD at 200° C. uniformly over the wafer. Finally, contact vias are lithographically patterned and etched (FIG. 17, step (m)) through the $HfO_X$ for metal contacts to the bottom metal layers, as well as etch the $HfO_X$ covering the p-CNFETs (the p-CNFETs are protected during this etch by the $SiO_2$ passivation oxide deposited previously).

Back-end-of-line (BEOL) metal routing—Following the CNT CMOS fabrication, back-end-of-line metallization is used to define additional metal layers over the CNFETs, e.g., for power distribution and signal routing. As the metal layers below the CNFETs are primarily used for signal routing, the top ($5^{th}$) metal layer in the process is used for power distribution (FIG. 17, step (n)). Additional metal can be deposited over the input/output (I/O) pads for wire bonding and packaging. At the end of the process, the wafer undergoes a final anneal in forming gas at 325° C. The finished wafer is diced into chips, and each chip can be packaged for testing or probed for standard cell library characterization.

This 3D physical architecture (with metal routing below and above the CNFETs) in uniquely enabled by the low-temperature processing of the CNFETs. The solution-based deposition of the CNTs decouples the high-temperature CNT synthesis from the wafer, enabling the entire CNFET to be fabricated with a maximum processing temperature <325° C. This enables metal layers and the gate stack to be fabricated prior to the CNFET fabrication. This is in stark contrast to silicon CMOS, which requires high temperature processing (e.g., >1,000° C.) for steps such as doping activation annealing. This prohibits fabricating silicon CMOS over pre-fabricated metal wires, as the high-temperature silicon CMOS processing would damage or destroy these bottom metal layers.

Experimental measurements—Supply voltage ($V_{DD}$) of 1.8 V is chosen to maximize noise resilience of the CNT CMOS digital logic, given the experimentally-measured transfer characteristics of the fabricated CNFETs (noise resilience is quantified by the static noise margin metric: see DREAM in the manuscript). To interface with each RV16X-NANO chip, a high channel count data acquisition system (120 channels) is used that offers a maximum clock frequency of 10 kHz while simultaneously sampling all channels. This limits the frequency of running RV16X-NANO to 10 kHz, at which the power consumption is 969 µW (dominated by leakage current). However, this is not the maximum clock speed of RV16X-NANO; during physical design, using an experimentally-calibrated CNFET compact model and process design kit (PDK) in an industry-practice VLSI design flow, the maximum reported clock frequency is 1.19 MHz, reported by Cadence Innovus® following placement-and-routing of all logic gates.

VLSI design methodology—The design flow of RV16X-NANO leverages industry-standard tools and techniques: a standard process design kit (PDK) for CNFETs as well as a library of standard cells for CNFETs is created that is compatible with existing EDA tools and infrastructure without modification. This enables leveraging of decades of existing EDA tools and infrastructure to design, implement, analyze, and test arbitrary circuits using CNFETs, which can be significant for CNFET circuits to be widely adopted in the mainstream.

A high-level description of RISC-V implementation is written in Bluespec and then compiled into a standard register transfer level (RTL) hardware description language (HDL): Verilog. Bluespec enables testing of all instructions (listed in FIGS. 21A-21C) written in assembly code (e.g., using the assembly language commands) to verify proper functionality of the RV16X-NANO. The functional tests for each instruction are also compiled into waveforms and tested on the RTL generated by Bluespec, they are verified using Verilator® to verify proper functionality of the RTL (inputs and outputs are recorded and analyzed as Verilog change dump (.vcd) files). RTL descriptions of each module are shown in FIGS. 12A-12B.

Next is the physical design of RV16X-NANO, including logic synthesis with a DREAM-enforcing standard cell library (see Methods: DREAM implementation), placement and routing, parasitic extraction, and design sign-off (i.e., design rule check (DRC), layout versus schematic (LVS), verification of the final GDSII), as shown in FIGS. 14A-14G. The RTL is synthesized into digital logic gates using Cadence Genus®, using the following components of the CNFET PDK and standard cell library: LIBERTY file (.lib) containing power/timing information for all standard library cells, cell macro layout exchange format (LEF) file (.macro.lef) containing abstract views of all standard library cells (e.g., signal/power pin locations and routing blockage information), technology LEF file (.tech.lef) containing metal routing layer information (e.g., metal/via width/spacing), and back-end-of-line (BEOL) parasitic information (.qrcTech file). To enforce DREAM, a subset of library cells in the standard cell library is used, including cells with inverter- and nor2-based logic stages (for combinational logic), and logic stages using tri-state inverters (for sequential logic), as well as fill cells (to connect power rails) and decap cells (to increase capacitance between power rails $V_{DD}$ and $V_{SS}$); specifically, these 23 cells comprise (see FIG. 19): and2_x1, buf_x1, buf_x2, buf_x4, buf_x8, decap_x3, decap_x4, decap_x5, decap_x6, decap_x8, dff2xdlh_x1, fand2stk_x1, inv_x1, inv_x2, inv_x4, inv_x8, inv_x16, mux2nd2_x1, nand2_x1, nor2nd2_x1, or2nd2_x1, xnor2nd2_x1, and xor2nd2_x1. During synthesis, all output pads are buffered with library cell buf_x8 to drive the output pad so that no signal simultaneously drives an output pad as well as another logic stage to prevent excessive capacitive loading in the core. Also, to minimize routing congestion in preparation for place-and-route, the register file (containing 4 registers as described in FIGS. 12A-12B) is directly synthesized from the Verilog HDL (instead of being designed "by hand" or using a memory compiler) so that the D-flip-flops (dff2xdlh_x1: FIG. 19) including the state elements (registers) can be dispersed throughout the chip to lower overall total wire length. The final netlist is flattened so there is no hierarchy, and so logic can be optimized across module boundaries, and is then exported for place and route.

Placement-and-routing is performed using Cadence Innovus®, loading the synthesized netlist output from Cadence Genus®. The core floorplan for standard library cells is defined as 6.912 mm×6.912 mm. Given the standard cell library and logic gate counts from synthesis (and2_x1: 188, buf_x1: 3, buf_x8: 82, buf_x16: 25, dff2xdlh_x1: 68, fand2stk_x1: 15, inv_x1: 75, inv_x2: 15, inv_x4: 10, inv_x8: 27, mux2nd2_x1: 189, nand2_x1: 625, nor2nd2_x1: 27, or2nd2_x1: 211, xnor2nd2_x1: 14, xor2nd2_x1: 8), the resulting standard cell placement utilization is 40%. The pad ring for I/O is defined as another cell with 160 pads: 40 on each side, with 170 μm minimum width and 80 μm minimum spacing totaling 250 μm pitch. Inputs are primarily toward the top of the chip, outputs are primarily on the bottom, and power/ground ($V_{DD}/V_{SS}$) pads are on the sides (FIGS. 11A-11B). In addition to the core area, an additional boundary of 640 μm is permitted for signal routing around the core area (containing all standard library cells), e.g., for relatively long global routing signals. Placement is performed while optimizing for uniform cell density and low routing congestion. The power grid is defined on top of the core area using the $5^{th}$ metal layer (as shown in FIGS. 11A-11B), while not consuming any additional routing resources within the metal layers for signal routing. The clock tree is implemented as a single high-fanout net loaded by all 68 D-flip-flops (for each of CLK and the inverted clock: CLKN), which is directly connect to an input pad, to minimize clock skew variations between registers.

All routing signals and vias are defined on a grid, with routing jogs enabled on each metal layer to enable optimization targeting maximum spacing between adjacent metal traces. After this stage of routing, incremental placement is performed to further optimize congestion, and then filler cells and decap cells are inserted to connect the power rails between adjacent library cells and to increase capacitance between $V_{DD}$ and $V_{SS}$ to improve signal integrity. After this incremental placement, the final routing takes place, reconnecting all the signals and routing to the pads, including detailed routing to fix all DRC violations (e.g., metal shorts and spacing violations). Finally, parasitic resistance and capacitances are extracted to finalize power/timing analysis, and the final netlist is output to quantify static noise margin for all pairs of connected logic stages. The GDSII is streamed out from Cadence Innovus® and is imported into Cadence Virtuoso® for final DRC and LVS, using the standard verification rule format (SVRF) rule files with Mentor Graphics Calibre®. The synthesized netlist is again used in the RTL functional simulation environment to verify proper functionality of all instructions, using Synopsys VCS®, with waveforms for each test stored in a Verilog change dump (.vcd) file. Note that these waveforms constitute the input waveforms to test the final fabricated CNFET RV16X-NANO, as well as the expected waveforms output from the core, as shown in FIGS. 13A-13C.

Once the GDSII for the core is complete, it is instantiated in a full die, which contains the core in the middle, alignment marks, and test structures (including all standard library cells, CNFETs, and test structures to extract wire/via parasitic resistance and capacitance) around the outside of the core as shown in FIG. 18. This die (2 cm×2 cm) is then tiled onto a 150 mm wafer, each of which comprises 32 dies (6×6 array of dies minus 4 dies in the corners). Each layer in the GDS is flattened for the entire wafer and then released for fabrication.

To implement DREAM:

Generate "DREAM SNM table"—for each pair of logic stages in the standard cell library, quantify its susceptibility to m-CNTs as follows: use the variation-aware CNFET SNM model to compute SNM for all possible combinations of whether or not each CNFET comprises an m-CNT (e.g., in a (nand2, nor2) logic stage pair, there are $2^8$ such combinations since there are 8 total CNFETs). Record the minimum computed SNM in a table: the DREAM SNM table (FIG. 6B).

Determine prohibited logic stage pairs—choose an SNM cut-off value ($SNM_C$), such that all logic stage pairs whose SNM in the DREAM SNM table is less than $SNM_C$ are prohibited during physical design (example in FIG. 16B, entries with values greater than 82 satisfy $SNM_C$ and are allowable while entries with values 82 and below are prohibited cascaded logic gate pairs).

Physical design—use industry-practice design flows and electronic design automation (EDA) tools to implement VLSI circuits without using the prohibited logic stage pairs. Ideally, EDA tools will enable designers to set which logic stage pairs to prohibit during power/timing/area optimization, but this is currently not a supported feature. To demonstrate DREAM, a DREAM-enforcing library is created that comprises a subset of library cells such that no possible combination of cells can be connected to form a prohibited logic stage pair One parameter for DREAM is $SNM_C$ (described above): larger $SNM_C$ prohibits more logic stage pairs, resulting in betterpNMS with higher energy/delay/area cost (and vice versa). To satisfy target $p_{NMS}$ constraints (e.g., $p_{NMS} \geq 99\%$), while minimizing cost, $SNM_C$ can be optimized via bisection search:

1) Initialize a lower bound (L) and upper bound (U) for $SNM_C$. L=0, and U is the maximum value of $SNM_C$ that enables EDA tools to synthesize arbitrary logic functions (e.g., prohibiting all logic stage pairs except (inv, inv) would be insufficient);

2) Find $p_{NMS}$ using $SNM_C=(L+U)/2$. Record the set of prohibited logic stage pairs, as well as the circuit physical design, $p_{NMS}$, energy, delay, and area;

3) If $p_{NMS}$ satisfies the target constraint (e.g., $p_{NMS}$>99%), set U=$SNM_C$.

Otherwise set L=$SNM_C$;

4) Set $SNM_C=(L+U)/2$. If $p_{NMS}$ has already been analyzed for the resulting set of prohibited logic stage pairs, terminate. Otherwise, return to #2.

For all physical designs recorded in #2, choose the one that satisfies the targetpNMS constraint with minimum energy/delay/area cost. The cost of implementing DREAM is 10% energy, <10% delay, and <20% area; integrating DREAM within EDA tools—enabling $p_{NMS}$ optimization simultaneously with power/timing/area optimization is future work for improving $p_S$ versus power/timing/area trade-offs.

Example 4

Standard Cell Library—As part of the CNFET PDK, parameterized cells (Pcells) are created using Cadence Virtuoso® for both n-CNEETs and p-CNFETs, with the following open access (OA) layers: CNFET gate, goxcut (via between CNFET gate and source/drain), active, sdp (p-CNFET source/drain), pp (passivation over p-CNFETs to shield from doping oxide for n-CNFETs), sdn (n-CNFET source/drain), dopecut (etch doping oxide over p-CNFETs), and m5 (top-layer metal). CNFET Pcells offer the following user-controlled component description format (CDF) parameters, which are both provided as inputs by the designer, and extracted using design rule check (DRC) and layout versus schematic (LVS) rules: CNFET width, physical gate length, channel length, gate underlap, source/drain/gate extension width over the horizontal edge of the CNT active region, and source/drain extension length over the vertical edge of the CNT active region. These CDF parameters are also automatically checked using DRC, along with other design rules such as minimum spacing between CNT active region and goxcut via (connecting layers: gate and sdp). CNFET devices extracted using LVS (using Standard Rule Verification Format (SVRF) compatible with Mentor Graphics Calibre® integrated within Cadence Virtuoso®) instantiate CNFETs using the widely-used virtual source FET model calibrated to experimentally measured data from CNFETs (compact model written in Verilog-A).

The CNFET Pcell is used in conjunction with other OA layers in the PDK (e.g., m1=metal routing layer, v1g=via between m1 and CNFET gate, v_sd_m5=via between NMOS source/drain and metal 5 power distribution) to create 63 cells in the standard library cell; images, layouts, schematics, and experimentally measured waveforms for each standard cell are shown in FIG. 19. To facilitate automated and compact placement and routing, standard cells are designed with the convention of having standard cell height equal to 16 metal tracks, including one shared power rail ($V_{DD}$) and one shared ground ($V_{SS}$) rail (shared between vertically adjacent rows of standard cells), and some cells are "double height cells" comprising 32 metal tracks and conforming to the same conventional site-based placement method used by placement-and-routing tools (e.g., Synopsys IC Compiler® and Cadence Innovus®). Standard library cells also conform to conventional CMOS-based layout styles with PMOS FETs aligned horizontally (e.g., on the top half of the layout towards the $V_{DD}$ rail) and NMOS FETs aligned horizontally (e.g., on the bottom half of the layout toward the $V_{SS}$ rail). Of the 16 metal tracks for standard cells, 3 are used for power rails, 3 are used for each of n-CNFET and p-CNFET width, and 7 are used for signal routing (2 tracks between p-CNFET and $V_{DD}$, 2 tracks between n-CNFET and $V_{SS}$, and 3 tracks between n-CNFET and p-CNFET), creating routing resources for local interconnects (e.g., within standard cells and between standard cells), and for global signal routing (for place-and-route tools).

Layouts for each cell are shown in FIG. 19, as well as schematics for each standard cell that are automatically extracted using LVS (and verified against drawn schematics in Cadence Virtuoso®). These netlists are then used in conjunction with Cadence Liberate® for library power/timing characterization, e.g., to compute rise/fall delay/output slew rate/energy consumption as functions of output load capacitance and input slew rate. Additional metrics quantified by Cadence Liberate® include cell leakage power and timing constraint tables for sequential logic (e.g., setup time, hold time, minimum clock pulse width). The results are written to standard file formats (LIBERTY file: Jib) for synthesis & place-and-route. In addition to .lib files, layout exchange format Clef) files (defining abstracted standard cell views for place and route, including pin locations, power rail locations, and blockage information) are created using Cadence Abstract®. These .lib and .lef files for standard library cells are then used for synthesis & place and route, in conjunction with other technology files in the PDK Clef for technology layers, e.g., defining layers and rules for metal routing, and .ict/.qrcTech files defining parasitic information between technology layers).

To experimentally characterize and calibrate the standard cell library, each of the standard cells is fabricated alongside the RV16X-NANO. As shown in FIG. 18, each die contains the RV16X-NANO processor core in its center, surrounded by test circuitry on the perimeter. For packaging, these test structures are removed during dicing to isolate the RV16X-NANO processor core. The test circuitry contains both test structures for process monitoring throughout the >100 fabrication process steps utilized for RV16X-NANO, but also contains all of the standard cells. FIG. 19 shows images, schematics, and measurements for each of the standard cells in the library, illustrating correct functionality, high output voltage swing (>99% $V_{DD}$ swing), and high gain (>15). Output voltage swing is defined as the difference between the maximum output voltage and the minimum output voltage as the input voltage is swept from 0 to $V_{DD}$. Gain is defined as the maximum value of $|dV_{OUT}/dV_{IN}|$ as $V_{IN}$ is swept from 0 to $V_{DD}$.

RISC-V: Operational Details—The RV16X-NANO processor is implemented as a finite state machine (FSM) with 3 different states: INST_FETCH (when it is requesting an instruction from memory), EXECUTE (when it is executing an instruction), and LOAD FINISH (when it is loading data from memory). It comes out of reset initialized in INST_FETCH, with the program counter set to 0, and so it fetches the instruction from address 0 in the memory and advances to the EXECUTE state. Adhering to RISC-V specification, the 32-bit instruction is one of 4 base instruction types (R-type, I-type, S-type, or U-type) with 5 immediate variations within the instruction (I-immediate, U-immediate, S-immediate, B-immediate, J-immediate), forming 6 possible instruction formats (type-immediate): R, I-I, I-U, S-B, S-S, U-J: see FIGS. 21A-21C for bit-level descriptions of these instructions. The instruction is decoded as one of these formats in the "decode" block (FIGS. 12A-12B), which then access to the register file (e.g., which registers to read) and provides inputs the execute block. These inputs include: 16-bit values read from the register file, immediate values decoded from the instruction, the current value of the program counter, and control signals to select instructions from the sub-blocks including: add, shift, bitwise- and, bitwise-or, bitwise-xor, less than comparison, equal comparison (FIGS. 12A-12B). The outputs of these control blocks determine which values to write back into registers (e.g., for arithmetic operation such as add/subtract), and values to write back into memory. The execute block also computes the next value of the program counter, e.g., based on either incrementing (next pc=pc+4) or otherwise for conditional branch or unconditional jump. For loads and stores, the specified memory access is performed in the EXECUTE state. For loads, the processor continues to the LOAD FINISH state to write the load response to the register file and then request the next instruction. For stores, the processor continues to the INST_FETCH state to fetch the next instruction. All other instructions fetch the next instruction as part of the EXECUTE state. This mode of operation continues during full execution of programs and adheres to the specification in riscv.org according to RV32E specification, but a reduced number of registers (4 instead of 16) and with 16-bit data words instead of 32-bit data words (all registers in the register file are 16-bit instead of 32-bit), though instructions remain 32-bits. A full list of all instructions is in FIG. 26, which is the full list for the RV32E in the RISC-V specification. To adjust RV32E to 16-bit, the instruction length remains 32 bits, and all data operations are performed on 16-bit values instead of 32-bit values, by truncating the upper-32 bits.

The full 32-bit RISC-V processor from which the 16-bit processor was derived was formally verified using the riscv-formal suite of RISC-V specifications and tools for SMT-based hardware model checking. The riscv-formal suite contains a set of specifications that describe correct behavior of RISC-V processors. These specifications are in the form of checks performed on packets emitted from a trace-emitting interface added to processors under test called the RISC-V Formal Interface (RVFI). There are specifications for each RISC-V instruction that check individual RVFI packets to make sure each instruction is implemented correctly, e.g., the add instruction correctly implements addition. There are also specifications to make sure the microarchitecture is implemented correctly that check bounded sequences of RVFI packets for necessary properties, e.g., reading a register returns the last value written to it. Both groups of specifications are implemented in Verilog with simple synthesizable code and immediate assertion statements. The specifications in the riscv-formal suite have been verified against the reference RISC-V software simulator Spike and another formal specification written in Haskell.

The riscv-formal suite also contains tools to perform SMT-based hardware model checking on each of these specifications using the SymbiYosys framework. A script within the riscv-formal suite produces a SymbiYosys configuration file for each piece of the specification. These configuration files can be used with SymbiYosys to perform bounded model checking for each piece of the specification separately.

To verify the 32-bit RISC-V processor against riscv-formal, an RVFI port was added to emit information about each instruction executed and implemented a wrapper for the processor to match the rest of the interface expected by riscv-formal. The SymbiYosys framework is used to run bounded model checking with a depth of 30 clock cycles using the Boolector SMT solver resulting in all 42 tests passing. The free variables used by the SMT solver were the memory responses and the register file reset values. This allowed the SMT solver to explore arbitrary sequences of instructions from arbitrary initial states of the register file up to 30 clock cycles. Using a depth of 30 clock cycles is more than sufficient to cover all reachable microarchitectural states of the processor.

RINSE Method Characterization—In addition to demonstrating the ability for RINSE to reduce CNT aggregate defect density by >250×, RINSE is further characterized to show that the RINSE process does not negatively impact CNFET performance. As shown in FIGS. 22A-22E, scanning electron microscopy (SEM) images of CNT deposition pre- and post-RINSE show negligible change in the CNT density. Therefore, RINSE does not remove CNTs from the wafer surface, even after >60 minutes of performing RINSE sonication. Moreover, CNFETs fabricated on samples that have and have not undergone RINSE exhibit minimal change in electrical characteristics (FIG. 22B, note negligible change in the $I_D$-$V_{GS}$ for a set of CNFETs). Not only does RINSE not impact the p-CNFETs, the CNFETs can still undergo the MIXED doping process (including the electrostatic doping oxide) to realize n-CNFETs (FIG. 22C).

MIXED Method Characterization—FIGS. 23A-23B provide additional characterization of the MIXED CNFET CMOS process, realizing the first demonstration of large-area (150 mm substrates), uniform, and high-yield CNFET CMOS logic.

FIG. 15B shows the 150 mm wafer with the test patterns (each die has 10,400 CNFET CMOS two-input "not-or" (NOR2) logic gates). Separate NOR2 logic gates are fabricated and measured as it enables characterization of key gate-level metrics, e.g. the voltage transfer curves (VTCs, which are used to compute the static noise margin of cascaded logic gates)', gain, and output voltage swing. Explanations of these metrics are shown in FIG. 23A. FIG. 23B shows the extracted distributions of these key metrics for all of the experimentally measured VTCs from the 10,400 logic gates shown in FIG. 15D (these are the VTCs for all 10,400 CNFET CMOS NOR2 logic gates within a die, no logic gates have been excluded). To illustrate uniformity, the functional yield (output voltage swing >70%) for all logic gates within the die is 10,400/10,400, and the average output voltage swing is >98% with a standard deviation of <2%. By extracting $V_{OH}$, $V_{OL}$, $V_{IH}$, $V_{IL}$ from the VTCs associated with each of the 10,400 logic gates, one is able to calculate the static noise margin (SNM) of all combinations of two cascaded NOR2 gates (i.e., with driving logic gate and loading logic gate). FIG. 22C shows the distributions of the SNM for the >100 million combinations of cascaded logic gate pairs (i.e., with a driving logic gate and a loading logic gate): 99.93% of logic gate pairs have positive noise margin (i.e., $V_{OH}^{(DR)} > V_{IH}^{(LD)}$ and $V_{OL}^{(DR)} < V_{IL}^{(LD)}$, where (DR) is for the driving logic gate and (LD) is for the loading logic gate), indicating correct cascaded logic gate functionality. All of this characterization is performed at the scaled supply voltage of 1.2 $V_{DD}$.

VTCs allow extracting $V_{OH}$, $V_{OL}$, $V_{IH}$, $V_{IL}$ (Extended Data FIG. 8), which are essential for analyzing the noise resilience of cascaded digital logic gates.

Moreover, FIG. 22D shows the noise margin violations (SNM<0) can partially be attributed to the wafer processing (i.e., not the CNTs), and therefore can be improved by optimizing processing (e.g., ALD doping oxide uniformity over the 150 mm wafer). As can be seen in FIG. 22D, there is a spatial dependence of $V_{IH}$ (as an example parameter to compute SNM; the other parameters exhibit similar spatial dependence): $V_{IH}$ increases across the die (increasing from top to bottom). The change in $V_{IH}$ corresponds with slight changes in CNFET threshold voltage. The fact that the threshold voltage variations are not uniformly distributed, but rather have spatial dependence, illustrates that a portion of the threshold voltage variations (and therefore variation in SNM) is due to wafer-level processing-related variations (CNT deposition is more uniform across the 150 mm wafer).

Additionally, to demonstrate that MIXED is wafer-scalable across 150 mm substrates, FIG. 22E shows the first 150 mm wafer-scale CNT CMOS characterization: measurements across 4 additional dies distributed across the 150 mm wafer (1,000 CNT CMOS NOR2 logic gates are sampled randomly from the 10,000 ensemble in each die, with no logic gates omitted from the analysis) illustrating yield across the 150 mm wafer (total yield across wafer: 14,400 logic gates, 57,600 CNFETs). This is the first demonstration of large-area, uniform, and high-yield CNT CMOS logic, enabled by combining RINSE with the robust MIXED CNT CMOS process.

Prior work for overcoming metallic CNTs—The presence of m-CNTs has been a major obstacle in the field of CNTs since the first CNFET demonstrations over a decade ago. While a wide range of techniques have been developed in response to m-CNTs, no technique achieves the required s-CNT purity for realizing CNFET digital VLSI systems. While previous works have set $p_S$ requirements based on limiting m-CNT-induced leakage power, no existing works have provided guidelines for $p_S$ based on both increased leakage and degraded SNM due to m-CNTs for physical designs of VLSI circuits; while 99.999% $p_S$ is sufficient to limit EDP degradation to <5%, FIGS. 24A-24E show that SNM imposes far stricter requirements on purity: $p_S$~99.999,999% to achieve $p_{NMS}$≥99% (for 1 million gate circuits).

To quantify the impact of m-CNTs on VLSI circuits, circuit modules are analyzed that are synthesized from the processor core of OpenSparc T2, a large multi-core chip that closely resembles the commercial Oracle/SUN Niagara 2 system; thus, these results account for effects present in realistic VLSI circuits—such as wire parasitics, buffer insertion to meet timing constraints, and SNM for cross-coupled logic stages in sequential logic elements—that are not present in small circuit benchmarks. Standard cell libraries derived from the reference library "asap7sc7p5t" included with the ASAP7 process design kit (PDK) are leveraged to create physical designs of the OpenSparc modules at an example 7 nm technology node, to compare optimized energy, delay, area, and $p_S$ required to achieve $p_{NMS}$=99% for VLSI circuits. The baseline case, which permits all pairs of logic stages, requires $p_S$≥99.999,996,3% to achieve $p_{NMS}$≥99% (for $SNM_R=V_{DD}/5$).

Performance Cost of Manufacturing Methodology for CNTs—the manufacturing methodology for CNTs (RINSE, MIXED, and DREAM) overcomes the major obstacles facing a future CNT technology with minor cost in performance or energy efficiency. First, RINSE does not degrade CNFET performance: this is validated experimentally in FIGS. 22A-22E. Second, MIXED enables CMOS CNFETs without significant (or costly) changes to transistor structure (e.g., additional FET gates or 3D FET geometries that would increase parasitics), and without imposing additional design rules that would impact circuit layouts (in fact, although it is not discussed in this manuscript, CNFET CMOS can potentially enable more compact circuit layouts versus silicon, due to the lack of design constraints enforced by n/p-wells, well taps, or doping implants in many silicon-based technologies). Finally, DREAM also enables CNFET EDP benefits to be maintained in the presence of m-CNTs using s-CNT purity that is available today. While a perfect, variation-free CNFET technology can offer 9.0×EDP benefit versus silicon at a 7 nm node (Hills 18), DREAM would still enable—in the worst case—a 7.4×EDP benefit despite 99.99% s-CNT purity (i.e., while an ideal CNT technology promises a 9×EDP benefit, a worst-case 10% energy and 10% delay cost reduces this 9×EDP benefit to 9×/(1.1*1.1) =7.4×, since energy and delay are both increased by 1.1×). Although the cost of DREAM in this particular case is quantified, DREAM is a general technique to trade-off circuit noise immunity with energy, delay, and area in the presence of variations (such as m-CNTs). Thus, DREAM offers circuit designers multiple solutions with varying costs and noise immunity improvements to meet design goals. There are consequently multiple paths to further reduce the cost of DREAM: (1) as s-CNT purity continues to improve, the cost of DREAM will naturally improve as well (<10% energy, <10% delay, <20% area, is for 99.99% s-CNT purity that is already commercially available today, improving s-CNT purity will decrease the cost imposed by DREAM); and (2) the analysis considers DREAM implemented using a DREAM-enforcing standard cell library (as described in Methods), so that standard EDA tools today (even though they are currently unaware of DREAM) can still implement DREAM by avoiding the use of prohibited logic stage during logic synthesis and place-and-route. However, integrating DREAM directly into synthesis and place-and-route algorithms can further optimize power/timing/area while simultaneously meeting noise margin constraints, further reducing any cost associated with DREAM.

DREAM is a major step towards realizing the benefits of CNFETs, overcoming the major obstacle of m-CNTs. Contrary to previous works, DREAM requires no additional CNT-specific processing for removing m-CNTs, enabling CNFET circuits to be fabricated with commercially-available CNT purities today (relaxing the required CNT purity by ~10,000×). As a general technique for improving noise margin resilience, DREAM can be applied both to arbitrary digital logic VLSI circuits as well as a broad range of technologies.

Integrated circuits designed specifically for improved SNM as described herein can be useful for (for example) space applications, by making such circuits more robust to several different types of radiation effects such as total-ionizing-dose and soft-errors. They can also be useful for ultra-low-power applications and sub-threshold circuits to enable lower supply voltages to be used. While described herein with respect to circuits including CNTs, such design approaches can be generally applicable to any transistor based circuits/technology.

Conclusion

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

The above-described embodiments can be implemented in multiple ways. For example, embodiments may be implemented using hardware, software or a combination thereof. When implemented in software, the software code can be executed on a suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touchpads, and digitizing tablets. As another example, a computer may receive input information through speech recognition or in other audible formats.

Such computers may be interconnected by one or more networks in a suitable form, including a local area network or a wide area network, such as an enterprise network, an intelligent network (IN) or the Internet. Such networks may be based on a suitable technology, may operate according to a suitable protocol, and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Some implementations may specifically employ one or more of a particular operating system or platform and a particular programming language and/or scripting tool to facilitate execution.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of making an integrated circuit, the method comprising:

for each pair of connected logic stages possible for use in the integrated circuit, determining a static noise margin (SNM) for the pair of connected logic stages with a metallic carbon nanotube (m-CNT), the SNM representing an immunity to noise of the pair of logic stages when made with the m-CNT and accounting for a likelihood that either or both logic gates of the pair of connected logic gates include a m-CNT; and making the integrated circuit with only those pairs of connected logic stages having an SNM above a threshold SNM despite the possible presence of the m-CNT in each pair of those pairs of connected logic gates.

2. The method of claim 1, wherein determining the SNM for each pair of connected logic stages comprises determining all possible combinations of m-CNTs in the pair of connected logic stages.

3. The method of claim 1, further comprising:

determining a probability that all noise margin constraints are satisfied using only those pairs of connected logic stages having an SNM above the threshold SNM; and adjusting the threshold SNM based on the probability that all noise margin constraints are satisfied using only those pairs of connected logic stages having an SNM above the threshold SNM.

4. The method of claim 1, further comprising:

storing models of SNMs for the pairs of connected logic states possible for use in the integrated circuit in a library; and designing the integrated circuit with an electronic design automation tool linked to the library.

5. The method of claim 1, wherein the integrated circuit has a semiconductor-carbon nanotube (s-CNT) purity of at most 99.99%.

6. The method of claim 1, wherein the integrated circuit includes at least one thousand connected logic stages.

7. The method of claim 1, further comprising, prior to making the integrated circuit:

generating a circuit design for the integrated circuit using only those pairs of connected logic stages having an SNM above a threshold SNM; and determining a performance parameter for the integrated circuit based on the circuit design.

8. A method of making an integrated circuit, the method comprising:

for each pair of connected logic stages possible for use in the integrated circuit, determining a static noise margin (SNM) for the pair of connected logic stages with a metallic carbon nanotube (m-CNT), the SNM representing an immunity to noise of the pair of logic stages when made with the m-CNT;

selecting a circuit design for the integrated circuit based on only those pairs of connected logic stages having an SNM above a threshold SNM and determining a performance parameter for the integrated circuit based on the circuit design, wherein the selected circuit design is one of a set of circuit designs, wherein the performance parameter is at least one of power consumption, switching delay, or surface area, and wherein the selected circuit design (a) has a 99% likelihood that it meets a maximum noise criterion and (b) has the lowest value among the set of circuit designs for the at least one of the power consumption, switching delay, or surface area; and making the integrated circuit with the circuit design, such that the integrated circuit includes only those pairs of connected logic stages having an SNM above a threshold SNM.

9. The integrated circuit made according to the method of claim 1.

10. A method of making an integrated circuit, the method comprising:

for each pair of connected logic stages possible for use in the integrated circuit, determining a static noise margin (SNM) for the pair of connected logic stages based on a probability of having a metallic carbon nanotube field-effect transistor in a first pair of connected logic stages, the SNM representing an immunity to noise of the pair of connected logic stages; and selecting pairs of connected logic stages for use in the integrated circuit based on the SNMs for the pairs of connected logic stages and a desired probability of satisfying all noise margin constraints for the integrated circuit.

11. The method of claim 10, further comprising:

determining the SNM for a first pair of connected logic stages based on a device-to-device variability of transistors in the first pair of connected logic stages.

12. The method of claim 10, further comprising manufacturing the integrated circuit based on the selected pairs of connected logic stages.

13. The method of claim 12, wherein the manufacturing does not include removal of any metallic-carbon nanotubes (m-CNTs).

14. A method of making an integrated circuit, the method comprising:

for each pair of connected logic stages possible for use in the integrated circuit, determining a static noise margin (SNM) for the pair of connected logic stages, the SNM representing an immunity to noise of the pair of connected logic stages; and selecting pairs of connected logic stages for use in the integrated circuit based on the SNMs for the pairs of connected logic stages and a desired probability of satisfying all noise margin constraints for the integrated circuit, wherein the SNM further represents that at least one logic stage of that pair of logic stages comprises a metallic carbon nanotube (m-CNT).

15. The method of claim 10, wherein selecting the pairs of connected logic stages comprises weighting each pair of connected logic stages based on its corresponding SNM.

16. The method of claim 10, further comprising selecting at least one combination of two or more pairs of connected logic stages, wherein the at least one combination meets the desired probability of satisfying all noise margin constraints for the integrated circuit.

17. The method of claim 10, wherein selecting the pairs of connected logic stages is further based on one or more of:

satisfying timing constraints for the integrated circuit;

satisfying power consumption constraints for the integrated circuit; or satisfying area constraints for the integrated circuit.

* * * * *